US 10,408,251 B2

(12) United States Patent
Pillay

(10) Patent No.: US 10,408,251 B2
(45) Date of Patent: Sep. 10, 2019

(54) SYSTEMS AND METHODS FOR MAKING AND USING A FITTED CAP FOR APPLYING A SHAPED SEALANT SHROUD TO A PORTION OF A FASTENER

(71) Applicant: The Boeing Company, Chicago, IL (US)

(72) Inventor: Ganesh R. Pillay, Melbourne (AU)

(73) Assignee: THE BOEING COMPANY, Chicago, IL (US)

( * ) Notice: Subject to any disclaimer, the term of this patent is extended or adjusted under 35 U.S.C. 154(b) by 51 days.

(21) Appl. No.: 15/853,053

(22) Filed: Dec. 22, 2017

(65) Prior Publication Data

US 2019/0195266 A1 Jun. 27, 2019

(51) Int. Cl.
*F16B 33/00* (2006.01)
*F16B 37/14* (2006.01)
*B64F 5/40* (2017.01)
*B64F 5/10* (2017.01)
*B64C 1/06* (2006.01)

(52) U.S. Cl.
CPC ............. *F16B 33/004* (2013.01); *B64F 5/10* (2017.01); *B64F 5/40* (2017.01); *F16B 37/14* (2013.01); *B64C 1/061* (2013.01)

(58) Field of Classification Search
CPC ............................... F16B 33/004; F16B 37/14
See application file for complete search history.

(56) References Cited

U.S. PATENT DOCUMENTS

| 4,135,476 A | * | 1/1979 | Duryea ..................... B05C 1/02 118/259 |
| 4,144,625 A | * | 3/1979 | Hogenhout ............... B05C 7/00 118/215 |
| 4,400,123 A | * | 8/1983 | Dunegan ................. F16B 37/14 116/270 |

(Continued)

FOREIGN PATENT DOCUMENTS

JP 2001030267 A 2/2001

OTHER PUBLICATIONS

Extended European Search Report regarding European Patent Application Serial No. 18201669 dated Apr. 16, 2019, pp. 1-8.

*Primary Examiner* — Jason L Vaughan
(74) *Attorney, Agent, or Firm* — Armstrong Teasdale LLP

(57) ABSTRACT

A system (1501) for applying a shaped sealant shroud (590) to a portion (106) of a fastener (100) comprises a fitted cap (300) having a cap cavity (303) configured to receive sealant (592) therein, and a relief opening (316). The fitted cap (300) is positionable over the fastener (100) such that a uniform gap (302) is formed between a wall (305) of the fitted cap (300) and the portion (106) of the fastener (100), and the relief opening (316) is communicatively coupled with the uniform gap (302). The system (1501) also comprises a cap-manipulation tool (500) comprising a shaft (510) comprising a through, circumferentially closed, channel (516) communicatively coupled with the relief opening (316) of the fitted cap (300). The fitted cap (300) is rotatable together with the shaft (510) to distribute the sealant (592), previously introduced into the cap cavity (303), in the uniform gap (302) to form the shaped sealant shroud (590). The relief opening (316) is oriented to purge at least one of gas or excess of the sealant (592) from the uniform gap (302) into the channel (516).

30 Claims, 23 Drawing Sheets

(56) References Cited

U.S. PATENT DOCUMENTS

| | | | |
|---|---|---|---|
| 4,519,974 A | 5/1985 | Bravenec et al. | |
| 4,971,745 A | 11/1990 | Ferenc et al. | |
| 5,431,518 A * | 7/1995 | Young | F16B 33/004 |
| | | | 411/429 |
| 6,001,301 A | 12/1999 | Kinoshita | |
| 6,279,425 B1 | 8/2001 | Cicotte | |
| 9,188,226 B2 * | 11/2015 | Pajel | F16J 15/02 |
| 9,849,637 B2 * | 12/2017 | Pajel | B29C 70/681 |
| 2003/0202860 A1 * | 10/2003 | Wilson | F16B 37/14 |
| | | | 411/429 |
| 2008/0038084 A1 * | 2/2008 | Nakamura | F16B 33/004 |
| | | | 411/378 |
| 2008/0152459 A1 * | 6/2008 | Tooman | F16B 37/14 |
| | | | 411/372.5 |
| 2012/0219380 A1 * | 8/2012 | Hutter, III | B64D 45/02 |
| | | | 411/377 |
| 2013/0216330 A1 * | 8/2013 | Milligan | F16B 37/14 |
| | | | 411/429 |
| 2015/0298819 A1 * | 10/2015 | Yamakoshi | B23P 11/00 |
| | | | 244/1 A |
| 2016/0076577 A1 * | 3/2016 | Rizzello | F16B 11/006 |
| | | | 411/82 |
| 2016/0207182 A1 * | 7/2016 | Sprik | F16B 33/004 |
| 2017/0259306 A1 * | 9/2017 | Wiseman | F16B 37/14 |

* cited by examiner

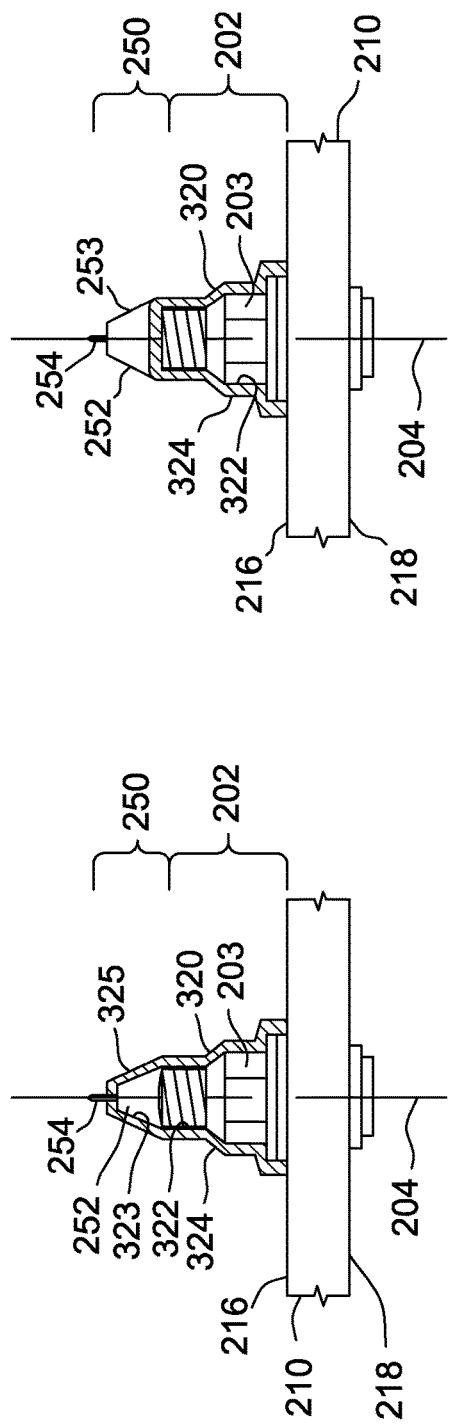
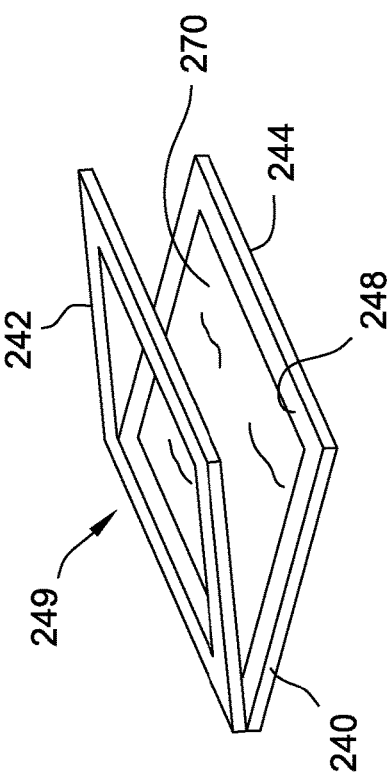

(CONTINUED TO 19B)

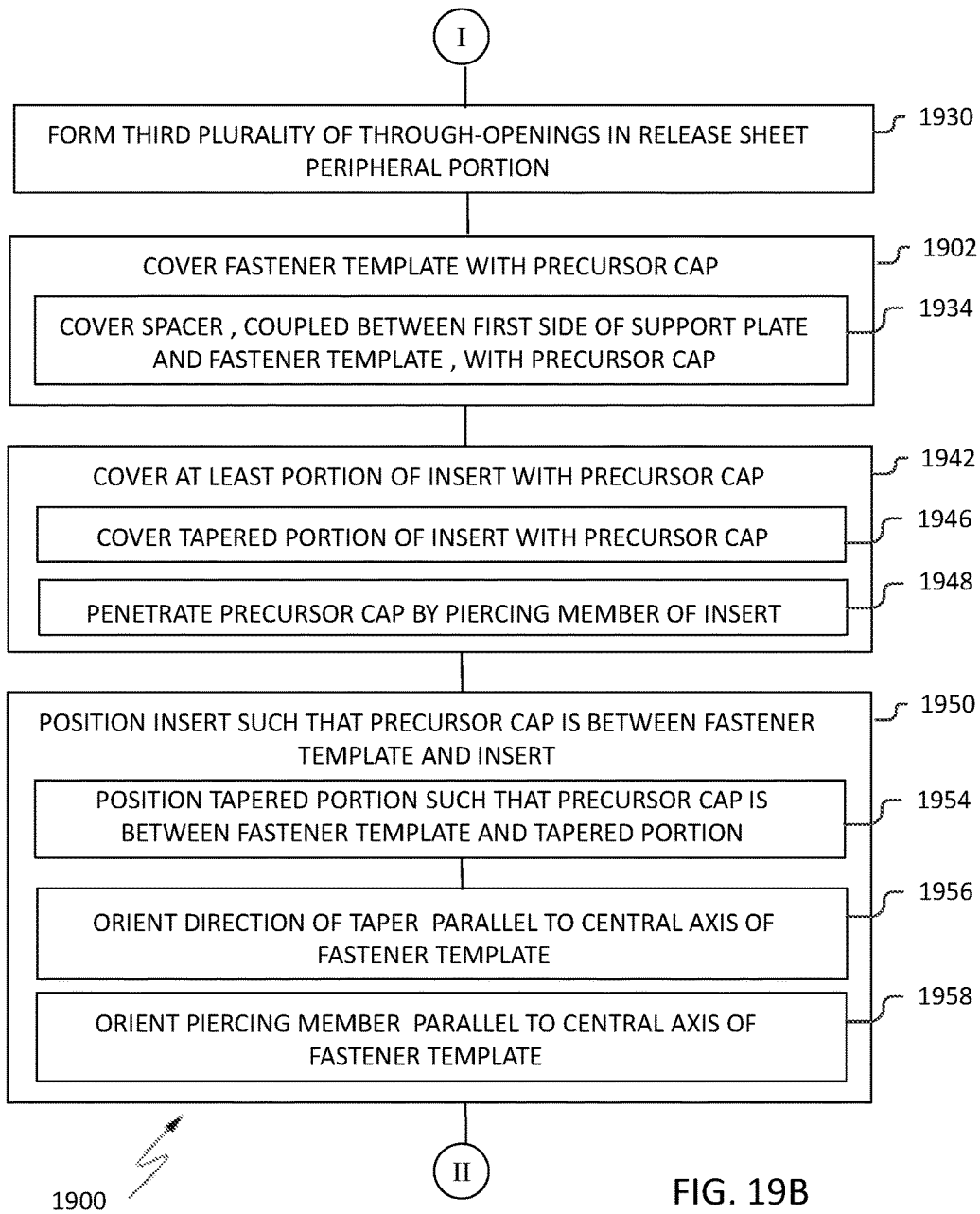
FIG. 19B
(CONTINUED FROM 19A;
CONTINUED TO 19C)

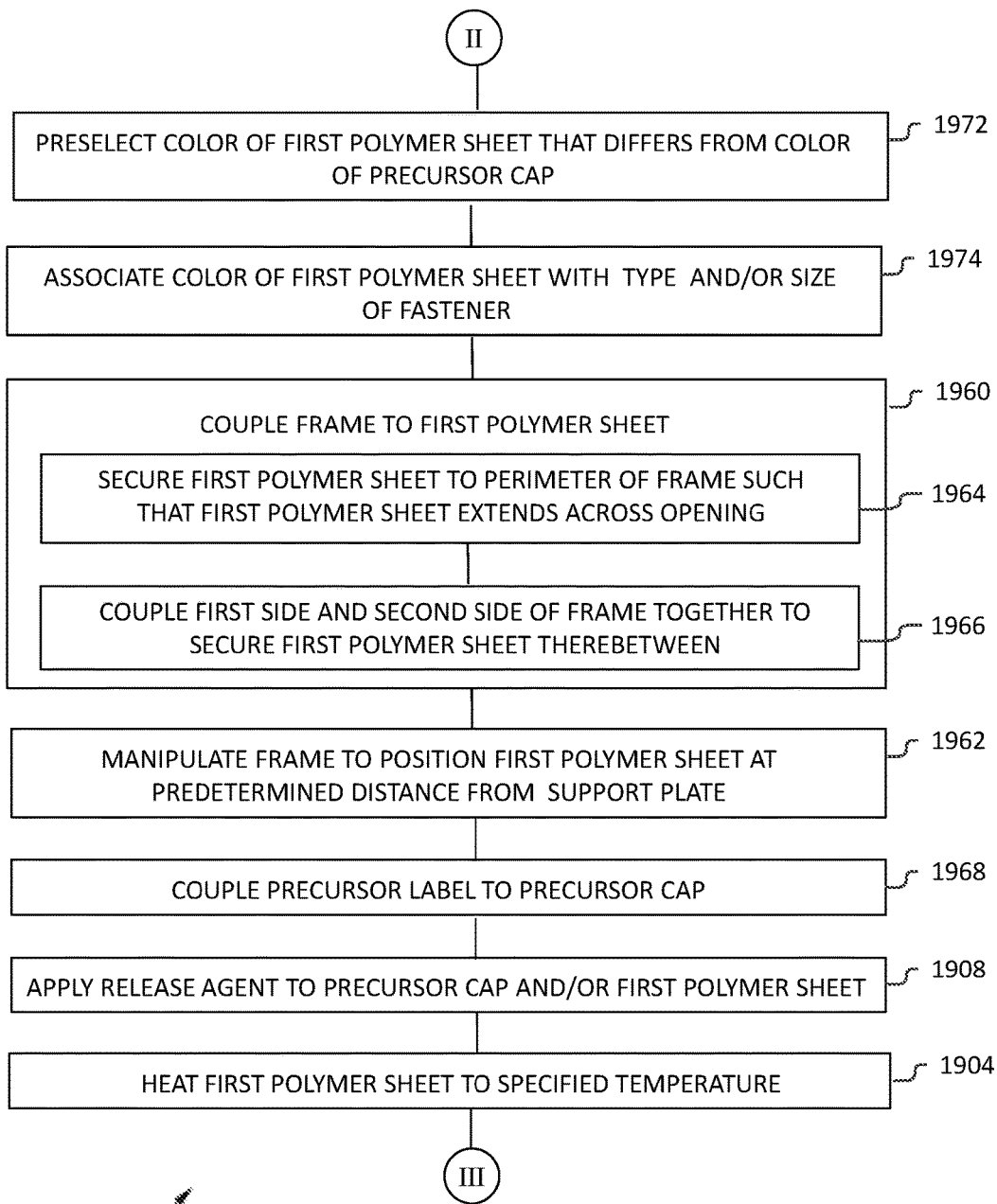
FIG. 19C
(CONTINUED FROM 19B;
CONTINUED TO 19D)

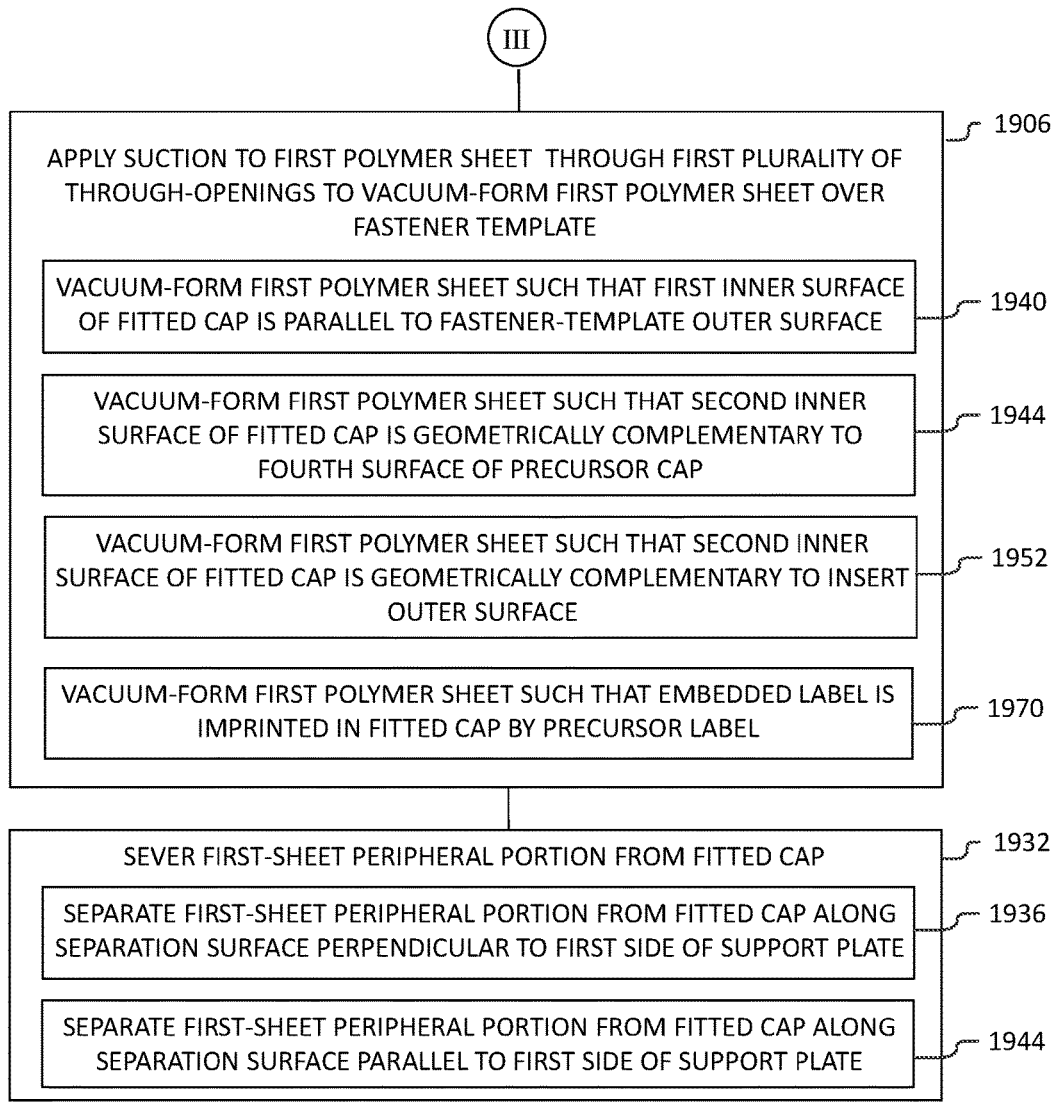
FIG. 19D
(CONTINUED FROM 19C)

(CONTINUED TO 20B)

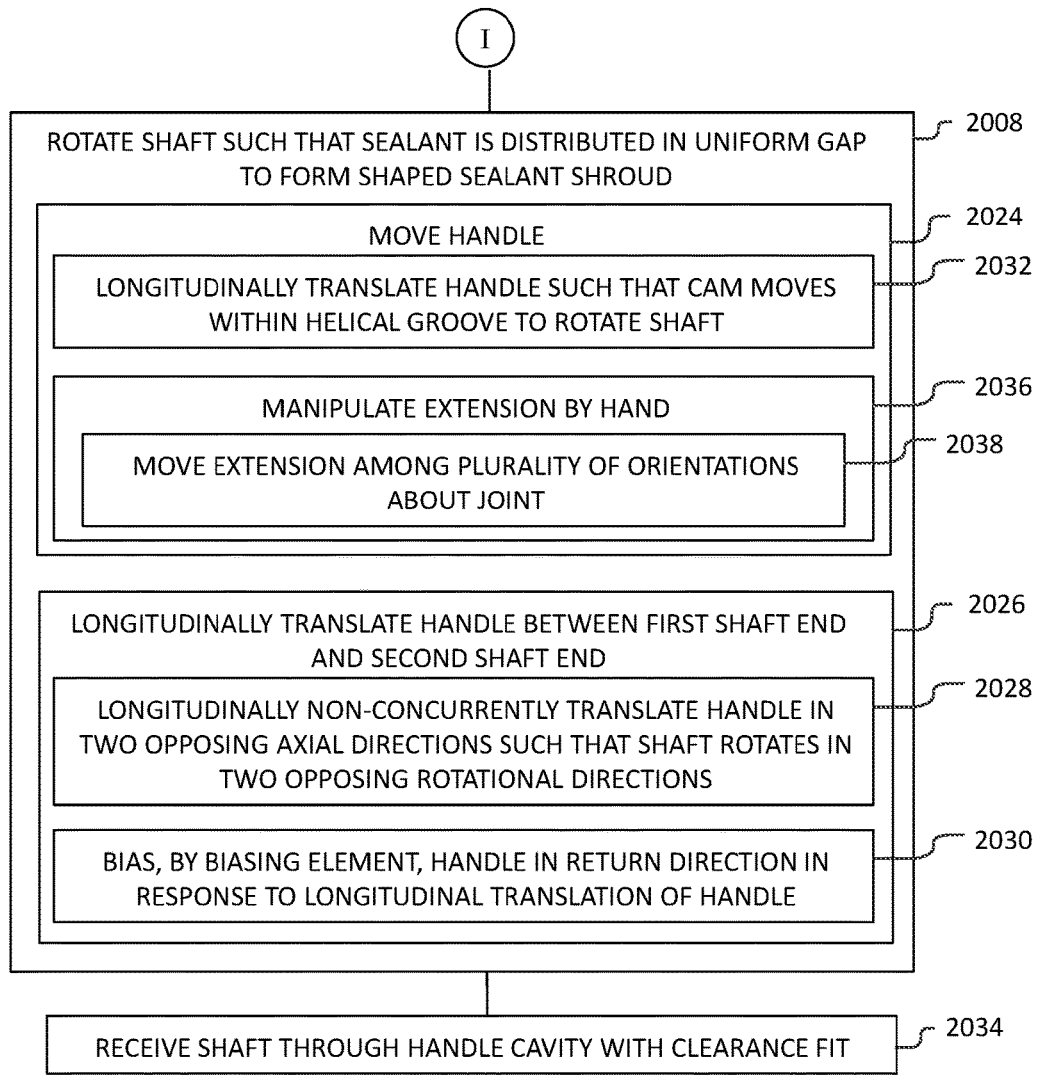
FIG. 20B
(CONTINUED FROM 20A)

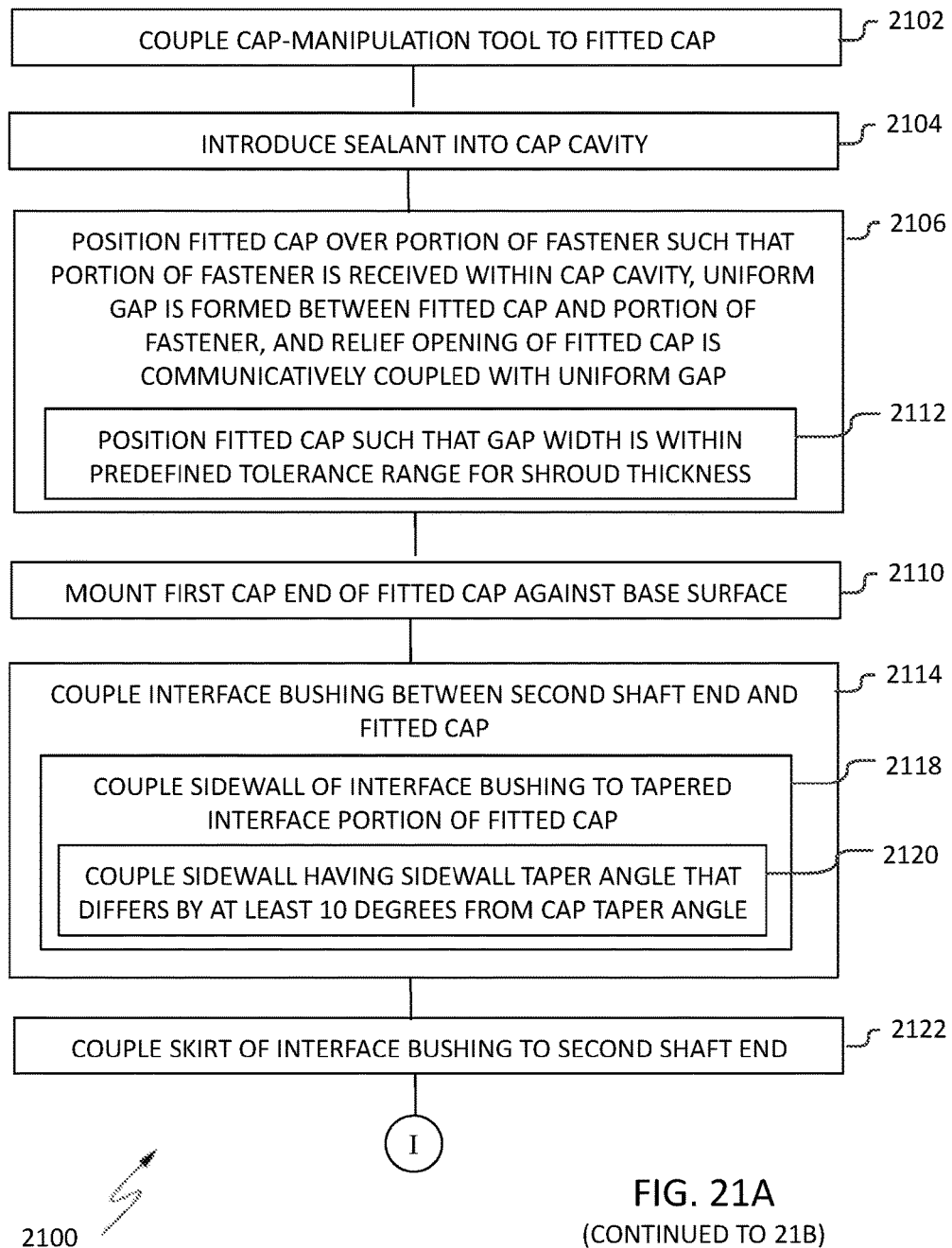

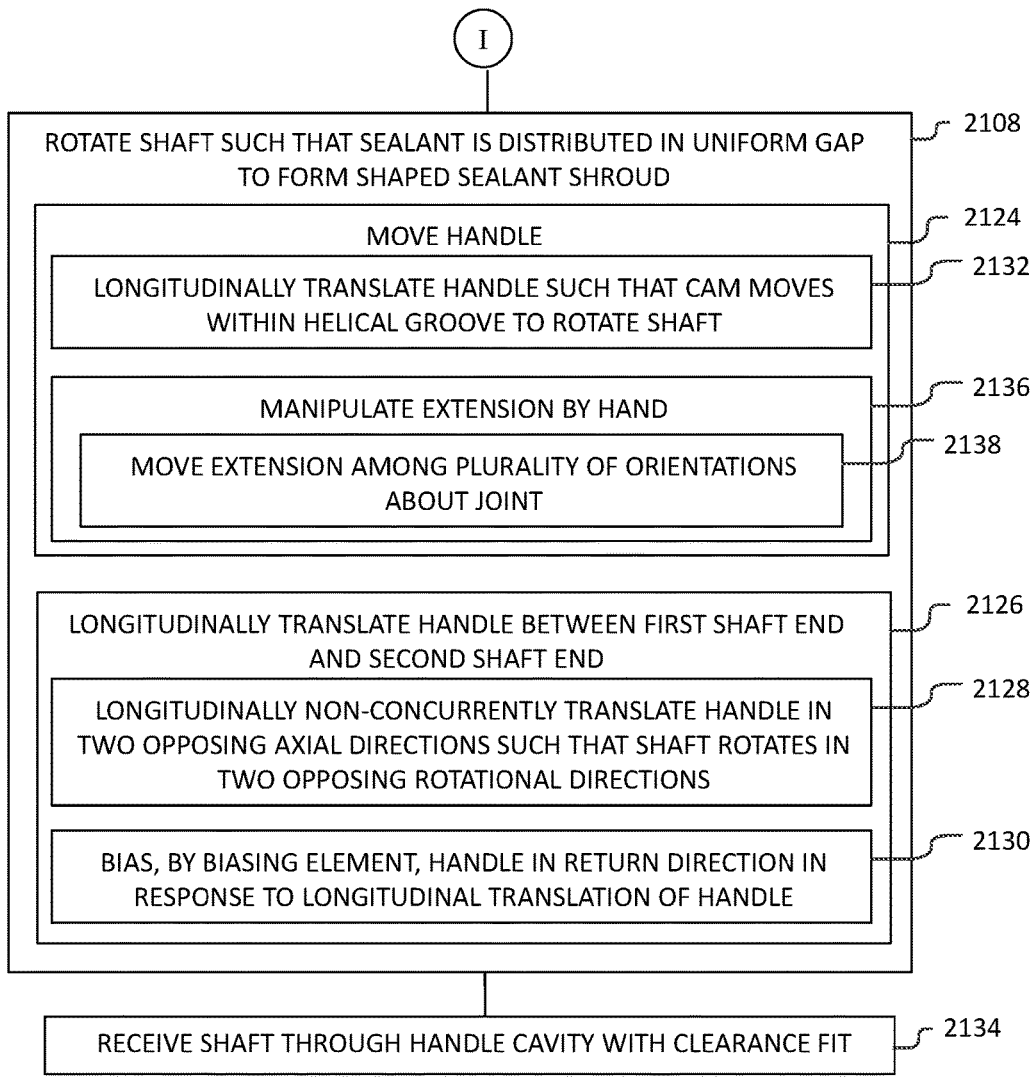
FIG. 21B
(CONTINUED FROM 21A)

SYSTEMS AND METHODS FOR MAKING AND USING A FITTED CAP FOR APPLYING A SHAPED SEALANT SHROUD TO A PORTION OF A FASTENER

TECHNICAL FIELD

The present disclosure relates to systems and methods for making and using a fitted cap, configured to apply a shaped sealant shroud to a portion of a fastener.

BACKGROUND

During assembly of a structure, such as an aircraft or a component thereof, it is often required to apply a coating of sealant over exposed portions of fasteners, which secure the various joints of the structure. These exposed portions of fasteners often have irregular outer surfaces and the sealant is typically applied manually with a brush by a skilled operator to ensure proper coverage. However, manual brush sealing of fasteners is laborious and time consuming. Moreover, the quality of manual brush sealing is difficult to control and expensive rework is often required. Sealant applicators other than brushes are available, but such applicators still require manual control of a skilled operator to achieve seal coverage of desired quality. Moreover, methods of use and traceability of non-brush applicators are inconsistent among individual users, negatively affecting efficiency and initial product quality.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to a system for making a fitted cap. The fitted cap (300) is configured to apply a shaped sealant shroud to a portion of a fastener. The system comprises a support plate, comprising a first side, a second side, opposite the first side, and a first plurality of through-openings, penetrating the support plate from the first side through to the second side. The system also comprises a fastener template, dimensionally identical to the portion of the fastener and extending from the first side of the support plate such that the first plurality of through-openings is arranged about the fastener template. The system further comprises a precursor cap, comprising a first surface, geometrically complementary to the fastener template, and a second surface, opposite the first surface and parallel to the first surface. The system additionally comprises first means for heating a first polymer sheet to a specified temperature and second means for applying suction to the first polymer sheet, positioned a predetermined distance from the first side of the support plate and heated to the specified temperature by the first means, through the first plurality of through-openings from the second side of the support plate to vacuum-form the first polymer sheet over the precursor cap. The second means is configured to apply the suction such that (i) after vacuum-forming the first polymer sheet over the precursor cap, at least a portion of the first polymer sheet forms the fitted cap, and (ii) a first inner surface of the fitted cap is geometrically complementary to the second surface of the precursor cap.

The system provides for forming the fitted cap geometrically complementary to the second surface of the precursor cap, which in turn is parallel to the first surface of the precursor cap and thus geometrically complementary to the fastener template. The fitted cap as formed by the system creates the uniform gap between the fitted cap and the portion of the fastener with the fitted cap positioned over the fastener. The fitted cap thus facilitates continuity and uniformity of application of the sealant over the portion of the fastener, as compared to, for example, manual brush application of the sealant.

Another example of the subject matter according to the invention relates to a system for applying a shaped sealant shroud to a portion of a fastener. The system comprises a fitted cap, comprising a wall and positionable over the portion of the fastener such that a uniform gap is formed between the wall and the portion of the fastener. The fitted cap further comprises (i) an inlet opening, fully penetrating the wall, such that the inlet opening is configured to be communicatively coupled with the uniform gap, and (ii) a vent, fully penetrating the wall, such that the vent is configured to be communicatively coupled with the uniform gap. The inlet opening and the vent are spaced apart from each other along the wall. The system also comprises a cap-manipulation tool, comprising a shaft. The shaft has a longitudinal central axis and comprises a through, circumferentially closed, channel, configured to receive sealant and to communicate the sealant therethrough. The cap-manipulation tool is configured to couple to the fitted cap such that (i) the through, circumferentially closed, channel of the shaft is capable of communicating the sealant through the inlet opening of the fitted cap into the uniform gap, (ii) the vent is oriented to purge gas from the uniform gap as the sealant is communicated through the through, circumferentially closed, channel into the uniform gap, and (iii) the fitted cap is rotatable together with the shaft about the longitudinal central axis of the shaft to distribute the sealant in the uniform gap to form the shaped sealant shroud around the portion of the fastener.

The system provides a cap-manipulation tool and a fitted cap as separate components that may be coupled together, enabling use of a single cap-manipulation tool with a variety of sizes and shapes of the fitted cap. It should be understood that each of a variety of sizes and shapes of the fitted cap may be designed for use with a respective size and type of the fastener. Also, the fitted cap being rotatable together with the shaft about the longitudinal central axis, with the fitted cap positioned over the portion of the fastener, facilitates even spreading of the sealant supplied through the through, circumferentially closed, channel over an entire surface of the portion of the fastener via a simple rotation of the shaft. For example, rotation of the shaft about the longitudinal central axis, with the fitted cap positioned over the portion of the fastener, tends to balance a distribution of the sealant around a circumference of the portion and/or to dynamically center the fitted cap over the portion of the fastener. Additionally, the inlet opening and the vent cooperate to facilitate purging gas from the uniform gap as the sealant is fed through the through, circumferentially closed, channel of the cap-manipulation tool, inhibiting the formation of air bubbles or other imperfections in the shaped sealant shroud.

Another example of the subject matter according to the invention relates to a system for applying a shaped sealant shroud to a portion of a fastener. The system comprises a fitted cap, comprising a wall, a cap cavity defined by the wall and configured to receive sealant therein, and a relief opening that fully penetrates the wall. The fitted cap is positionable over the portion of the fastener such that (i) the portion of the fastener is received within the cap cavity, (ii) a uniform gap is formed between the wall of the fitted cap and the portion of the fastener, and (iii) the relief opening is communicatively coupled with the uniform gap. The system also comprises a cap-manipulation tool, comprising a shaft. The shaft has a longitudinal central axis and comprises a through, circumferentially closed, channel. The cap-manipulation tool is configured to couple to the fitted cap such that (i) the through, circumferentially closed, channel of the shaft is communicatively coupled with the relief opening of the fitted cap and (ii) the fitted cap is rotatable together with the shaft about the longitudinal central axis of the shaft to distribute the sealant, previously introduced into the cap cavity, in the uniform gap to form the shaped sealant shroud around the portion of the fastener. The relief opening is oriented to purge at least one of gas or excess of the sealant from the uniform gap into the through, circumferentially closed, channel of the shaft.

The system provides a cap-manipulation tool and a fitted cap as separate components that may be coupled together, enabling use of a single cap-manipulation tool with a variety of sizes and shapes of the fitted cap. It should be understood that each of a variety of sizes and shapes of the fitted cap may be designed for use with a respective size and type of the fastener. Also, the fitted cap being rotatable together with the shaft about the longitudinal central axis, with the fitted cap positioned over the portion of the fastener, facilitates even spreading of the sealant supplied through the through, circumferentially closed, channel over an entire surface of the portion of the fastener via a simple rotation of the shaft. For example, rotation of the shaft about the longitudinal central axis, with the fitted cap positioned over the portion of the fastener, tends to balance a distribution of the sealant around a circumference of the portion and/or to dynamically center the fitted cap over the portion of the fastener. Additionally, the relief opening and the through, circumferentially closed, channel of the shaft cooperate to facilitate purging gas and/or excess sealant from the uniform gap, inhibiting the formation of air bubbles or other imperfections in the shaped sealant shroud.

Another example of the subject matter according to the invention relates to a method of making a fitted cap. The fitted cap is configured to apply a shaped sealant shroud to a portion of a fastener. The method comprises covering a fastener template with a precursor cap. The fastener template extends from a first side of a support plate. The support plate comprises a second side, opposite the first side, and a first plurality of through-openings, penetrating the support plate from the first side through to the second side and arranged about the fastener template. The precursor cap comprises a first surface, geometrically complementary to the fastener template, and a second surface, opposite the first surface and parallel to the first surface. The fastener template is dimensionally identical to the portion of the fastener. The method also comprises heating a first polymer sheet to a specified temperature and applying suction to the first polymer sheet, positioned a predetermined distance from the first side of the support plate and heated to the specified temperature, through the first plurality of through-openings from the second side of the support plate to vacuum-form the first polymer sheet over the precursor cap. After vacuum-forming the first polymer sheet over the precursor cap, at least a portion of the first polymer sheet forms the fitted cap, and a first inner surface of the fitted cap is geometrically complementary to the second surface of the precursor cap.

The fitted cap formed geometrically complementary to the second surface of the precursor cap, which in turn is parallel to the first surface of the precursor cap and thus geometrically complementary to the fastener template, creates the uniform gap between the fitted cap and the portion of the fastener with the fitted cap positioned over fastener. The fitted cap thus facilitates continuity and uniformity of application of the sealant over the portion of the fastener, as compared to, for example, manual brush application of the sealant.

Another example of the subject matter according to the invention relates to a method for applying a shaped sealant shroud to a portion of a fastener. The method comprises positioning a fitted cap, comprising a wall, over the portion of the fastener such that a uniform gap is formed between the wall of the fitted cap and the portion of the fastener. The fitted cap further comprises (i) an inlet opening, fully penetrating the wall, such that the inlet opening is configured to be communicatively coupled with the uniform gap, and (ii) a vent, fully penetrating the wall, such that the vent is configured to be communicatively coupled with the uniform gap. The inlet opening and the vent are spaced apart from each other along the wall. The method also comprises coupling a cap-manipulation tool to the fitted cap. The cap-manipulation tool comprises a shaft, and the shaft comprises a through, circumferentially closed, channel, configured to be communicatively coupled with the inlet opening of the fitted cap. The method further comprises supplying sealant into the through, circumferentially closed, channel of the shaft, through the inlet opening of the fitted cap and into the uniform gap. The vent is oriented to purge gas from the uniform gap as the sealant is communicated through the through, circumferentially closed, channel and into the uniform gap. The method further comprises rotating the shaft about a longitudinal central axis of the shaft. The fitted cap rotates together with the shaft such that the sealant is distributed in the uniform gap to form the shaped sealant shroud around the portion of the fastener.

Providing the cap-manipulation tool and the fitted cap as separate components that may be coupled together enables use of a single cap-manipulation tool with a variety of sizes and shapes of the fitted cap. It should be understood that each of a variety of sizes and shapes of the fitted cap may be designed for use with a respective size and type of fastener. Also, the fitted cap being rotatable together with the shaft about the longitudinal central axis, with the fitted cap positioned over the portion of the fastener, facilitates even spreading of the sealant supplied through the through, circumferentially closed, channel over an entire surface of the portion of the fastener via a simple rotation of the shaft. For example, rotation of the shaft about the longitudinal central axis, with the fitted cap positioned over the portion of the fastener, tends to balance a distribution of the sealant around a circumference of the portion and/or to dynamically center the fitted cap over the portion of the fastener. Additionally, the inlet opening and the vent cooperate to facilitate purging gas from the uniform gap as the sealant is fed through the through, circumferentially closed, channel of the cap-manipulation tool, inhibiting the formation of air bubbles or other imperfections in the shaped sealant shroud.

Another example of the subject matter according to the invention relates to a method for applying a shaped sealant shroud to a portion of a fastener. The method comprises coupling a cap-manipulation tool to a fitted cap. The fitted cap comprises a wall, a cap cavity, defined by the wall, and a relief opening that fully penetrates the wall. The cap-manipulation tool comprises a shaft, and the shaft comprises a through, circumferentially closed, channel, configured to be communicatively coupled with the relief opening of the fitted cap. The method also comprises introducing sealant into the cap cavity and positioning the fitted cap over the portion of the fastener such that (i) the portion is received within the cap cavity, (ii) a uniform gap is formed between the wall of the fitted cap and the portion of the fastener, and (iii) the relief opening of the fitted cap is communicatively coupled with the uniform gap. The method further comprises rotating the shaft about a longitudinal central axis of the shaft. The fitted cap rotates together with the shaft such that the sealant, previously introduced into the cap cavity, is distributed in the uniform gap to form the shaped sealant shroud around the portion of the fastener. The relief opening is oriented to purge at least one of gas or excess of the sealant from the uniform gap.

Providing the cap-manipulation tool and the fitted cap as separate components that may be coupled together enables use of a single cap-manipulation tool with a variety of sizes and shapes of the fitted cap. It should be understood that each of a variety of sizes and shapes of the fitted cap may be designed for use with a respective size and type of fastener. Also, the fitted cap being rotatable together with the shaft about the longitudinal central axis, with the fitted cap positioned over the portion of the fastener, facilitates even spreading of the sealant supplied through the through, circumferentially closed, channel over an entire surface of the portion of the fastener via a simple rotation of the shaft. For example, rotation of the shaft about the longitudinal central axis, with the fitted cap positioned over the portion of the fastener, tends to balance a distribution of the sealant around a circumference of the portion and/or to dynamically center the fitted cap over the portion of the fastener. Additionally, the relief opening and the through, circumferentially closed, channel of the shaft cooperate to facilitate purging gas and/or excess sealant from the uniform gap, inhibiting the formation of air bubbles or other imperfections in the shaped sealant shroud.

BRIEF DESCRIPTION OF THE DRAWINGS

Figure 1:
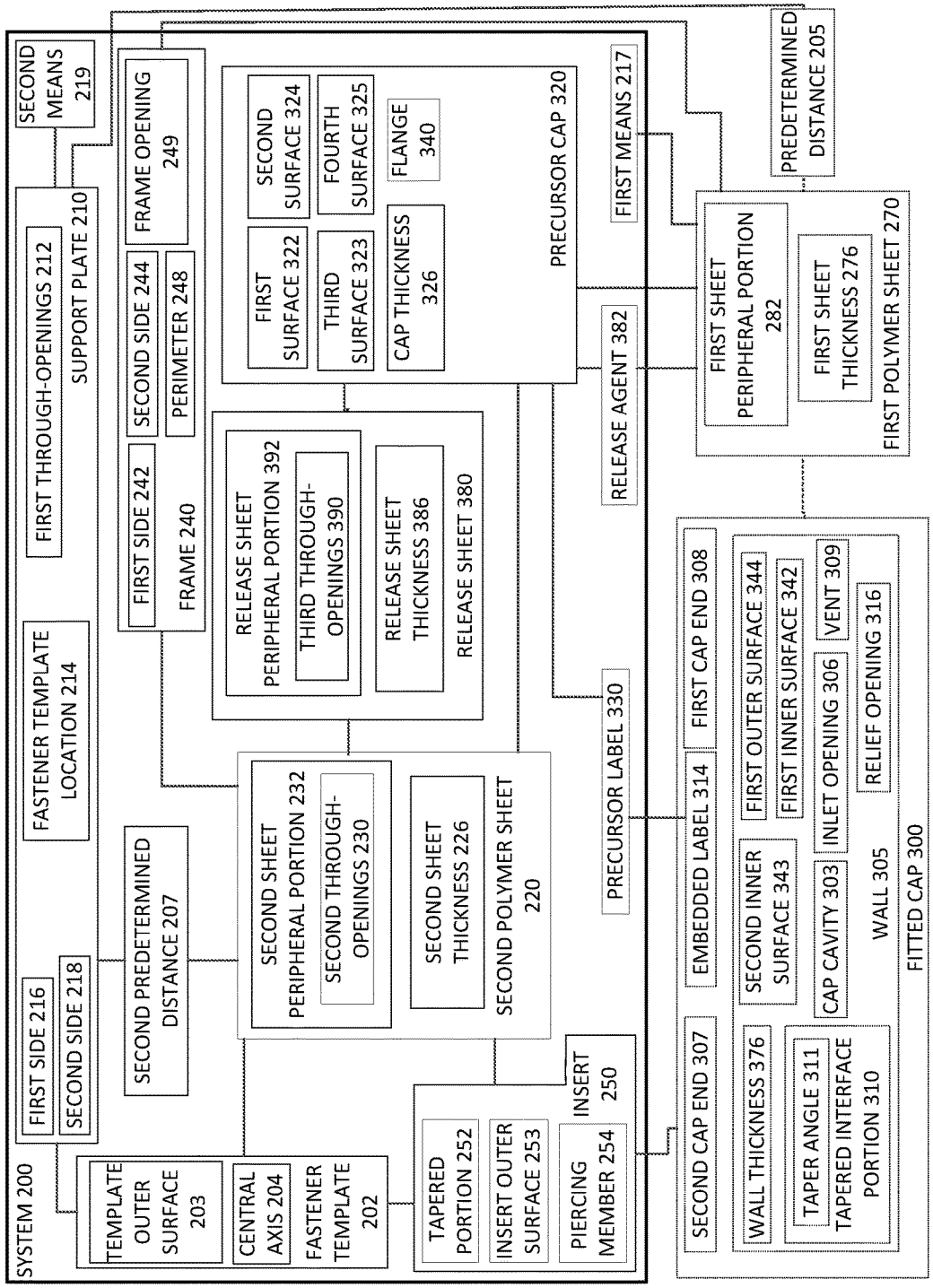
Figure 2:
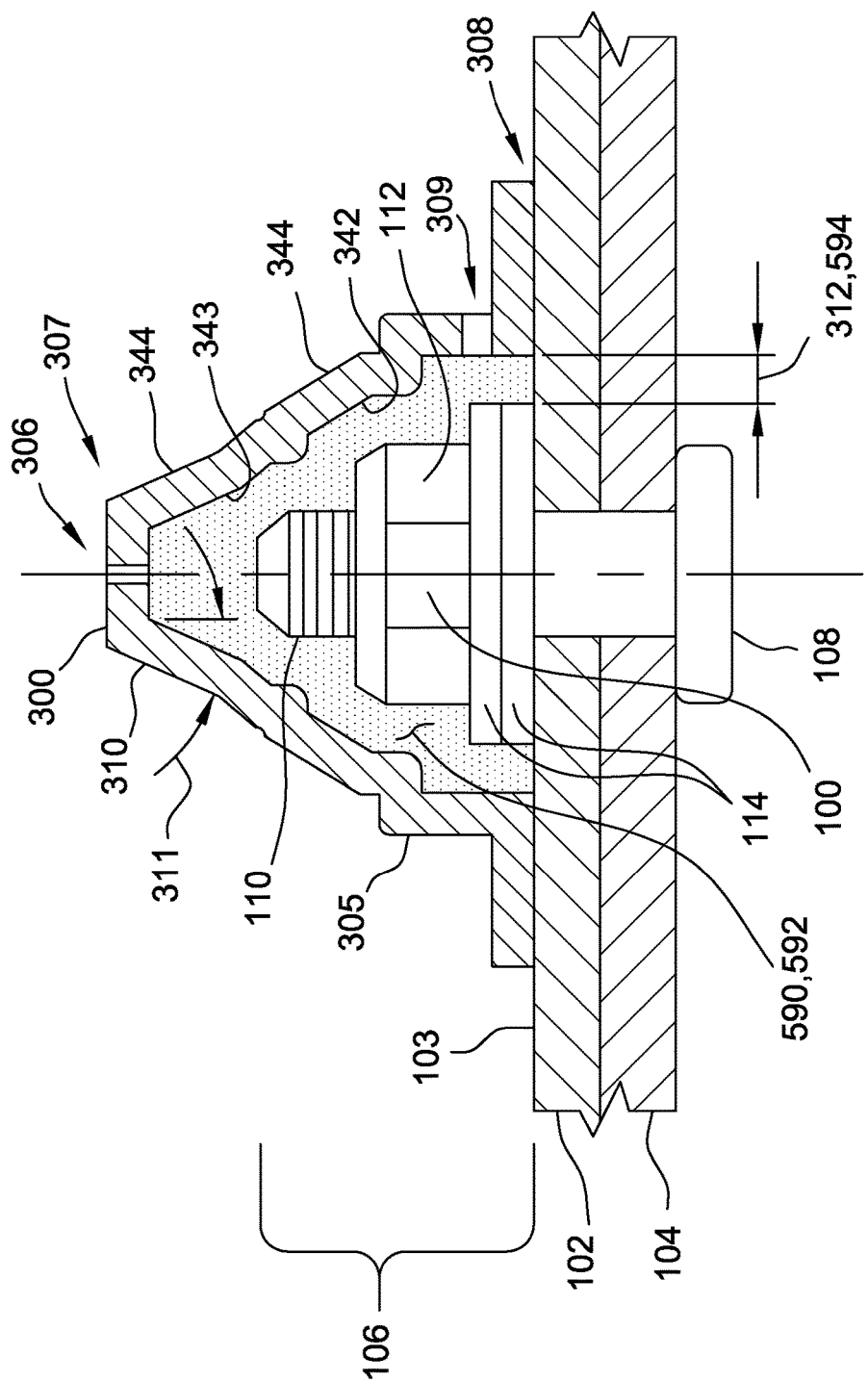
Figure 3:
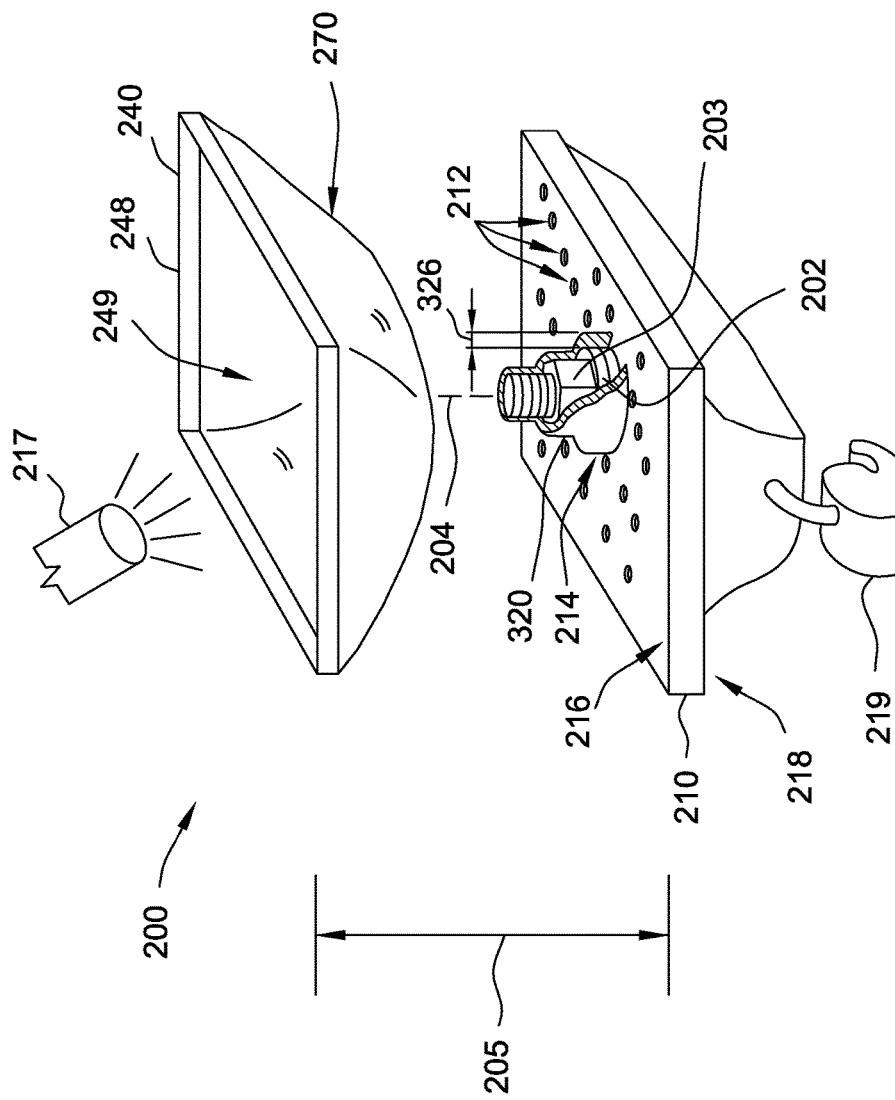
Figure 7:
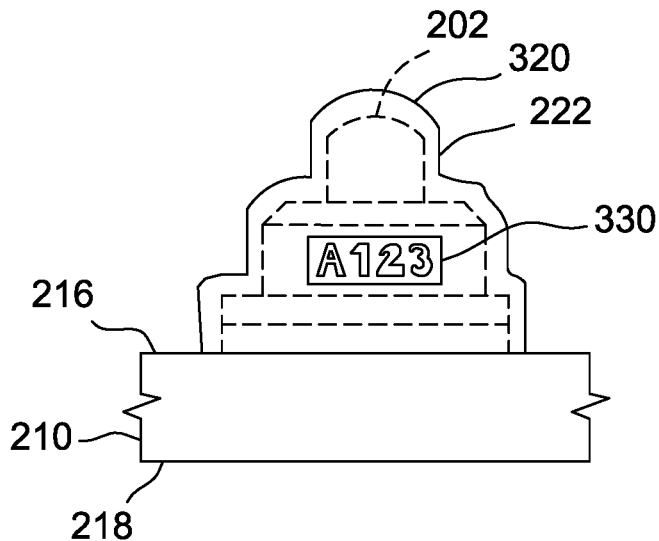
Figure 8:
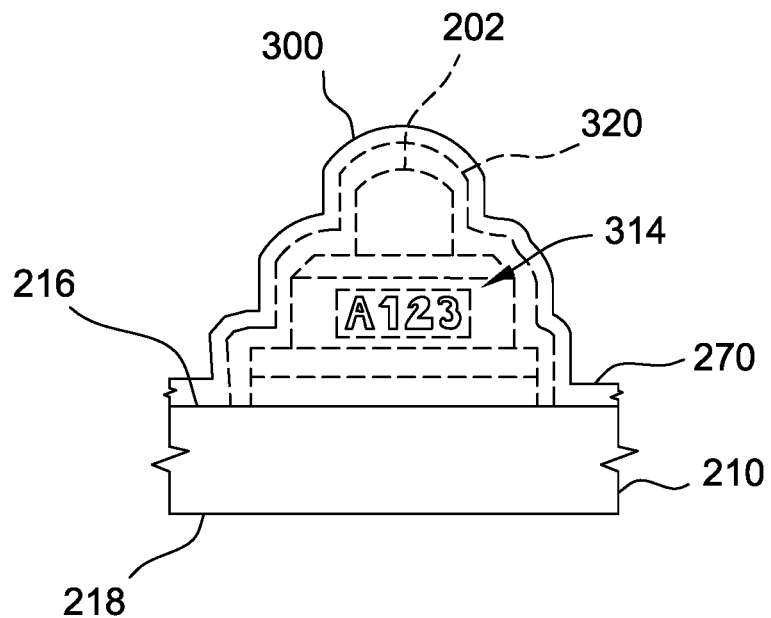
Figure 9:
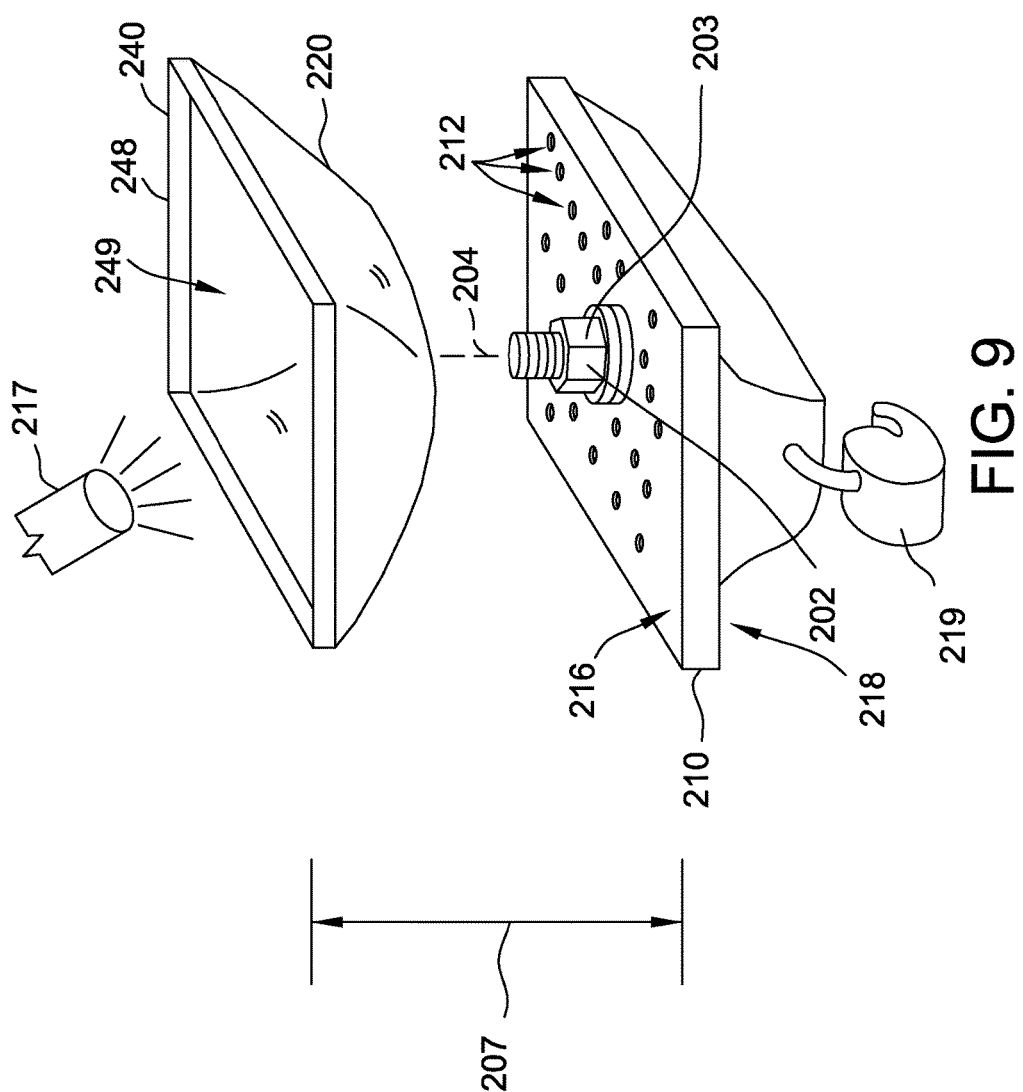
Figure 10:
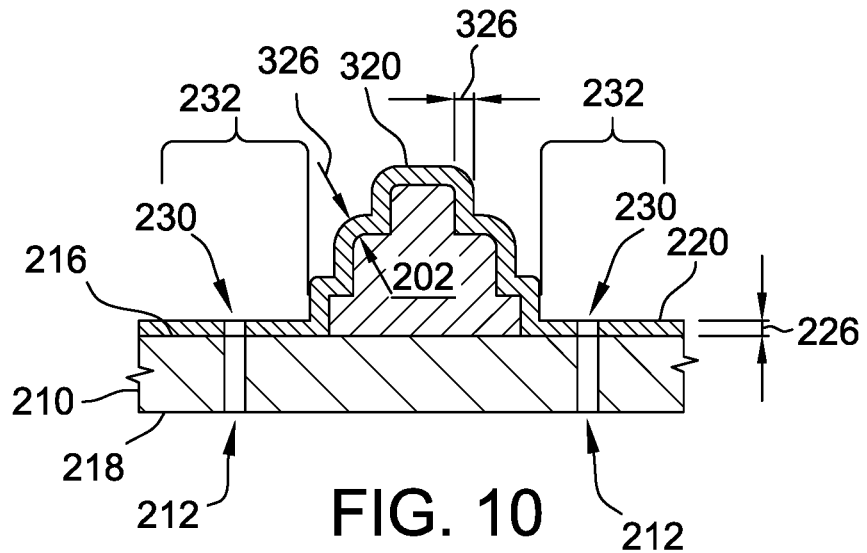
Figure 11:
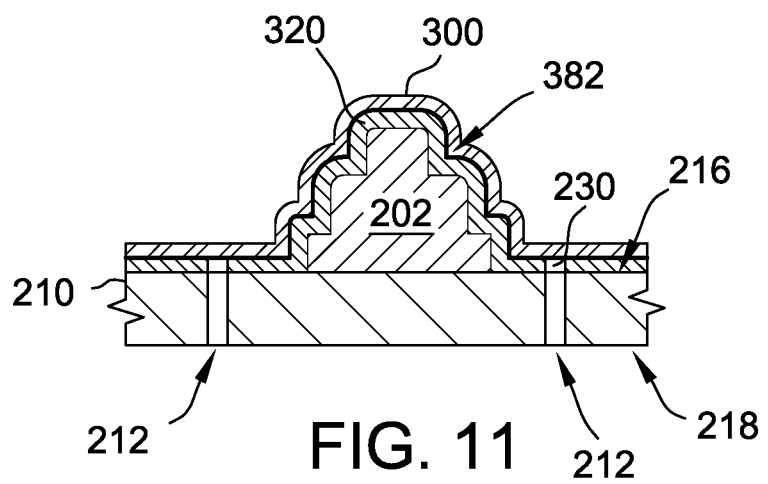
Figure 12:
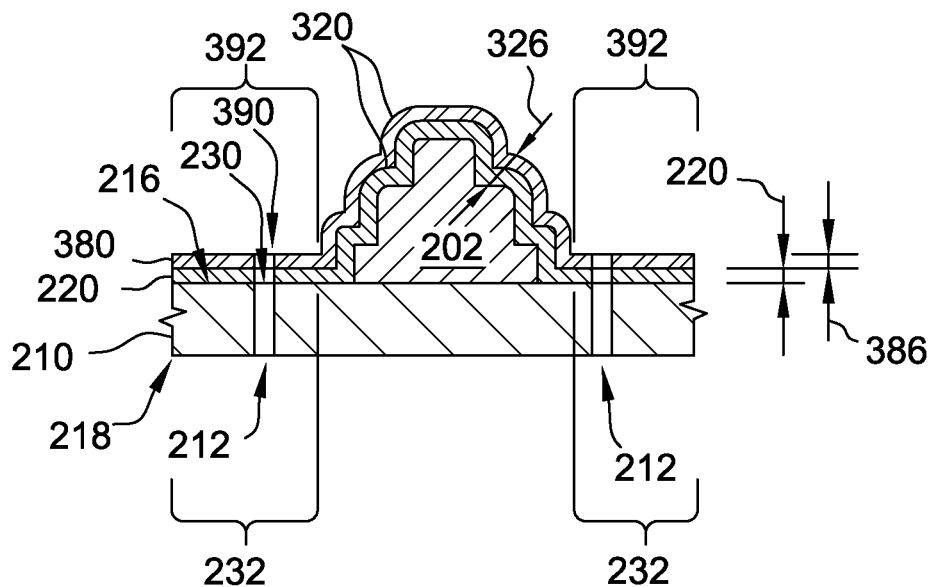
Figure 13:
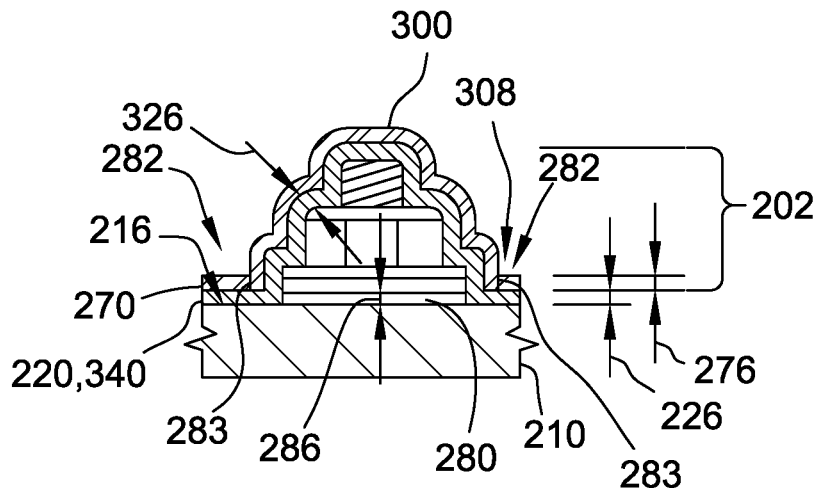
Figure 14:
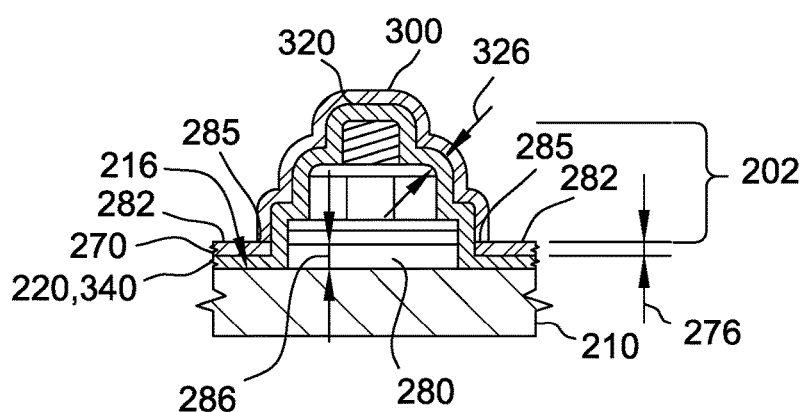
Figure 15:
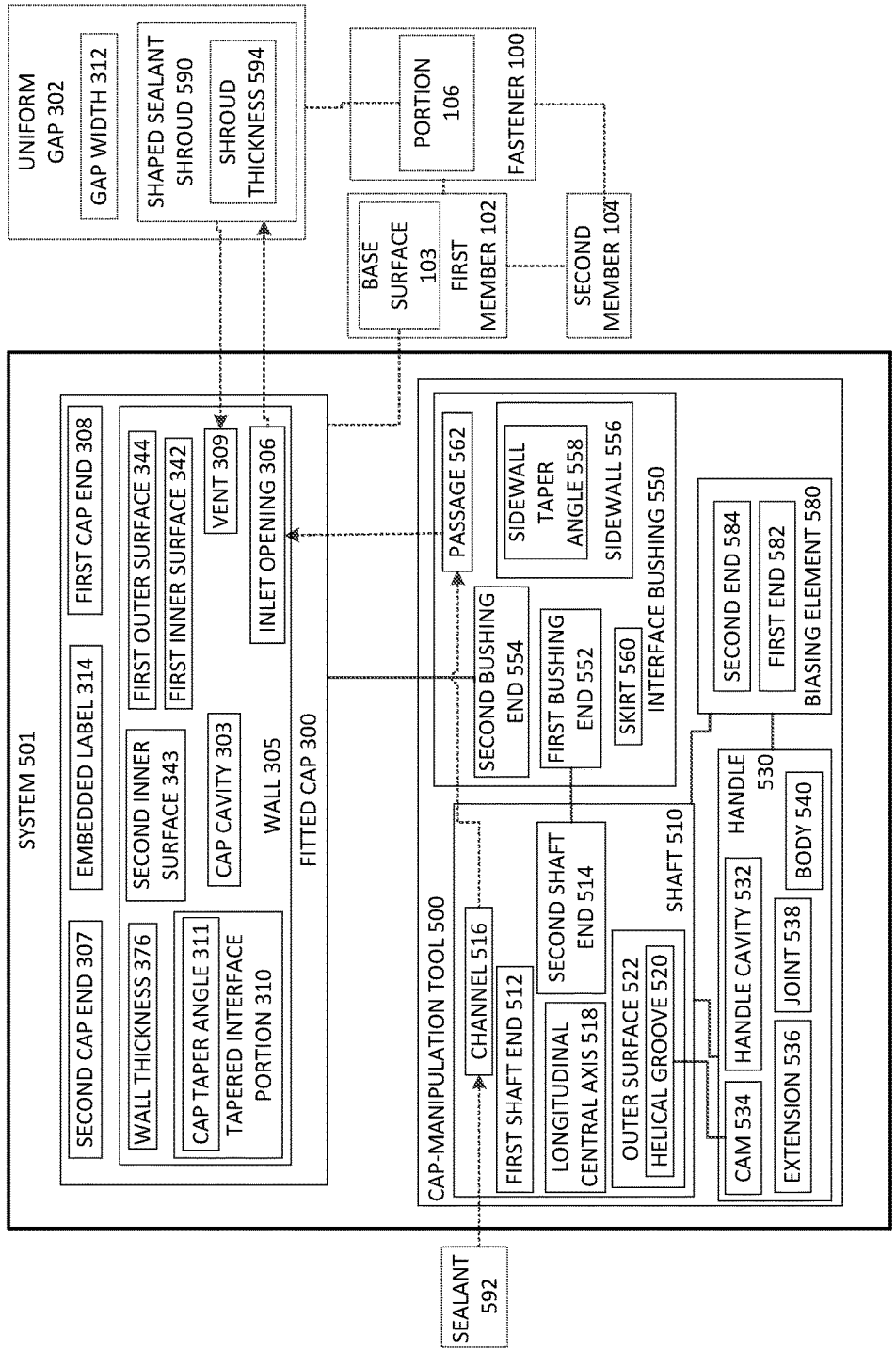
Figure 16:
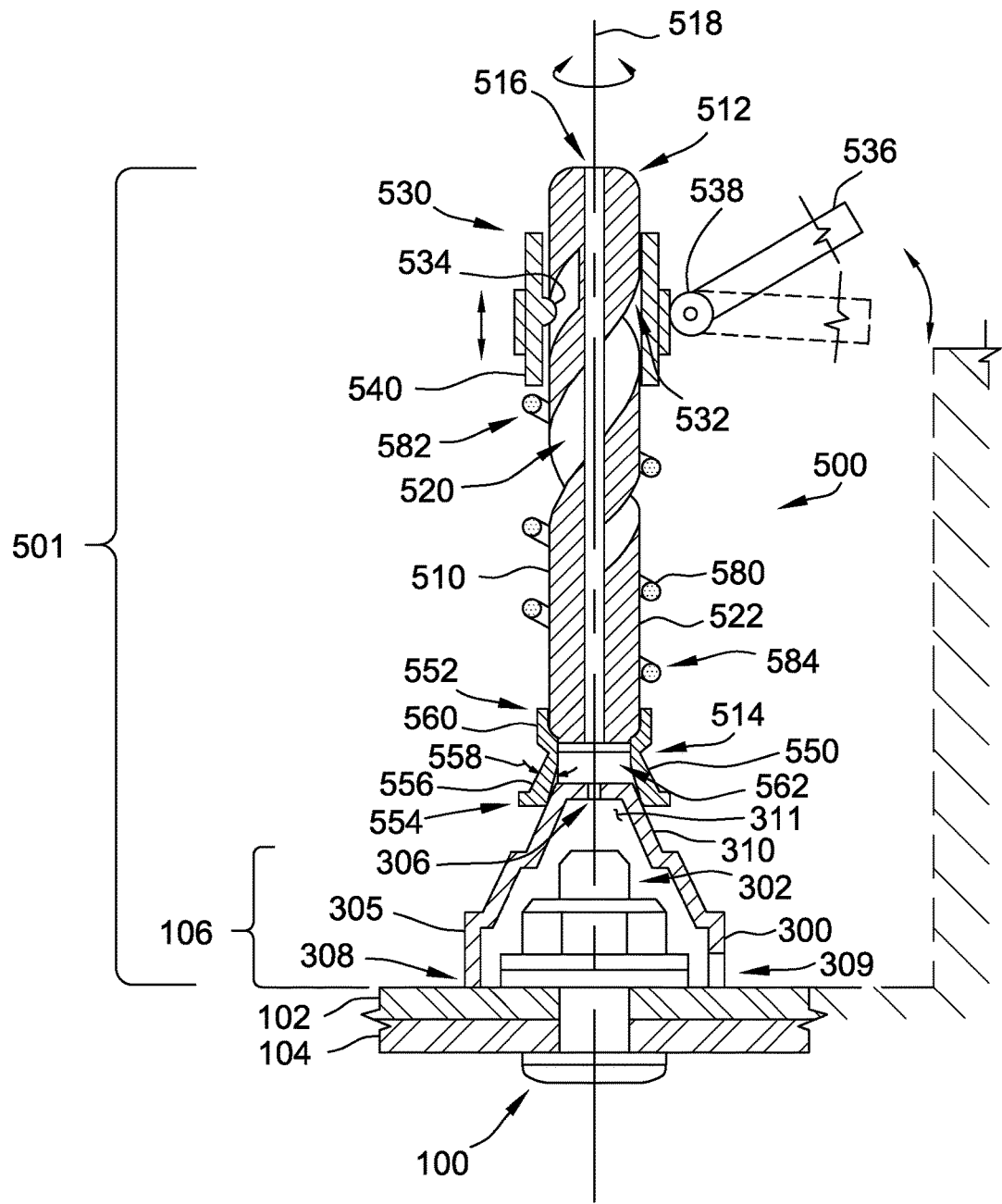
Figure 17:
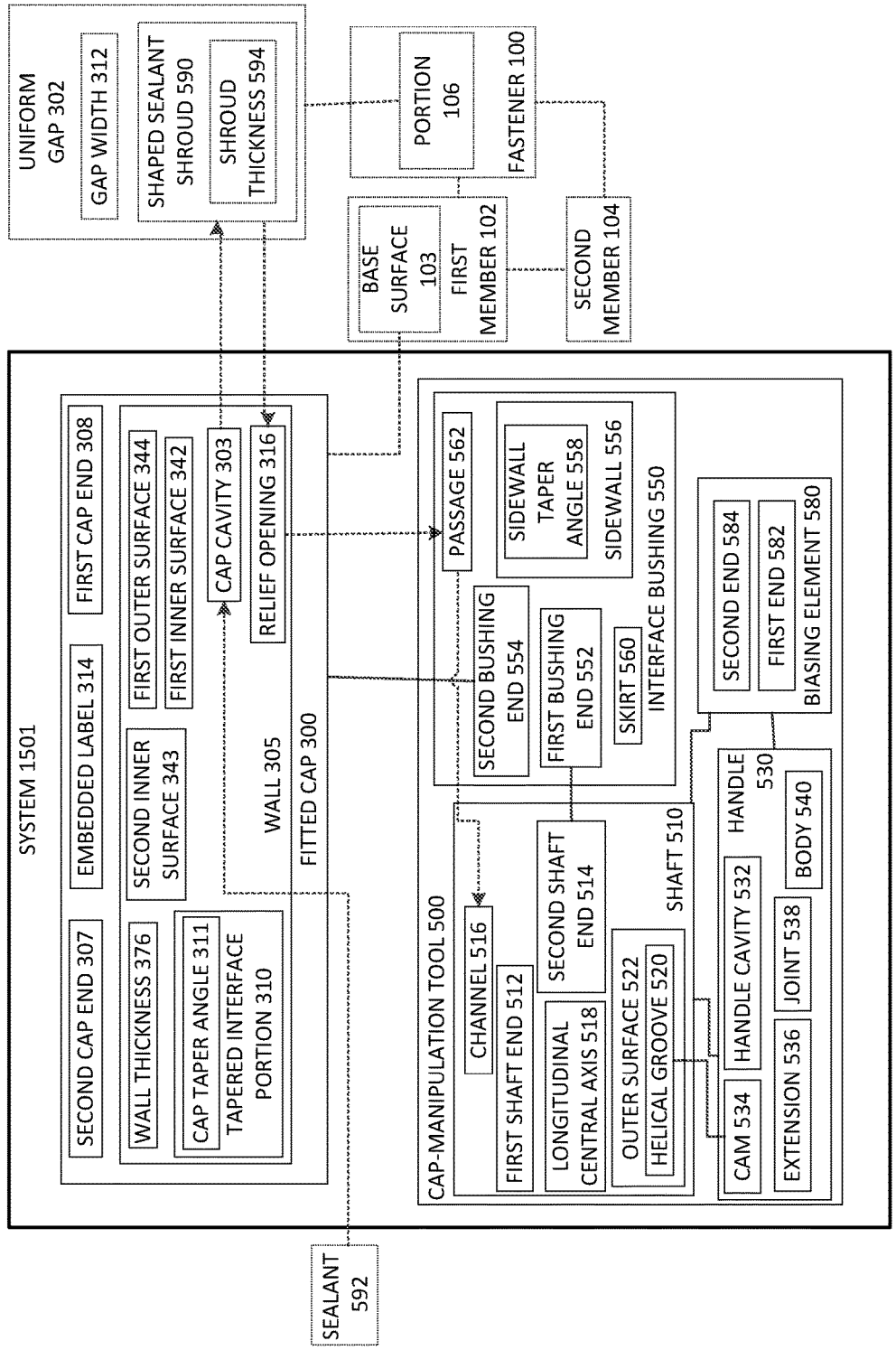
Figure 18:
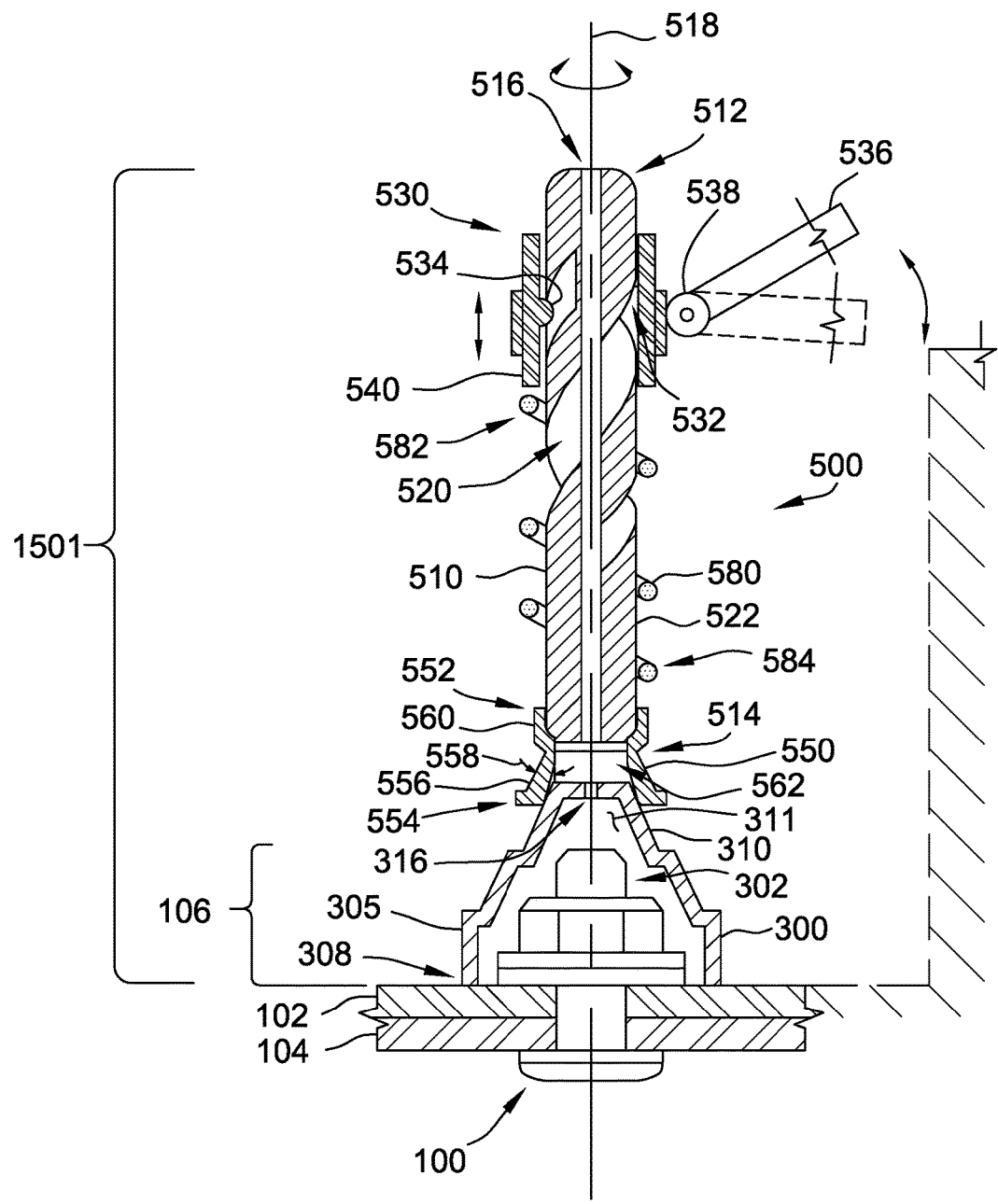
Figure 19A:
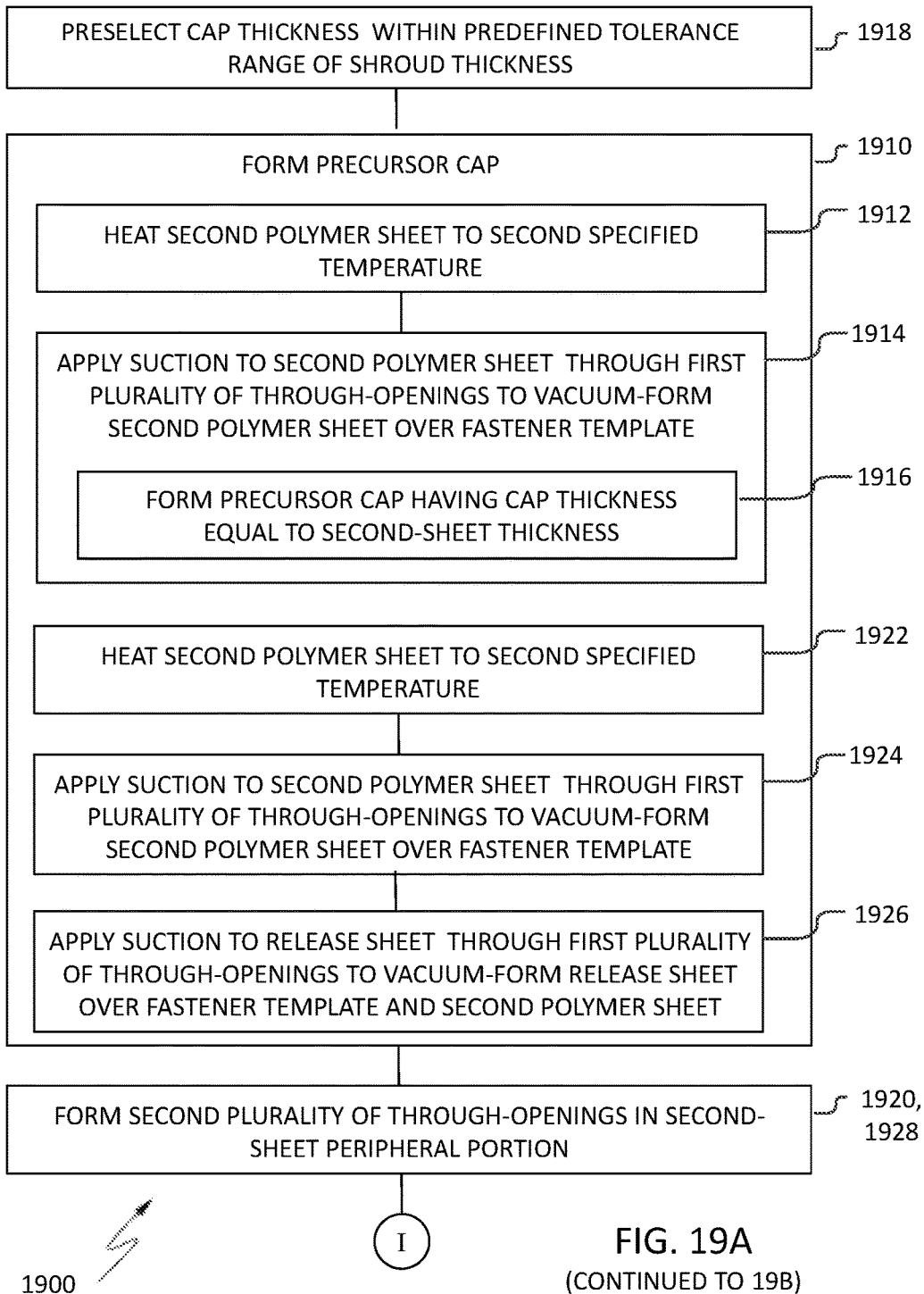
Figure 20A:
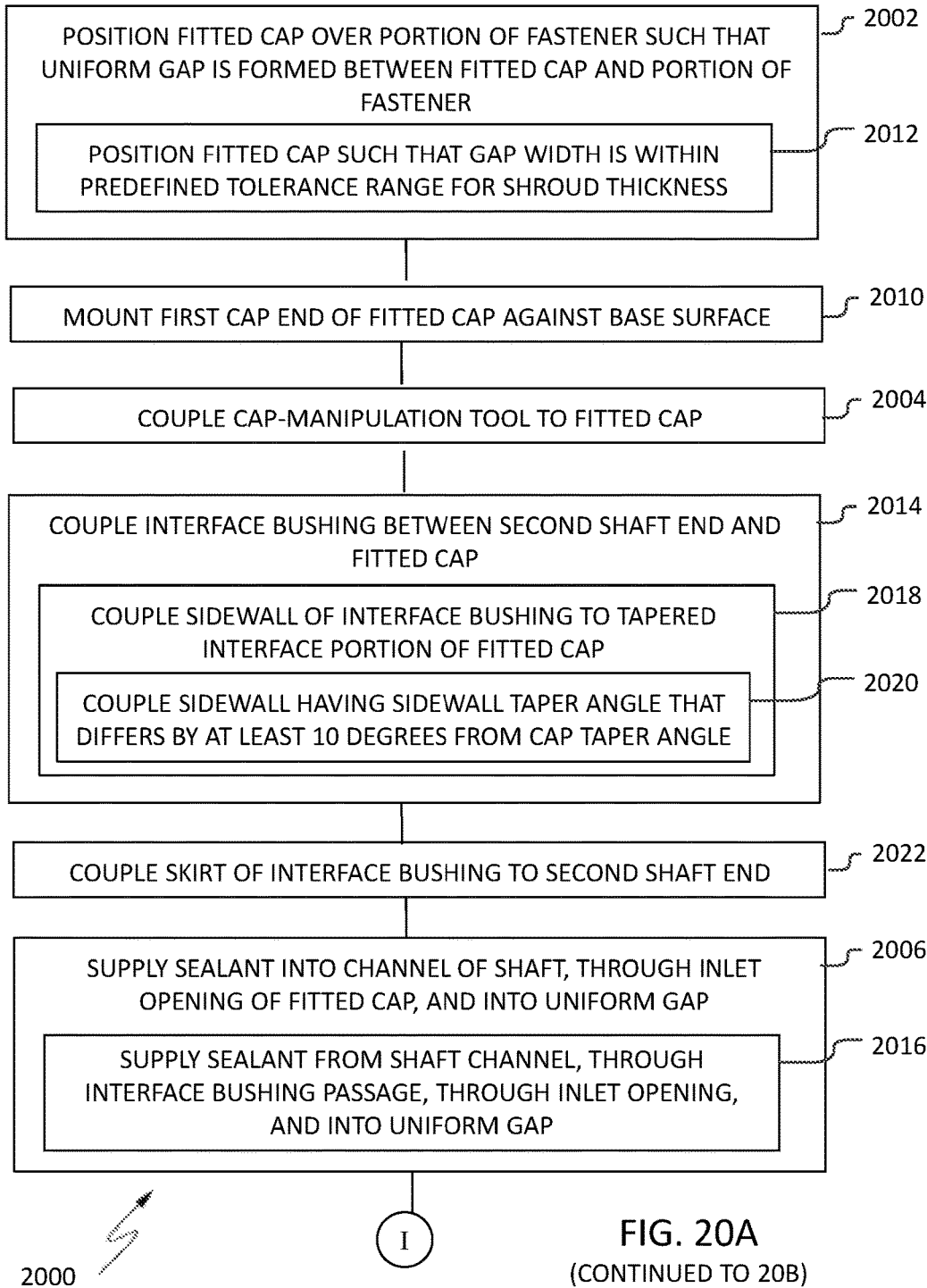
Figure 22:
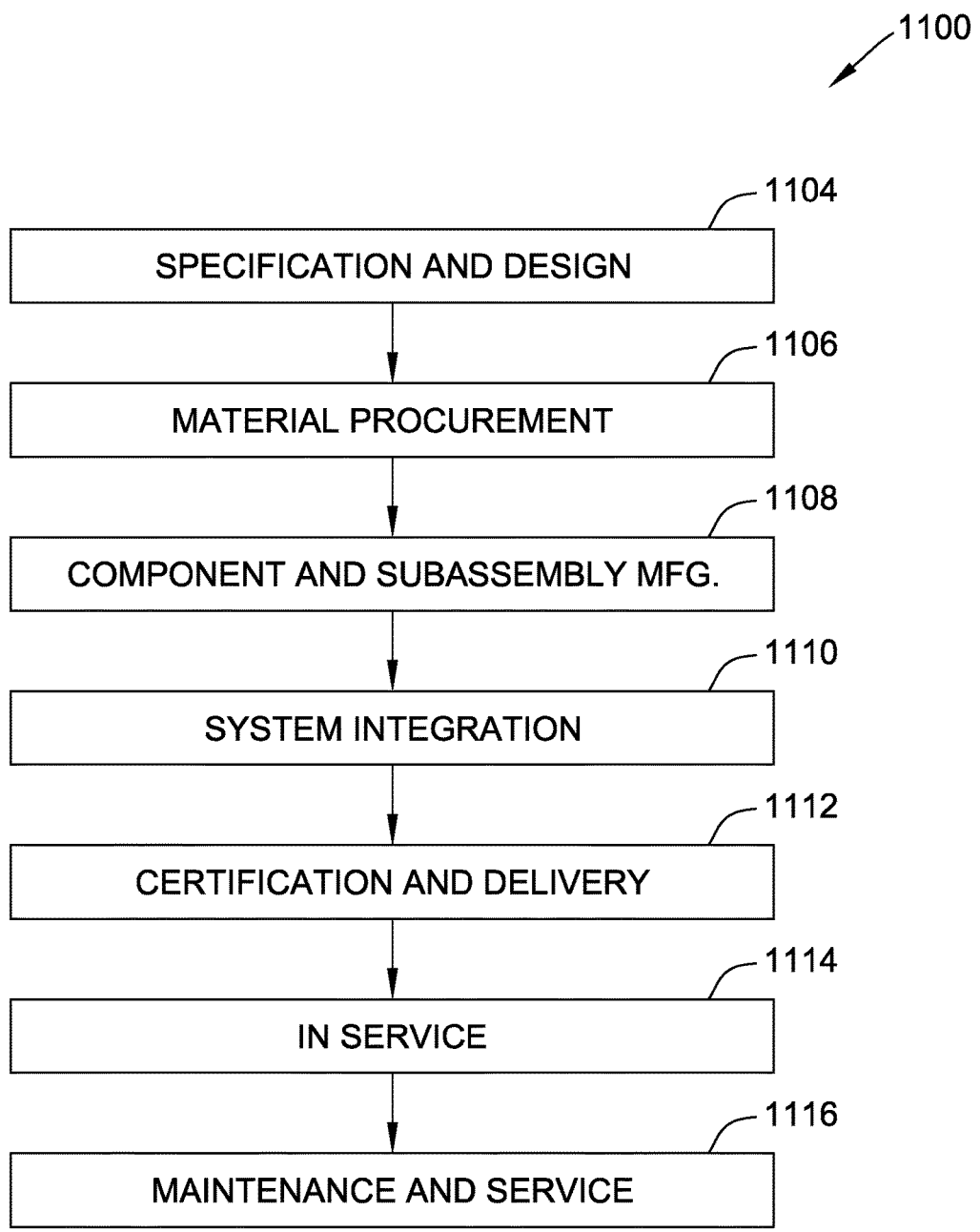

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram of a system for making a fitted cap, the fitted cap configured to apply a shaped sealant shroud to a portion of a fastener, according to one or more examples of the present disclosure;

FIG. 2 is a schematic, elevation, partial cutaway view of a fitted cap formed by the system of FIG. 1, positioned over a fastener, according to one or more examples of the present disclosure;

FIG. 3 is a schematic, perspective view of the system of FIG. 1, according to one or more examples of the present disclosure;

FIG. 4 is a schematic, elevation, partial cutaway view of a sub-assembly of the system of FIG. 1, according to one or more examples of the present disclosure;

FIG. 5 is a schematic, elevation, partial cutaway view of a sub-assembly of the system of FIG. 1, according to one or more examples of the present disclosure;

FIG. 6 is a schematic, perspective view of a sub-assembly of the system of FIG. 1, according to one or more examples of the present disclosure;

FIG. 7 is a schematic, elevation view of a sub-assembly of the system of FIG. 1, according to one or more examples of the present disclosure;

FIG. 8 is a schematic, elevation view of a fitted cap as formed on a sub-assembly of the system of FIG. 1, according to one or more examples of the present disclosure;

FIG. 9 is a schematic, perspective view of a sub-assembly of the system of FIG. 1, according to one or more examples of the present disclosure;

FIG. 10 is a schematic, elevation, sectional view of a sub-assembly of the system of FIG. 1, according to one or more examples of the present disclosure;

FIG. 11 is a schematic, elevation, sectional view of a fitted cap as formed on a sub-assembly of the system of FIG. 1, according to one or more examples of the present disclosure;

FIG. 12 is a schematic, elevation, sectional view of a sub-assembly of the system of FIG. 1, according to one or more examples of the present disclosure;

FIG. 13 is a schematic, elevation, partial cutaway view of a fitted cap as formed on a sub-assembly of the system of FIG. 1, according to one or more examples of the present disclosure;

FIG. 14 is a schematic, elevation, partial cutaway view of a fitted cap as formed on a sub-assembly of the system of FIG. 1, according to one or more examples of the present disclosure;

FIG. 15 is a block diagram of a system for applying a shaped sealant shroud to a portion of a fastener, according to one or more examples of the present disclosure;

FIG. 16 is a schematic, elevation, partial cutaway view of the system of FIG. 15, according to one or more examples of the present disclosure;

FIG. 17 is a block diagram of a system for applying a shaped sealant shroud to a portion of a fastener, according to one or more examples of the present disclosure;

FIG. 18 is a schematic, elevation, partial cutaway view of the system of FIG. 17, according to one or more examples of the present disclosure;

FIGS. 19A, 19B, 19C, and 19D, collectively, are a block diagram of a method of making a fitted cap utilizing the system of FIG. 1, the fitted cap configured to apply a shaped sealant shroud to a portion of a fastener, according to one or more examples of the present disclosure;

FIGS. 20A and 20B, collectively, are a block diagram of a method of applying a shaped sealant shroud to a portion of a fastener utilizing the system of FIG. 15, according to one or more examples of the present disclosure;

FIGS. 21A and 21B, collectively, are a block diagram of a method of applying a shaped sealant shroud to a portion of a fastener utilizing the system of FIG. 17, according to one or more examples of the present disclosure;

FIG. 22 is a block diagram of aircraft production and service methodology; and

Figure 23:
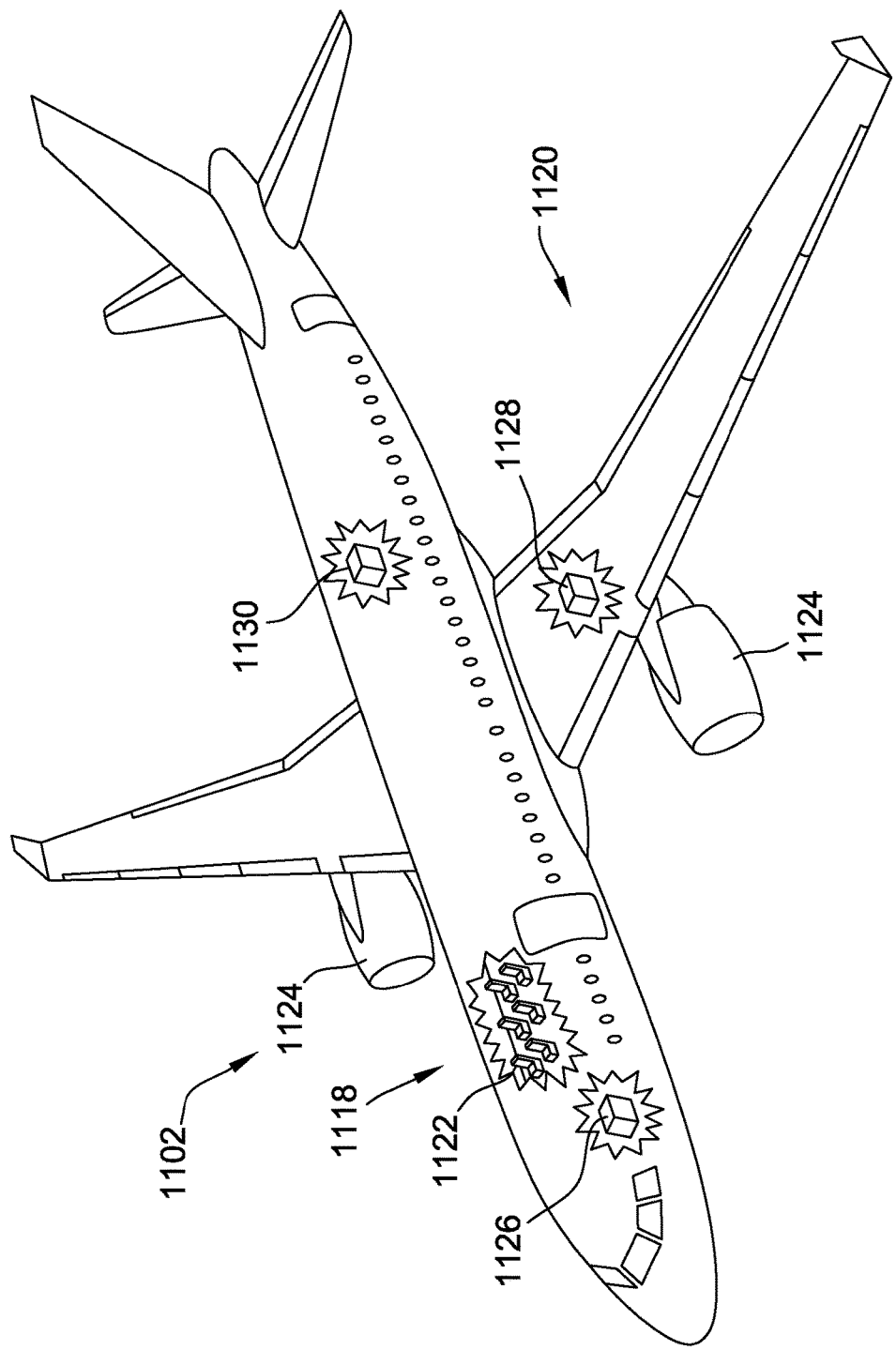

FIG. 23 is a schematic illustration of an aircraft.

DETAILED DESCRIPTION

In FIGS. 1, 15, and 17, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1, 15, and 17 may be combined in various ways without the need to include other features described in FIGS. 1, 15, and 17, other drawing figures, and/or the accompanying disclosure, even though such combination or combinations are not explicitly illustrated herein. Similarly, additional features not limited to the examples presented, may be combined with some or all of the features shown and described herein.

In FIGS. 19A, 19B, 19C, 19D 20A, 20B, 21A, 21B, and 22, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 19A, 19B, 19C, 19D 20A, 20B, 21A, 21B, and 22 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-4, system 200 for making fitted cap 300 is disclosed. Fitted cap 300 is configured to apply shaped sealant shroud 590 to portion 106 of fastener 100. System 200 comprises support plate 210. Support plate 210 comprises first side 216 and second side 218, opposite first side 216. Support plate 210 also comprises first plurality of through-openings 212, penetrating support plate 210 from first side 216 through to second side 218. System 200 further comprises fastener template 202, dimensionally identical to portion 106 of fastener 100 and extending from first side 216 of support plate 210 such that first plurality of through-openings 212 is arranged about fastener template 202. System 200 also comprises precursor cap 320, comprising first surface 322, geometrically complementary to fastener template 202, and second surface 324, opposite first surface 322 and parallel to first surface 322. System 200 additionally comprises first means 217 for heating first polymer sheet 270 to a specified temperature. System 200 further comprises second means 219 for applying suction to first polymer sheet 270, positioned predetermined distance 205 from first side 216 of support plate 210 and heated to the specified temperature by first means 217, through first plurality of through-openings 212 from second side 218 of support plate 210 to vacuum-form first polymer sheet 270 over precursor cap 320. Second means 219 is configured to apply the suction such that, (i) after vacuum-forming first polymer sheet 270 over precursor cap 320, at least a portion of first polymer sheet 270 forms fitted cap 300 and (ii) first inner surface 342 of fitted cap 300 is geometrically complementary to second surface 324 of precursor cap 320. The preceding subject matter of this paragraph characterizes example 1 of the present disclosure.

System 200 provides for forming fitted cap 300 geometrically complementary to second surface 324 of precursor cap 320, which in turn is parallel to first surface 322 of precursor cap 320 and thus geometrically complementary to fastener template 202. Fitted cap 300 as formed by system 200 creates uniform gap 302 between fitted cap 300 and portion 106 of fastener 100 with fitted cap 300 positioned over fastener 100. Fitted cap 300 thus facilitates continuity and uniformity of application of sealant 592 over portion 106 of fastener 100, as compared to, for example, manual brush application of sealant 592.

The term "arranged about" as used herein means "around" or "on all sides." For example, fastener template 202 is coupled to first side 216 of support plate 210 at fastener template location 214 defined on first side 216, and first plurality of through-openings 212 are arranged on first side 216 around, and on all sides of, fastener template location 214.

The term "dimensionally identical" as used herein does not require dimensionally identical to a perfect degree, but rather also includes dimensionally identical to a substantial degree, such as dimensionally identical to within a tolerance level associated with apparatus and methods suitable for forming fastener template 202. In an example, fastener template 202 is a specimen of the same type and size of fastener 100 for which fitted cap 300 is desired to be used. In other words, fastener template 202 is simply a specimen of fastener 100 coupled to support plate 210 at fastener template location 214. In this example, "dimensionally identical" means dimensionally identical to within a machining tolerance associated with the manufacture of fastener 100. Alternatively, fastener template 202 is formed to in any suitable fashion, and "dimensionally identical" means dimensionally identical to within a machining tolerance associated with the corresponding method of manufacture of fastener template 202.

The term "geometrically complementary" as used herein does not require geometrically complementary to a perfect degree, but rather also includes geometrically complementary to a substantial degree, such as geometrically complementary to within a tolerance level associated with the shapes obtainable by apparatus for vacuum-forming thermoplastic sheets suitable for the systems and methods described herein. The term "parallel" as used herein does not require parallel to a perfect degree, but rather also includes parallel to a substantial degree, such as parallel to within a tolerance level associated with the shapes obtainable by apparatus for vacuum-forming thermoplastic sheets suitable for the systems and methods described herein. The term "uniform gap" does not require uniform to a perfect degree, but rather also includes uniform to a substantial degree, such as uniform to within a tolerance level associated with the shapes obtainable by apparatus for vacuum-forming thermoplastic sheets suitable for the systems and methods described herein.

In an example, fastener 100 includes threaded bolt 108, hex nut 112, and at least one washer 114 and couples first member 102 and second member 104. Threaded end 110 of bolt 108, in combination with hex nut 112 and at least one washer 114, extends from base surface 103 of first member 102 and comprises portion 106 of fastener 100. Engineering requirements state, for purposes of illustration and not by way of limitation, that sealant shroud 590 covering portion 106 must have shroud thickness 594 within a predetermined tolerance range of 0.040 inches to 0.060 inches, and must be uniform to the extent visible to the unaided eye. Fitted cap 300 positioned over fastener 100 forms uniform gap 302 between fitted cap 300 and portion 106 of fastener 100 to receive sealant 592 to form shaped sealant shroud 590, and uniform gap 302 lies within the predetermined tolerance range for shroud thickness 594. In other examples, the type of, and components comprising, fastener 100 are of any other suitable type, and are not limited to fastener 100 as described in this example. In other examples, the predetermined tolerance range associated with shroud thickness 594 is any other suitable tolerance range, and is not limited to 0.040 inches to 0.060 inches as described in this example.

In various examples, first means 217 for heating first polymer sheet 270 comprises a suitable blow dryer, that is, first means 217 includes a heating element and a fan, configured to convey air across the heating element and towards first polymer sheet 270. In various other examples, first means 217 for heating first polymer sheet 270 comprises a suitable radiative heat source, such as a heat lamp.

In various examples, second means 219 for applying suction to first polymer sheet 270 comprises a suitable vacuum pump.

In various examples, first polymer sheet 270 is provided in a substantially flat orientation and retained along its perimeter before application of heat by first means 217, and a central portion of first polymer sheet 270 tends to sag downward relative to the perimeter as first polymer sheet 270 approaches the specified temperature. Predetermined distance 205 refers to the distance between the retained perimeter of first polymer sheet 270 and first side 216 of support plate 210.

Also, in various examples, predetermined distance 205 encompasses a range of distances between first polymer sheet 270 and first side 216 of support plate 210 at which second means 219 for applying suction is effective to vacuum-form first polymer sheet 270 over precursor cap 320 as described.

In various examples, first polymer sheet 270 comprises a thermoplastic material. In various examples, first polymer sheet 270 has a thickness in a range of from 0.040 inches to 0.060 inches. Alternatively, first polymer sheet 270 has any suitable thickness that enables fitted cap 300 to be formed as described herein.

Referring generally to FIG. 1 and particularly to, e.g., FIGS. 2-4, fastener template 202 comprises central axis 204 and fastener-template outer surface 203 that has a rotational symmetry about central axis 204. The preceding subject matter of this paragraph characterizes example 2 of the present disclosure, wherein example 2 also includes the subject matter according to example 1, above.

Fastener-template outer surface 203, extending circumferentially about central axis 204 of fastener template 202, facilitates fastener template 202 representing an outer surface of portion 106 of fastener 100 having a shape elongated along a central axis, such as a bolt-and-nut or rivet-type fastener.

The term "rotational symmetry" does not require rotational symmetry to a perfect degree, but rather also includes rotational symmetry to a substantial degree. For example, hex nut 112, although having hexagonal sides that are not perfectly rotationally symmetric about central axis 204, has rotational symmetry about central axis 204 for purposes of this disclosure.

Referring generally to FIG. 1 and particularly to, e.g., FIGS. 2-4, system 200 further comprises insert 250. At least a portion of insert 250 is positioned between fastener template 202 and precursor cap 320 and extends away from first side 216 of support plate 210. Precursor cap 320 further comprises (i) third surface 323, contiguous with first surface 322 and geometrically complementary to insert 250, and (ii) fourth surface 325, contiguous with second surface 324, opposite third surface 323, and parallel to third surface 323. Second means 219 is further configured to apply the suction, such that second inner surface 343 of fitted cap 300 is geometrically complementary to fourth surface 325 of precursor cap 320. Second inner surface 343 of fitted cap 300 is contiguous with first inner surface 342 of fitted cap 300. The preceding subject matter of this paragraph characterizes example 3 of the present disclosure, wherein example 3 also includes the subject matter according to example 2, above.

Insert 250 is positioned at least partially underneath precursor cap 320, such that different portions of precursor cap 320 conform respectively to fastener template 202 and to insert 250. Because fitted cap 300 is vacuum-formed against precursor cap 320, insert 250 also causes different portions of fitted cap 300 to be parallel to, and offset from, fastener template 202 and insert 250, respectively. In other words, insert 250 causes a portion of fitted cap 300 to correspond in shape to an element other than portion 106 of fastener 100. For example, insert 250 causes a portion of fitted cap 300 to be shaped to cooperate with cap-manipulation tool 500 described later in this disclosure. Thus, fitted cap 300 is formed unitarily to both form uniform gap 302 over portion 106 of fastener 100, and to cooperate with an element of another system 501 and/or 1501 described later in this disclosure.

Referring generally to FIG. 1 and particularly to, e.g., FIGS. 2-4, at least the portion of insert 250 comprises tapered portion 252, having a direction of taper oriented parallel to central axis 204 of fastener template 202. The preceding subject matter of this paragraph characterizes example 4 of the present disclosure, wherein example 4 also includes the subject matter according to example 3, above.

Tapered portion 252 facilitates forming fitted cap 300 unitarily with tapered interface portion 310 that is built into fitted cap 300 to interface with cap-manipulation tool 500, described later in this disclosure.

Referring generally to FIG. 1 and particularly to, e.g., FIGS. 2-4, insert 250 comprises piercing member 254 that penetrates precursor cap 320 from third surface 323 through to fourth surface 325. Piercing member 254 is oriented parallel to central axis 204 of fastener template 202. The preceding subject matter of this paragraph characterizes example 5 of the present disclosure, wherein example 5 also includes the subject matter according to example 3, above.

Piercing member 254 facilitates forming fitted cap 300 unitarily with, for example, inlet opening 306 that is built into fitted cap 300 to receive sealant from cap-manipulation tool 500, as described later in this disclosure, or forming fitted cap 300 unitarily with relief opening 316 that is built into fitted cap 300 to vent sealant 592 from fitted cap 300 into cap-manipulation tool 500, as described later in this disclosure. Alternatively, inlet opening 306 or relief opening 316 are added separately, after the initial process of forming fitted cap 300.

Referring generally to FIG. 1 and particularly to, e.g., FIGS. 2, 3, and 5, system 200 further comprises insert 250, positioned such that precursor cap 320 is between fastener template 202 and insert 250. Insert 250 extends away from first side 216 of support plate 210 and comprises insert outer surface 253. Fitted cap 300 further comprises second inner surface 343, contiguous with first inner surface 342 of fitted cap 300. Second means 219 is further configured to apply the suction such that second inner surface 343 of fitted cap 300 is geometrically complementary to insert outer surface 253. The preceding subject matter of this paragraph characterizes example 6 of the present disclosure, wherein example 6 also includes the subject matter according to example 2, above.

Insert 250 is positioned outside, such as immediately on top of, precursor cap 320, such that different portions of fitted cap 300 conform respectively to precursor cap 320 and to insert 250. Because precursor cap 320 comprises first surface 322, geometrically complementary to fastener template 202, insert 250 causes different portions of fitted cap 300 to be parallel to, and offset from, fastener template 202 and insert 250, respectively. In other words, insert 250 causes a portion of fitted cap 300 to correspond in shape to an element other than portion 106 of fastener 100. For example, insert 250 causes a portion of fitted cap 300 to be shaped to cooperate with cap-manipulation tool 500 described later in this disclosure. Thus, fitted cap 300 is formed unitarily to both form uniform gap 302 over portion 106 of fastener 100, and to cooperate with an element of another system 501 and/or 1501 described later in this disclosure.

Generally, in various examples, different portions of fitted cap 300 can be formed parallel to, and offset from, fastener template 202 and insert 250, respectively, either by positioning insert 250 at least partially underneath precursor cap 320, as in example 3, or by positioning precursor cap 320 between fastener template 202 and insert 250, as in example 6.

Referring generally to FIG. 1 and particularly to, e.g., FIGS. 2, 3, and 5, insert 250 further comprises tapered portion 252, positioned such that (i) precursor cap 320 is between fastener template 202 and tapered portion 252 and (ii) a direction of taper of tapered portion 252 is parallel to central axis 204 of fastener template 202. The preceding subject matter of this paragraph characterizes example 7 of the present disclosure, wherein example 7 also includes the subject matter according to example 6, above.

Tapered portion 252 facilitates forming fitted cap 300 unitarily with tapered interface portion 310 that is built into fitted cap 300 to interface with cap-manipulation tool 500 described later in this disclosure.

Referring generally to FIG. 1 and particularly to, e.g., FIGS. 2, 3, and 5, insert 250 further comprises piercing member 254, oriented parallel to central axis 204 of fastener template 202, such that piercing member 254 extends away from precursor cap 320. The preceding subject matter of this paragraph characterizes example 8 of the present disclosure, wherein example 8 also includes the subject matter according to example 6, above.

Piercing member 254 facilitates forming fitted cap 300 unitarily with, for example, inlet opening 306 that is built into fitted cap 300 to receive sealant from cap-manipulation tool 500, as described later in this disclosure, or forming fitted cap 300 unitarily with relief opening 316 that is built into fitted cap 300 to vent sealant 592 from fitted cap 300 into cap-manipulation tool 500, as described later in this disclosure. Alternatively, inlet opening 306 or relief opening 316 are added separately, after the initial process of forming fitted cap 300.

Referring generally to FIG. 1 and particularly to, e.g., FIGS. 3 and 6, system 200 further comprises frame 240, coupleable to first polymer sheet 270 such that first polymer sheet 270 is positionable with respect to first side 216 of support plate 210 by manipulating frame 240. The preceding subject matter of this paragraph characterizes example 9 of the present disclosure, wherein example 9 also includes the subject matter according to any one of examples 1 to 8, above.

Frame 240 facilitates handling and positioning of first polymer sheet 270, particularly during heating by first means 217 and subsequently while first polymer sheet 270 is in the heated, plastic state.

Referring generally to FIG. 1 and particularly to, e.g., FIGS. 3 and 6, frame 240 comprises opening 249, extending therethrough, and perimeter 248, enclosing opening 249 and shaped to secure first polymer sheet 270 such that first polymer sheet 270 extends across opening 249. The preceding subject matter of this paragraph characterizes example 10 of the present disclosure, wherein example 10 also includes the subject matter according to example 9, above.

Frame 240 facilitates accurate placement of first polymer sheet 270, extending across opening 249, over fastener template 202, while perimeter 248 is gripped by a hand of a user.

Referring generally to FIG. 1 and particularly to, e.g., FIGS. 3 and 6, frame 240 comprises first frame side 242 and second frame side 244, opposite first frame side 242. First frame side 242 and second frame side 244 are coupleable together to secure first polymer sheet 270 therebetween. The preceding subject matter of this paragraph characterizes example 11 of the present disclosure, wherein example 11 also includes the subject matter according to example 9, above.

First frame side 242 and second frame side 244 being coupleable together facilitates ease of coupling first polymer sheet 270 to frame 240.

Referring generally to FIG. 1 and particularly to, e.g., FIGS. 3, 7, and 8, system 200 further comprises precursor label 330, coupled to precursor cap 320, and second means 219 is further configured to apply the suction such that precursor label 330 imprints embedded label 314 in fitted cap 300. The preceding subject matter of this paragraph characterizes example 12 of the present disclosure, wherein example 12 also includes the subject matter according to any one of examples 1 to 8, above.

Use of precursor label 330 to imprint embedded label 314 facilitates permanent identification of fitted cap 300 from the moment of manufacture, for example by imprinting a code that identifies a type and size of fastener 100 with which fitted cap 300 is intended to be used. For example, precursor label 330 includes raised or embossed edges that form imprints in fitted cap 300 as fitted cap 300 is vacuum-formed against precursor cap 320. A depth of the edges is sufficiently small to have a negligible effect on shroud thickness 594 after fitted cap 300 is rotated with cap-manipulation tool 500, as described later in this disclosure. In various examples, precursor label 330 is one of alphanumeric, a bar code, or any other suitable label or code that enables embedded label to be imprinted on fitted cap 300.

Referring generally to FIG. 1 and particularly to, e.g., FIGS. 3, 7, and 8, a color of precursor cap 320 differs from a color of first polymer sheet 270. The preceding subject matter of this paragraph characterizes example 13 of the present disclosure, wherein example 13 also includes the subject matter according to any one of examples 1 to 8, above.

Reserving a particular color for precursor cap 320 facilitates prevention of accidental entry of precursor cap 320 into field service. Precursor cap 320 is sized to facilitate forming fitted cap 300 at an offset from fastener template 202, and thus is not sized for use directly in applying shaped sealant shroud 590 to portion 106 of fastener 100. Reserving a particular color, such as red, for precursor cap 320 serves as a visual warning to prevent precursor cap 320, rather than fitted cap 300 formed from first polymer sheet 270 of a different color, from inadvertently being placed over fastener 100.

Referring generally to FIG. 1 and particularly to, e.g., FIGS. 3, 7, and 8, the color of first polymer sheet 270 is associated with at least one of a type or a size of fastener 100. The preceding subject matter of this paragraph characterizes example 14 of the present disclosure, wherein example 14 also includes the subject matter according to example 13, above.

Associating the color of first polymer sheet 270, which is also the color of fitted cap 300, with the size and/or type of fastener 100 with which it is intended to be used facilitates permanent identification, from the moment of manufacture of fitted cap 300, of the type and/or size of fastener 100 for which fitted cap 300 is sized. Reserving a particular color of first polymer sheet 270 for each size and type of fitted cap 300, corresponding to the size and type of fastener 100 with which fitted cap 300 is intended for use, serves as a visual indicator to ensure that a correct size and type of fitted cap 300 is placed over fastener 100 to apply shaped sealant shroud 590.

Referring generally to FIG. 1 and particularly to, e.g., FIGS. 9 and 10, precursor cap 320 has precursor-cap thickness 326 and comprises a portion of second polymer sheet 220. Second polymer sheet 220 has second-sheet thickness 226 that corresponds to precursor-cap thickness 326. The preceding subject matter of this paragraph characterizes example 15 of the present disclosure, wherein example 15 also includes the subject matter according to any one of examples 1 to 8, above.

Precursor cap 320 formed from second polymer sheet 220 causes precursor-cap thickness 326 to correspond to second-sheet thickness 226. Because fitted cap 300 is vacuum-formed over precursor cap 320, fitted cap 300 is then offset from fastener template 202 by second-sheet thickness 226. Thus, in various examples, second-sheet thickness 226 of second polymer sheet 220 is selected to be within the predefined tolerance range for shroud thickness 594 of shaped sealant shroud 590. After fitted cap 300 is formed, decoupled from precursor cap 320, and positioned over fastener 100, which is dimensionally identical to fastener template 202, gap width 312 of uniform gap 302, between fitted cap 300 and portion 106 of fastener 100, also corresponds to second-sheet thickness 226, and thus is also within the predefined tolerance range for shroud thickness 594 of shaped sealant shroud 590, as intended.

Referring generally to FIG. 1 and particularly to, e.g., FIG. 11, system 200 further comprises release agent 382, applied to at least one of precursor cap 320 or first polymer sheet 270. Release agent 382 is configured to facilitate separation of fitted cap 300 from precursor cap 320 after vacuum-forming first polymer sheet 270 over precursor cap 320. The preceding subject matter of this paragraph characterizes example 16 of the present disclosure, wherein example 16 also includes the subject matter according to example 15, above.

Release agent 382 is a flowable or spreadable composition that inhibits adhesion of first polymer sheet 270 to precursor cap 320 during and after vacuum-forming. In various examples, release agent 382 is easier to apply than release sheet 380. In various examples, release agent 382 as applied has a negligible thickness compared to precursor-cap thickness 326.

Referring generally to FIG. 1 and particularly to, e.g., FIGS. 9-11, second polymer sheet 220 further comprises second-sheet peripheral portion 232, configured to contact first side 216 of support plate 210, and second plurality of through-openings 230 in second-sheet peripheral portion 232. Second plurality of through-openings 230 is aligned with, and is communicatively coupled with, first plurality of through-openings 212, penetrating support plate 210. The preceding subject matter of this paragraph characterizes example 17 of the present disclosure, wherein example 17 also includes the subject matter according to example 15, above.

In various examples, after precursor cap 320 is formed from second polymer sheet 220, second-sheet peripheral portion 232 of second polymer sheet 220 remains on first side 216 of support plate 210 while fitted cap 300 is vacuum-formed over precursor cap 320. Second plurality of through-openings 230 in second-sheet peripheral portion 232 facilitate application of suction through first plurality of through-openings 212 from second side 218 of support plate 210 to vacuum-form first polymer sheet 270 over precursor cap 320. For example, second plurality of through-openings 230 is formed in second-sheet peripheral portion 232 one-by-one using a punch tool (not shown) on second-sheet peripheral portion 232 while second-sheet peripheral portion 232 is positioned on first side 216 of support plate 210 over first plurality of through-openings 212. For another example, second plurality of through-openings 230 is formed in second-sheet peripheral portion 232 simultaneously using a jig (not shown), having punches spaced to match a spacing of first plurality of through-openings 212, on second-sheet peripheral portion 232 while second-sheet peripheral portion 232 is positioned on first side 216 of support plate 210 over first plurality of through-openings 212. Alternatively, second-sheet peripheral portion 232 is trimmed from precursor cap 320 and removed from support plate 210 before fitted cap 300 is vacuum-formed over precursor cap 320.

Referring generally to FIG. 1 and particularly to, e.g., FIGS. 3, 13, and 14, system 200 further comprises spacer 280, coupled between first side 216 of support plate 210 and fastener template 202. Spacer 280 has spacer thickness 286, corresponding to one of (i) precursor-cap thickness 326 or (ii) a sum of first-sheet thickness 276 of first polymer sheet 270 and precursor-cap thickness 326. The preceding subject matter of this paragraph characterizes example 18 of the present disclosure, wherein example 18 also includes the subject matter according to any one of examples 1 to 8, above.

In various examples, flange 340 extends from precursor cap 320 and is sandwiched between first cap end 308 of fitted cap 300 and first side 216 of support plate 210. Flange 340 tends to create a vertical offset of fitted cap 300 with respect to fastener template 202, as compared to a vertical alignment of fitted cap 300 with portion 106 of fastener 100. Spacer 280 is sized to correct for the vertical offset created by flange 340. Thus, during formation of fitted cap 300, spacer 280 facilitates forming fitted cap 300 to be positionable over portion 106 of fastener 100 such that uniform gap 302 is formed accurately, with first cap end 308 positioned against base surface 103 on which fastener 100 is installed, between first inner surface 342 of fitted cap 300 and portion 106 of fastener 100. Alternatively, flange 340 is trimmed from precursor cap 320 before fitted cap 300 is vacuum-formed over precursor cap 320.

Referring generally to FIG. 1 and particularly to, e.g., FIGS. 9 and 12, precursor cap 320 comprises (i) a portion of second polymer sheet 220, having second-sheet thickness 226, and (ii) a portion of release sheet 380, having release-sheet thickness 386. Precursor-cap thickness 326 is equal to a sum of second-sheet thickness 226 and release-sheet thickness 386. The preceding subject matter of this paragraph characterizes example 19 of the present disclosure, wherein example 19 also includes the subject matter according to any one of examples 1 to 8, above.

Release sheet 380 is a solid sheet that inhibits adhesion of first polymer sheet 270 to precursor cap 320 during and after vacuum-forming, and avoids depositing residue that may be associated with flowable/spreadable release agent 382 on fitted cap 300. Precursor cap 320 is formed from second polymer sheet 220, having second-sheet thickness 226, and from release sheet 380, having release-sheet thickness 386. Accordingly, precursor-cap thickness 326 is a sum of second-sheet thickness 226 and release-sheet thickness 386. In one example, release sheet 380 is formed from fluorinated ethylene propylene ("FEP").

Referring generally to FIG. 1 and particularly to, e.g., FIGS. 9 and 12, second polymer sheet 220 further comprises second-sheet peripheral portion 232, configured to contact first side 216 of support plate 210, and second plurality of through-openings 230 in second-sheet peripheral portion 232. Release sheet 380 further comprises release-sheet peripheral portion 392, configured to contact second-sheet peripheral portion 232, and third plurality of through-openings 390 in release-sheet peripheral portion 392 of release sheet 380. Second plurality of through-openings 230 of second polymer sheet 220 and third plurality of through-openings 390 of release sheet 380 are aligned with, and are communicatively coupled with, first plurality of through-openings 212, penetrating support plate 210. The preceding subject matter of this paragraph characterizes example 20 of the present disclosure, wherein example 20 also includes the subject matter according to example 19, above.

In various examples, after second polymer sheet 220 is vacuum-formed over fastener template 202, second-sheet peripheral portion 232 of second polymer sheet 220 remains on first side 216 of support plate 210 while release sheet 380 is vacuum-formed over the portion of second polymer sheet 220 covering fastener template 202. Second plurality of through-openings 230 in second-sheet peripheral portion 232 facilitate application of suction through first plurality of through-openings 212 from second side 218 of support plate 210 to vacuum-form release sheet 380 over the portion of second polymer sheet 220 covering fastener template 202. Similarly, release-sheet peripheral portion 392 of release sheet 380 remains on second-sheet peripheral portion 232, which remains on first side 216 of support plate 210, while release sheet 380 is vacuum-formed over the portion of second polymer sheet 220 covering fastener template 202. Third plurality of through-openings 390 in release-sheet peripheral portion 392 facilitate application of suction through first plurality of through-openings 212 from second side 218 of support plate 210 to vacuum-form fitted cap 300 over precursor cap 320. For example, second plurality of through-openings 230 and/or third plurality of through-openings 390 is formed using a punch tool (not shown) or a jig (not shown), as described above.

Referring generally to FIG. 15 and particularly to, e.g., FIGS. 2 and 16, system 501 for applying shaped sealant shroud 590 to portion 106 of fastener 100 is disclosed. System 501 comprises fitted cap 300, comprising wall 305. Fitted cap 300 is positionable over portion 106 of fastener 100 such that uniform gap 302 is formed between wall 305 and portion 106 of fastener 100. Fitted cap 300 further comprises inlet opening 306, fully penetrating wall 305, such that inlet opening 306 is configured to be communicatively coupled with uniform gap 302. Fitted cap 300 also comprises vent 309, fully penetrating wall 305, such that vent 309 is configured to be communicatively coupled with uniform gap 302. Inlet opening 306 and vent 309 are spaced apart from each other along wall 305. System 501 additionally comprises cap-manipulation tool 500, comprising shaft 510. Shaft 510 has longitudinal central axis 518 and comprises through, circumferentially closed, channel 516, configured to receive sealant 592 and to communicate sealant 592 therethrough. Cap-manipulation tool 500 is configured to couple to fitted cap 300 such that (i) through, circumferentially closed, channel 516 of shaft 510 is capable of communicating sealant 592 through inlet opening 306 of fitted cap 300 into uniform gap 302, (ii) vent 309 is oriented to purge gas from uniform gap 302 as sealant 592 is communicated through the through, circumferentially closed, channel 516 into uniform gap 302, and (iii) fitted cap 300 is rotatable together with shaft 510 about longitudinal central axis 518 of shaft 510 to distribute sealant 592 in uniform gap 302 to form shaped sealant shroud 590 around portion 106 of fastener 100. The preceding subject matter of this paragraph characterizes example 21 of the present disclosure.

System 501 provides cap-manipulation tool 500 and fitted cap 300 as separate components that may be coupled together, enabling use of a single same cap-manipulation tool 500 with a variety of sizes and shapes of fitted cap 300. It should be understood that each of a variety of sizes and shapes of fitted cap 300 may be designed for use with a respective size and type of fastener 100. Also, fitted cap 300 being rotatable together with shaft 510 about longitudinal central axis 518, with fitted cap 300 positioned over portion 106 of fastener 100, facilitates even spreading of sealant 592 supplied through the through, circumferentially closed, channel 516 over an entire surface of portion 106 of fastener 100 via a simple rotation of shaft 510. For example, rotation of shaft 510 about longitudinal central axis 518, with fitted cap 300 positioned over portion 106 of fastener 100, tends to balance a distribution of sealant 592 around a circumference of portion 106 and/or to dynamically center fitted cap 300 over portion 106 of fastener 100. Additionally, inlet opening 306 and vent 309 cooperate to facilitate purging gas from uniform gap 302 as sealant 592 is fed through the through, circumferentially closed, channel 516 of cap-manipulation tool 500, inhibiting the formation of air bubbles or other imperfections in shaped sealant shroud 590.

Referring generally to FIG. 15 and particularly to, e.g., FIGS. 2 and 16, fastener 100 is configured for installation on first member 102, such that portion 106 of fastener 100 extends from base surface 103 of first member 102, and fitted cap 300 comprises first cap end 308, configured to mount against base surface 103. The preceding subject matter of this paragraph characterizes example 22 of the present disclosure, wherein example 22 also includes the subject matter according to example 21, above.

First cap end 308 configured to mount against base surface 103 enables fitted cap 300 to be positioned directly on first member 102 during application of sealant 592, reducing an amount of leakage, dripping, or other inadvertent application of sealant 592 to first member 102.

Referring generally to FIG. 15 and particularly to, e.g., FIGS. 2 and 16, gap width 312 of uniform gap 302 is within predefined tolerance range for shroud thickness 594 of shaped sealant shroud 590 on portion 106 of fastener 100. The preceding subject matter of this paragraph characterizes example 23 of the present disclosure, wherein example 23 also includes the subject matter according to example 21 or 22, above.

Selection of a size and a type of fitted cap 300 provides gap width 312 within the predetermined tolerance for shroud thickness 594 on portion 106 of fastener 100, and thus causes a correct thickness of sealant 592 to be applied to portion 106 of fastener 100. For example, fitted cap 300 is previously formed according to any one of examples 1 to 20, above, using fastener template 202 dimensionally identical to portion 106 of fastener 100.

Referring generally to FIG. 15 and particularly to, e.g., FIGS. 2 and 16, shaft 510 comprises first shaft end 512 and second shaft end 514, opposite first shaft end 512. Shaft 510 extends longitudinally from first shaft end 512 to second shaft end 514. Cap-manipulation tool 500 further comprises interface bushing 550 that has passage 562 therethrough. Interface bushing 550 is configured to couple between second shaft end 514 and fitted cap 300 such that, with fitted cap 300 positioned over portion 106 of fastener 100, through, circumferentially closed, channel 516 is communicatively coupled with passage 562, inlet opening 306, and uniform gap 302. The preceding subject matter of this paragraph characterizes example 24 of the present disclosure, wherein example 24 also includes the subject matter according to any one of examples 21 to 23, above.

Interface bushing 550 simplifies coupling of shaft 510 to fitted cap 300. In various examples, interface bushing 550 also extends an operational lifetime of fitted cap 300. For example, shaft 510 may be made from a metallic material that would wear on a relatively thin plastic used to form fitted cap 300, and interface bushing 550 may be made from a thicker plastic that can better withstand coupling to the metallic material while wearing less on fitted cap 300. Interface bushing 550 may also be provided in various sizes to facilitate matching a single size of shaft 510 to multiple sizes and/or types of fitted cap 300.

Referring generally to FIG. 15 and particularly to, e.g., FIGS. 2 and 16, fitted cap 300 comprises tapered interface portion 310. Interface bushing 550 comprises sidewall 556, having sidewall taper angle 558 relative to longitudinal central axis 518. Sidewall 556 of interface bushing 550 is configured to couple to tapered interface portion 310 of fitted cap 300 with an interference fit. The preceding subject matter of this paragraph characterizes example 25 of the present disclosure, wherein example 25 also includes the subject matter according to example 24, above.

The interference fit between tapered sidewall 556 of interface bushing 550 and tapered interface portion 310 of fitted cap 300 provides a simple and efficient structure for releasably coupling cap-manipulation tool 500 to fitted cap 300. For example, tapered interface portion 310 of fitted cap 300 is previously formed according to one of examples 4 or 7, above, using insert 250.

Referring generally to FIG. 15 and particularly to, e.g., FIGS. 2 and 16, tapered interface portion 310 of fitted cap 300 has cap taper angle 311 relative to longitudinal central axis 518. Cap taper angle 311 differs from sidewall taper angle 558 of interface bushing 550 by at least 10 degrees. The preceding subject matter of this paragraph characterizes example 26 of the present disclosure, wherein example 26 also includes the subject matter according to example 25, above.

The difference between sidewall taper angle 558 of interface bushing sidewall 556 and cap taper angle 311 inhibits interface bushing 550 and fitted cap 300 from becoming locked together during use.

Referring generally to FIG. 15 and particularly to, e.g., FIGS. 2 and 16, interface bushing 550 comprises skirt 560, configured to couple to second shaft end 514 with an interference fit. The preceding subject matter of this paragraph characterizes example 27 of the present disclosure, wherein example 27 also includes the subject matter according to any one of examples 24 to 26, above.

The interference fit between skirt 560 of interface bushing 550 and second shaft end 514 provides a simple and efficient structure for releasably coupling shaft 510 to interface bushing 550, without obstructing passage 562.

Referring generally to FIG. 15 and particularly to, e.g., FIGS. 2 and 16, cap-manipulation tool 500 further comprises handle 530, coupled to shaft 510 and movable to rotate shaft 510 about longitudinal central axis 518. The preceding subject matter of this paragraph characterizes example 28 of the present disclosure, wherein example 28 also includes the subject matter according to example 21, above.

Handle 530 is configured to be manipulated by a user to rotate shaft 510 to evenly spread sealant 592 on portion 106 of fastener 100.

Referring generally to FIG. 15 and particularly to, e.g., FIGS. 2 and 16, shaft 510 comprises first shaft end 512 and second shaft end 514, opposite first shaft end 512. Shaft 510 extends between first shaft end 512 and second shaft end 514. Handle 530 is longitudinally translatable between first shaft end 512 and second shaft end 514 to cause rotational motion of shaft 510 about longitudinal central axis 518. The preceding subject matter of this paragraph characterizes example 29 of the present disclosure, wherein example 29 also includes the subject matter according to example 28, above.

The user can apply a simple longitudinal motion to handle 530 to rotate shaft 510 to evenly spread sealant 592 on portion 106 of fastener 100.

Referring generally to FIG. 15 and particularly to, e.g., FIGS. 2 and 16, handle 530 is longitudinally non-concurrently translatable in two opposing axial directions between first shaft end 512 and second shaft end 514 such that shaft 510 is respectively non-concurrently rotatable in two opposing rotational directions about longitudinal central axis 518. The preceding subject matter of this paragraph characterizes example 30 of the present disclosure, wherein example 30 also includes the subject matter according to example 29, above.

The user can apply a simple up-and-down longitudinal motion to handle 530 to rotate shaft 510 back-and-forth in opposing directions e.g., clockwise and counter-clockwise to evenly spread sealant 592 on portion 106 of fastener 100. In various examples, the two opposing axial directions are parallel to longitudinal central axis 518.

Referring generally to FIG. 15 and particularly to, e.g., FIGS. 2 and 16, cap-manipulation tool 500 further comprises biasing element 580, configured to bias handle 530 toward first shaft end 512 in response to longitudinal translation of handle 530 toward second shaft end 514. The preceding subject matter of this paragraph characterizes example 31 of the present disclosure, wherein example 31 also includes the subject matter according to example 30, above.

After the user moves handle 530 in a longitudinal direction to rotate shaft 510 in one rotational direction about longitudinal central axis 518, biasing element 580 assists the user by applying a return force that tends to move handle 530 in the opposing longitudinal direction to rotate shaft 510 in the opposing rotational direction. For example, biasing element 580 is a coil spring.

Referring generally to FIG. 15 and particularly to, e.g., FIGS. 2 and 16, shaft 510 further comprises outer surface 522 and helical groove 520, located on outer surface 522. Handle 530 comprises cam 534, configured to cooperate with helical groove 520 such that longitudinal translational motion of handle 530 along shaft 510 causes rotational motion of shaft 510 about longitudinal central axis 518. The preceding subject matter of this paragraph characterizes example 32 of the present disclosure, wherein example 32 also includes the subject matter according to any one of examples 28 to 31, above.

The cooperation of cam 534 and helical groove 520 transforms up-and-down longitudinal motion applied to handle 530 into back-and-forth rotational motion of shaft 510.

Referring generally to FIG. 15 and particularly to, e.g., FIGS. 2 and 16, handle 530 further comprises body 540. Body 540 has handle cavity 532, configured to receive shaft 510 therethrough with a clearance fit. Cam 534 projects from body 540 into handle cavity 532. The preceding subject matter of this paragraph characterizes example 33 of the present disclosure, wherein example 33 also includes the subject matter according to example 32, above.

Receiving shaft 510 through body 540 of handle 530 stabilizes shaft 510 in a vertical orientation as the cooperation of cam 534 and helical groove 520 transforms up-and-down longitudinal motion applied to handle 530 into back-and-forth rotational motion of shaft 510.

Referring generally to FIG. 15 and particularly to, e.g., FIGS. 2 and 16, handle 530 further comprises extension 536, configured to extend outwardly from shaft 510 at an angle relative to longitudinal central axis 518. Extension 536 is configured to be manipulated by a hand of a user. The preceding subject matter of this paragraph characterizes example 34 of the present disclosure, wherein example 34 also includes the subject matter according to any one of examples 28 to 31, above.

Extension 536 enables a user to manipulate handle 530 up and down to rotate shaft 510 in cases where fastener 100 is located in a confined space.

Referring generally to FIG. 15 and particularly to, e.g., FIGS. 2 and 16, handle 530 further comprises body 540 and joint 538. Body 540 has handle cavity 532, configured to receive shaft 510 therethrough with a clearance fit. Extension 536 is coupled to body 540 at joint 538 such that extension 536 is movable among a plurality of orientations with respect to body 540. The preceding subject matter of this paragraph characterizes example 35 of the present disclosure, wherein example 35 also includes the subject matter according to example 34, above.

Joint 538 coupling body 540 and extension 536 further enables a user to manipulate handle 530 up and down by hand to rotate shaft 510 in cases where fastener 100 is located in a confined space.

Referring generally to FIG. 17 and particularly to, e.g., FIGS. 2 and 18, system 1501 for applying shaped sealant shroud 590 to portion 106 of fastener 100 is disclosed. System 1501 comprises fitted cap 300, comprising wall 305, cap cavity 303 defined by wall 305 and configured to receive sealant 592 therein, and relief opening 316 that fully penetrates wall 305. Fitted cap 300 is positionable over portion 106 of fastener 100 such that (i) portion 106 of fastener 100 is received within cap cavity 303, (ii) uniform gap 302 is formed between wall 305 of fitted cap 300 and portion 106 of fastener 100, and (iii) relief opening 316 is communicatively coupled with uniform gap 302. System 1501 further comprises cap-manipulation tool 500, comprising shaft 510. Shaft 510 has longitudinal central axis 518 and comprises through, circumferentially closed, channel 516. Cap-manipulation tool 500 is configured to couple to fitted cap 300 such that (i) through, circumferentially closed, channel 516 of shaft 510 is communicatively coupled with relief opening 316 of fitted cap 300 and (ii) fitted cap 300 is rotatable together with shaft 510 about longitudinal central axis 518 of shaft 510 to distribute sealant 592, previously introduced into cap cavity 303, in uniform gap 302 to form shaped sealant shroud 590 around portion 106 of fastener 100. Relief opening 316 is oriented to purge at least one of gas or excess of sealant 592 from uniform gap 302 into through, circumferentially closed, channel 516 of shaft 510. The preceding subject matter of this paragraph characterizes example 36 of the present disclosure.

System 1501 provides cap-manipulation tool 500 and fitted cap 300 as separate components that may be coupled together, enabling use of a single cap-manipulation tool 500 with a variety of sizes and shapes of fitted cap 300. It should be understood that each of a variety of sizes and shapes of fitted cap 300 may be designed for use with a respective size and type of fastener 100. Also, fitted cap 300 being rotatable together with shaft 510 about longitudinal central axis 518, with fitted cap 300 positioned over portion 106 of fastener 100, facilitates even spreading of sealant 592 supplied through the through, circumferentially closed, channel 516 over an entire surface of portion 106 of fastener 100 via a simple rotation of shaft 510. For example, rotation of shaft 510 about longitudinal central axis 518, with fitted cap 300 positioned over portion 106 of fastener 100, tends to balance a distribution of sealant 592 around a circumference of portion 106 and/or to dynamically center fitted cap 300 over portion 106 of fastener 100. Additionally, relief opening 316 and through, circumferentially closed, channel 516 of shaft 510 cooperate to facilitate purging gas and/or excess sealant from uniform gap 302, inhibiting the formation of air bubbles or other imperfections in shaped sealant shroud 590.

System 1501 is similar to system 501, described above, in many respects, and like elements are identified with like reference numerals. One respect in which system 1501 differs from system 501 is that, in an intended use, as will be described later in this disclosure, system 1501 operates by initially providing sealant 592 in cap cavity 303, rather than by feeding sealant 592 through shaft 510 as in an intended use of system 501. Thus, system 1501 includes relief opening 316, rather than inlet opening 306. In various examples, relief opening 316 is located on fitted cap 300 for use with system 1501 in a similar position to a location of inlet opening 306 on fitted cap 300 for use with system 501. As described above, relief opening 316 provides for relief of excess sealant and/or gas from cap cavity 303, as cap cavity 303 is compressed into uniform gap 302 by the positioning of fitted cap 300 over fastener 100. The excess sealant and/or gas may be communicated through relief opening 316 into through, circumferentially closed, channel 516 of shaft 510. As such, fitted cap 300 for use with system 1501 need not include vent 309. In various examples, omission of vent 309 from fitted cap 300 reduces an amount of leakage, dripping, or other inadvertent application of sealant 592 to first member 102.

Referring generally to FIG. 17 and particularly to, e.g., FIGS. 2 and 18, fastener 100 is configured for installation on first member 102, such that portion 106 of fastener 100 extends from base surface 103 of first member 102, and fitted cap 300 comprises first cap end 308, configured to mount against base surface 103. The preceding subject matter of this paragraph characterizes example 37 of the present disclosure, wherein example 37 also includes the subject matter according to example 36, above.

First cap end 308 configured to mount against base surface 103 enables fitted cap 300 to be positioned directly on first member 102 during application of sealant 592, reducing an amount of leakage, dripping, or other inadvertent application of sealant 592 to first member 102.

Referring generally to FIG. 17 and particularly to, e.g., FIGS. 2 and 18, gap width 312 of uniform gap 302 is within predefined tolerance range for shroud thickness 594 of shaped sealant shroud 590 on portion 106 of fastener 100. The preceding subject matter of this paragraph characterizes example 38 of the present disclosure, wherein example 38 also includes the subject matter according to example 36 or 37, above.

Selection of a size and a type of fitted cap 300 provides gap width 312 within the predetermined tolerance for shroud thickness 594 on portion 106 of fastener 100, and thus causes a correct thickness of sealant 592 to be applied to portion 106 of fastener 100. For example, fitted cap 300 is previously formed according to any one of examples 1 to 20, above, using fastener template 202 dimensionally identical to portion 106 of fastener 100.

Referring generally to FIG. 17 and particularly to, e.g., FIGS. 2 and 18, shaft 510 comprises first shaft end 512 and second shaft end 514, opposite first shaft end 512. Shaft 510 extends longitudinally from first shaft end 512 to second shaft end 514. Cap-manipulation tool 500 further comprises interface bushing 550 that has passage 562 therethrough. Interface bushing 550 is configured to couple between second shaft end 514 and fitted cap 300 such that, with fitted cap 300 positioned over portion 106 of fastener 100, through, circumferentially closed, channel 516 is communicatively coupled with passage 562, relief opening 316, and uniform gap 302. The preceding subject matter of this paragraph characterizes example 39 of the present disclosure, wherein example 39 also includes the subject matter according to any one of examples 36 to 38, above.

Interface bushing 550 simplifies coupling of shaft 510 to fitted cap 300. In various examples, interface bushing 550 also extends an operational lifetime of fitted cap 300. For example, shaft 510 may be made from a metallic material that would wear on a relatively thin plastic used to form fitted cap 300, and interface bushing 550 may be made from a thicker plastic that can better withstand coupling to the metallic material while wearing less on fitted cap 300. Interface bushing 550 may also be provided in various sizes to facilitate matching a single size of shaft 510 to multiple sizes and/or types of fitted cap 300.

Referring generally to FIG. 17 and particularly to, e.g., FIGS. 2 and 18, fitted cap 300 comprises tapered interface portion 310. Interface bushing 550 comprises sidewall 556, having sidewall taper angle 558 relative to longitudinal central axis 518. Sidewall 556 of interface bushing 550 is configured to couple to tapered interface portion 310 of fitted cap 300 with an interference fit. The preceding subject matter of this paragraph characterizes example 40 of the present disclosure, wherein example 40 also includes the subject matter according to example 39, above.

The interference fit between sidewall 556 (which is tapered, as provided above) of interface bushing 550 and tapered interface portion 310 of fitted cap 300 provides a simple and efficient structure for releasably coupling cap-manipulation tool 500 to fitted cap 300.

According to one aspect of the disclosure, tapered interface portion 310 of fitted cap 300 is previously formed according to one of examples 4 or 7, above, using insert 250.

Referring generally to FIG. 17 and particularly to, e.g., FIGS. 2 and 18, tapered interface portion 310 of fitted cap 300 has cap taper angle 311 relative to longitudinal central axis 518. Cap taper angle 311 differs from sidewall taper angle 558 of interface bushing 550 by at least 10 degrees. The preceding subject matter of this paragraph characterizes example 41 of the present disclosure, wherein example 41 also includes the subject matter according to example 40, above.

The difference between sidewall taper angle 558 of sidewall 556 of interface busing 550 and cap taper angle 311 inhibits interface bushing 550 and fitted cap 300 from becoming locked together during use.

Referring generally to FIG. 17 and particularly to, e.g., FIGS. 2 and 18, interface bushing 550 comprises skirt 560, configured to couple to second shaft end 514 with an interference fit. The preceding subject matter of this paragraph characterizes example 42 of the present disclosure, wherein example 42 also includes the subject matter according to any one of examples 39 to 41, above.

The interference fit between skirt 560 of interface bushing 550 and second shaft end 514 provides a simple and efficient structure for releasably coupling shaft 510 to interface bushing 550, without obstructing passage 562.

Referring generally to FIG. 17 and particularly to, e.g., FIGS. 2 and 18, cap-manipulation tool 500 further comprises handle 530, coupled to shaft 510 and movable to rotate shaft 510 about longitudinal central axis 518. The preceding subject matter of this paragraph characterizes example 43 of the present disclosure, wherein example 43 also includes the subject matter according to example 36, above.

Handle 530 is configured to be manipulated by a user to rotate shaft 510 to evenly spread sealant 592 on portion 106 of fastener 100.

Referring generally to FIG. 17 and particularly to, e.g., FIGS. 2 and 18, shaft 510 comprises first shaft end 512 and second shaft end 514, opposite first shaft end 512. Shaft 510 extends between first shaft end 512 and second shaft end 514. Handle 530 is longitudinally translatable between first shaft end 512 and second shaft end 514 to cause rotational motion of shaft 510 about longitudinal central axis 518. The preceding subject matter of this paragraph characterizes example 44 of the present disclosure, wherein example 44 also includes the subject matter according to example 43, above.

The user can apply a simple longitudinal motion to handle 530 to rotate shaft 510 to evenly spread sealant 592 on portion 106 of fastener 100.

Referring generally to FIG. 17 and particularly to, e.g., FIGS. 2 and 18, handle 530 is longitudinally non-concurrently translatable in two opposing axial directions between first shaft end 512 and second shaft end 514 such that shaft 510 is respectively non-concurrently rotatable in two opposing rotational directions about longitudinal central axis 518. The preceding subject matter of this paragraph characterizes example 45 of the present disclosure, wherein example 45 also includes the subject matter according to example 44, above.

The user can apply a simple up-and-down longitudinal motion to handle 530 to rotate shaft 510 back-and-forth in opposing directions e.g., clockwise and counter-clockwise to evenly spread sealant 592 on portion 106 of fastener 100. In various examples, the two opposing axial directions are parallel to longitudinal central axis 518.

Referring generally to FIG. 17 and particularly to, e.g., FIGS. 2 and 18, cap-manipulation tool 500 further comprises biasing element 580, configured to bias handle 530 toward first shaft end 512 in response to longitudinal translation of handle 530 toward second shaft end 514. The preceding subject matter of this paragraph characterizes example 46 of the present disclosure, wherein example 46 also includes the subject matter according to example 45, above.

After the user moves handle 530 in a longitudinal direction to rotate shaft 510 in one rotational direction about longitudinal central axis 518, biasing element 580 assists the user by applying a return force that tends to move handle 530 in the opposing longitudinal direction to rotate shaft 510 in the opposing rotational direction. For example, biasing element 580 is a coil spring.

Referring generally to FIG. 17 and particularly to, e.g., FIGS. 2 and 18, shaft 510 further comprises outer surface 522 and helical groove 520, located on outer surface 522. Handle 530 comprises cam 534, configured to cooperate with helical groove 520 such that longitudinal translational motion of handle 530 along shaft 510 causes rotational motion of shaft 510 about longitudinal central axis 518. The preceding subject matter of this paragraph characterizes example 47 of the present disclosure, wherein example 47 also includes the subject matter according to any one of examples 43 to 46, above.

The cooperation of cam 534 and helical groove 520 transforms up-and-down longitudinal motion applied to handle 530 into back-and-forth rotational motion of shaft 510.

Referring generally to FIG. 17 and particularly to, e.g., FIGS. 2 and 18, handle 530 further comprises body 540. Body 540 has handle cavity 532, configured to receive shaft 510 therethrough with a clearance fit. Cam 534 projects from body 540 into handle cavity 532. The preceding subject matter of this paragraph characterizes example 48 of the present disclosure, wherein example 48 also includes the subject matter according to example 47, above.

Receiving shaft 510 through body 540 of handle 530 stabilizes shaft 510 in a vertical orientation as the cooperation of cam 534 and helical groove 520 transforms up-and-down longitudinal motion applied to handle 530 into back-and-forth rotational motion of shaft 510.

Referring generally to FIG. 17 and particularly to, e.g., FIGS. 2 and 18, handle 530 further comprises extension 536, configured to extend outwardly from shaft 510 at an angle relative to longitudinal central axis 518. Extension 536 is configured to be manipulated by a hand of a user. The preceding subject matter of this paragraph characterizes example 49 of the present disclosure, wherein example 49 also includes the subject matter according to any one of examples 43 to 46, above.

Extension 536 enables a user to manipulate handle 530 up and down to rotate shaft 510 in cases where fastener 100 is located in a confined space.

Referring generally to FIG. 17 and particularly to, e.g., FIGS. 2 and 18, handle 530 further comprises body 540 and joint 538. Body 540 has handle cavity 532, configured to receive shaft 510 therethrough with a clearance fit. Extension 536 is coupled to body 540 at joint 538 such that extension 536 is movable among a plurality of orientations with respect to body 540. The preceding subject matter of this paragraph characterizes example 50 of the present disclosure, wherein example 50 also includes the subject matter according to example 49, above.

Joint 538 coupling body 540 and extension 536 further enables a user to manipulate handle 530 up and down by hand to rotate shaft 510 in cases where fastener 100 is located in a confined space.

Referring generally to FIGS. 1-3 and particularly to, e.g., FIGS. 19A, 19B, 19C, and 19D, method 1900 of making fitted cap 300 is disclosed. Fitted cap 300 is configured to apply shaped sealant shroud 590 to portion 106 of fastener 100. Method 1900 comprises (block 1902) covering fastener template 202 with precursor cap 320. Fastener template 202 extends from first side 216 of support plate 210. Support plate 210 comprises second side 218, opposite first side 216, and first plurality of through-openings 212, penetrating support plate 210 from first side 216 through to second side 218 and arranged about fastener template 202. Precursor cap 320 comprises first surface 322, geometrically complementary to fastener template 202, and second surface 324, opposite first surface 322 and parallel to first surface 322. Fastener template 202 is dimensionally identical to portion 106 of fastener 100. Method 1900 further comprises (block 1904) heating first polymer sheet 270 to a specified temperature and (block 1906) applying suction to first polymer sheet 270, positioned predetermined distance 205 from first side 216 of support plate 210 and heated to the specified temperature, through first plurality of through-openings 212 from second side 218 of support plate 210 to vacuum-form first polymer sheet 270 over precursor cap 320. After vacuum-forming first polymer sheet 270 over precursor cap 320, at least a portion of first polymer sheet 270 forms fitted cap 300 and first inner surface 342 of fitted cap 300 is geometrically complementary to second surface 324 of precursor cap 320. The preceding subject matter of this paragraph characterizes example 51 of the present disclosure.

Fitted cap 300 formed geometrically complementary to second surface 324 of precursor cap 320, which in turn is parallel to first surface 322 of precursor cap 320 and thus geometrically complementary to fastener template 202, creates uniform gap 302 between fitted cap 300 and portion 106 of fastener 100 with fitted cap 300 positioned over fastener 100. Fitted cap 300 thus facilitates continuity and uniformity of application of sealant 592 over portion 106 of fastener 100, as compared to, for example, manual brush application of sealant 592.

Referring generally to FIGS. 1 and 11 and particularly to, e.g., FIGS. 19A, 19B, 19C, and 19D, method 1900 further comprises (block 1908) applying release agent 382 to at least one of precursor cap 320 and first polymer sheet 270. Release agent 382 is configured to facilitate separation of fitted cap 300 from precursor cap 320 after (block 1906) applying suction to first polymer sheet 270 to vacuum-form first polymer sheet 270 over precursor cap 320. The preceding subject matter of this paragraph characterizes example 52 of the present disclosure, wherein example 52 also includes the subject matter according to example 51, above.

Release agent 382 is a flowable or spreadable composition that inhibits adhesion of first polymer sheet 270 to precursor cap 320 during and after vacuum-forming. In various examples, release agent 382 is easier to apply than release sheet 380.

Referring generally to FIGS. 1, 9, and 10 and particularly to, e.g., FIGS. 19A, 19B, 19C, and 19D, method 1900 further comprises, before covering fastener template 202 with precursor cap 320, (block 1910) forming precursor cap 320. The preceding subject matter of this paragraph characterizes example 53 of the present disclosure, wherein example 53 also includes the subject matter according to example 51 or 52, above.

Forming precursor cap 320 as part of method 1900 of making fitted cap 300 facilitates streamlining the process of making fitted cap 300 and ensuring that precursor cap 320 is properly shaped to produce fitted cap 300 corresponding to a size and a type of fastener 100 intended to be coated with shaped sealant shroud 590.

Referring generally to FIGS. 1, 9, and 10 and particularly to, e.g., FIGS. 19A, 19B, 19C, and 19D, according to method 1900, (block 1910) forming precursor cap 320 comprises (block 1912) heating second polymer sheet 220 to a second specified temperature and (block 1914) applying suction to second polymer sheet 220, positioned second predetermined distance 207 from first side 216 of support plate 210 and heated to the second specified temperature, through first plurality of through-openings 212 from second side 218 of support plate 210 to vacuum-form second polymer sheet 220 over fastener template 202. After vacuum-forming second polymer sheet 220 over fastener template 202, at least a portion of second polymer sheet 220 forms precursor cap 320. The preceding subject matter of this paragraph characterizes example 54 of the present disclosure, wherein example 54 also includes the subject matter according to example 53, above.

Forming precursor cap 320 from second polymer sheet 220 facilitates form-fitting precursor cap 320 to fastener template 202 using, for example, first means 217, second means 219, and support plate 210, subsequently used to form fitted cap 300 over precursor cap 320, simplifying a process of making fitted cap 300 using precursor cap 320.

In various examples, second polymer sheet 220 is provided in a substantially flat orientation and retained along its perimeter before application of heat by, for example, first means 217, and a central portion of second polymer sheet 220 tends to sag downward relative to the perimeter as second polymer sheet 220 approaches the second specified temperature. Predetermined distance 207 refers to the distance between the retained perimeter of second polymer sheet 220 and first side 216 of support plate 210.

Also, in various examples, predetermined distance 207 encompasses a range of distances between second polymer sheet 220 and first side 216 of support plate 210 at which second means 219 for applying suction, for example, is effective to vacuum-form second polymer sheet 220 over fastener template 202 as described.

In various examples, second polymer sheet 220 comprises a thermoplastic material. In various examples, second polymer sheet 220 has a thickness in a range of from 0.020 inches to 0.060 inches. Alternatively, second polymer sheet 220 has any suitable thickness that enables precursor cap 320 to be formed as described herein.

In various examples, frame 240 described above is also coupled to second polymer sheet 220 to facilitate handling and positioning of second polymer sheet 220, particularly during heating by, for example, first means 217 and subsequently while second polymer sheet 220 is in the heated, plastic state Referring generally to FIGS. 1, 9, and 10 and particularly to, e.g., FIGS. 19A, 19B, 19C, and 19D, according to method 1900, (block 1914) applying suction to vacuum-form second polymer sheet 220 over fastener template 202 further comprises (block 1916) forming precursor cap 320, having precursor-cap thickness 326, equal to second-sheet thickness 226 of second polymer sheet 220. The preceding subject matter of this paragraph characterizes example 55 of the present disclosure, wherein example 55 also includes the subject matter according to example 54, above.

Precursor cap 320 formed from second polymer sheet 220 causes precursor-cap thickness 326 to correspond to second-sheet thickness 226. Because fitted cap 300 is vacuum-formed over precursor cap 320, fitted cap 300 is then offset from fastener template 202 by second-sheet thickness 226. Thus, in various examples, second-sheet thickness 226 of second polymer sheet 220 is selected to be within the predefined tolerance range for shroud thickness 594 of shaped sealant shroud 590.

Referring generally to FIGS. 1, 2, 10, and 12 and particularly to, e.g., FIGS. 19A, 19B, 19C, and 19D, method 1900 further comprises (block 1918) preselecting precursor-cap thickness 326 to be within the predefined tolerance range of shroud thickness 594 of shaped sealant shroud 590.

The preceding subject matter of this paragraph characterizes example 56 of the present disclosure, wherein example 56 also includes the subject matter according to example 55, above.

After fitted cap 300 is formed, decoupled from precursor cap 320, and positioned over fastener 100, which is dimensionally identical to fastener template 202, gap width 312 of uniform gap 302, between fitted cap 300 and portion 106 of fastener 100, also corresponds to second-sheet thickness 226, and thus is also within the predefined tolerance range for shroud thickness 594 of shaped sealant shroud 590, as intended.

Referring generally to FIGS. 1 and 10 and particularly to, e.g., FIGS. 19A, 19B, 19C, and 19D, method 1900 further comprises, after (block 1914) applying suction to vacuum-form second polymer sheet 220 over fastener template 202, (block 1920) forming second plurality of through-openings 230 in second-sheet peripheral portion 232 of second polymer sheet 220. Second-sheet peripheral portion 232 contacts first side 216 of support plate 210. Second plurality of through-openings 230 is aligned with, and is communicatively coupled with, first plurality of through-openings 212, penetrating support plate 210. The preceding subject matter of this paragraph characterizes example 57 of the present disclosure, wherein example 57 also includes the subject matter according to example 54, above.

In various examples, after precursor cap 320 is formed from second polymer sheet 220, second-sheet peripheral portion 232 of second polymer sheet 220 remains on first side 216 of support plate 210 while fitted cap 300 is vacuum-formed over precursor cap 320. Second plurality of through-openings 230 in second-sheet peripheral portion 232 facilitate application of suction through first plurality of through-openings 212 from second side 218 of support plate 210 to vacuum-form first polymer sheet 270 over precursor cap 320. For example, second plurality of through-openings 230 is formed in second-sheet peripheral portion 232 one-by-one using a punch tool (not shown) on second-sheet peripheral portion 232 while second-sheet peripheral portion 232 is positioned on first side 216 of support plate 210 over first plurality of through-openings 212. For another example, second plurality of through-openings 230 is formed in second-sheet peripheral portion 232 simultaneously using a jig (not shown), having punches spaced to match a spacing of first plurality of through-openings 212, on second-sheet peripheral portion 232 while second-sheet peripheral portion 232 is positioned on first side 216 of support plate 210 over first plurality of through-openings 212. Alternatively, second-sheet peripheral portion 232 is trimmed from precursor cap 320 and removed from support plate 210 before fitted cap 300 is vacuum-formed over precursor cap 320.

Referring generally to FIGS. 1, 9, and 12 and particularly to, e.g., FIGS. 19A, 19B, 19C, and 19D, according to method 1900, (block 1910) forming precursor cap 320 comprises (block 1922) heating second polymer sheet 220 to a second specified temperature, (block 1924) applying suction to second polymer sheet 220, positioned second predetermined distance 207 from first side 216 of support plate 210 and heated to the second specified temperature, through first plurality of through-openings 212 from second side 218 of support plate 210 to vacuum-form second polymer sheet 220 over fastener template 202, and (block 1926) applying suction to release sheet 380 through first plurality of through-openings 212 from second side 218 of support plate 210 to vacuum-form release sheet 380 over fastener template 202 and second polymer sheet 220. After vacuum-forming release sheet 380 over fastener template 202, at least a portion of second polymer sheet 220 and at least a portion of release sheet 380 form precursor cap 320 and precursor-cap thickness 326 corresponds to a sum of second-sheet thickness 226 of second polymer sheet 220 and release-sheet thickness 386 of release sheet 380. The preceding subject matter of this paragraph characterizes example 58 of the present disclosure, wherein example 58 also includes the subject matter according to example 53, above.

Release sheet 380 is a solid sheet that inhibits adhesion of first polymer sheet 270 to precursor cap 320 during and after vacuum-forming, and avoids depositing residue that may be associated with flowable/spreadable release agent 382 on fitted cap 300. In one example, precursor cap 320 is formed from second polymer sheet 220, having second-sheet thickness 226, and from release sheet 380, having release-sheet thickness 386. Accordingly, precursor cap 320 has precursor-cap thickness 326 that is a sum of second-sheet thickness 226 and release-sheet thickness 386. For example, release sheet 380 is formed from fluorinated ethylene propylene ("FEP").

Referring generally to FIGS. 1, 9, and 12 and particularly to, e.g., FIGS. 19A, 19B, 19C, and 19D, method 1900 further comprises (block 1928) forming second plurality of through-openings 230 in second-sheet peripheral portion 232 of second polymer sheet 220 and (block 1930) forming third plurality of through-openings 390 in release-sheet peripheral portion 392 of release sheet 380. Second-sheet peripheral portion 232 contacts first side 216 of support plate 210 and release-sheet peripheral portion 392 contacts second-sheet peripheral portion 232. Second plurality of through-openings 230 of second polymer sheet 220 and third plurality of through-openings 390 of release sheet 380 are aligned with, and are communicatively coupled with, first plurality of through-openings 212, penetrating support plate 210. The preceding subject matter of this paragraph characterizes example 59 of the present disclosure, wherein example 59 also includes the subject matter according to example 58, above.

In various examples, after second polymer sheet 220 is vacuum-formed over fastener template 202, second-sheet peripheral portion 232 of second polymer sheet 220 remains on first side 216 of support plate 210 while release sheet 380 is vacuum-formed over the portion of second polymer sheet 220 covering fastener template 202. Second plurality of through-openings 230 in second-sheet peripheral portion 232 facilitate application of suction through first plurality of through-openings 212 from second side 218 of support plate 210 to vacuum-form release sheet 380 over the portion of second polymer sheet 220 covering fastener template 202. Similarly, release-sheet peripheral portion 392 of release sheet 380 remains on second-sheet peripheral portion 232, which remains on first side 216 of support plate 210, while release sheet 380 is vacuum-formed over the portion of second polymer sheet 220 covering fastener template 202. Third plurality of through-openings 390 in release-sheet peripheral portion 392 facilitate application of suction through first plurality of through-openings 212 from second side 218 of support plate 210 to vacuum-form fitted cap 300 over precursor cap 320. For example, second plurality of through-openings 230 and/or third plurality of through-openings 390 is formed using a punch tool (not shown) or a jig (not shown), as described above.

Referring generally to FIGS. 1, 13, and 14 and particularly to, e.g., FIGS. 19A, 19B, 19C, and 19D, method 1900 further comprises, after (block 1906) vacuum-forming first polymer sheet 270 over precursor cap 320, (block 1932)

severing first-sheet peripheral portion 282 of first polymer sheet 270 from fitted cap 300. First-sheet peripheral portion 282 is parallel to first side 216 of support plate 210 and is positioned circumferentially around fastener template 202. The preceding subject matter of this paragraph characterizes example 60 of the present disclosure, wherein example 60 also includes the subject matter according to example 51, above.

Severing first-sheet peripheral portion 282 of first polymer sheet 270 from fitted cap 300 facilitates ease of handling and storage of fitted cap 300.

Referring generally to FIGS. 1, 3, 13, and 14 and particularly to, e.g., FIGS. 19A, 19B, 19C, and 19D, according to method 1900, (block 1902) covering fastener template 202 with precursor cap 320 further comprises (block 1934) covering spacer 280, coupled between first side 216 of support plate 210 and fastener template 202, with precursor cap 320. Spacer 280 has spacer thickness 286, corresponding to one of (i) precursor-cap thickness 326 or (ii) a sum of first-sheet thickness 276 of first polymer sheet 270 and precursor-cap thickness 326. The preceding subject matter of this paragraph characterizes example 61 of the present disclosure, wherein example 61 also includes the subject matter according to example 60, above.

In various examples, flange 340 extends from precursor cap 320 and is sandwiched between first cap end 308 of fitted cap 300 and first side 216 of support plate 210. Flange 340 tends to create a vertical offset of fitted cap 300 with respect to fastener template 202, as compared to a vertical alignment of fitted cap 300 with portion 106 of fastener 100. Spacer 280 is sized to correct for the vertical offset created by flange 340. Thus, during formation of fitted cap 300, spacer 280 facilitates forming fitted cap 300 to be positionable over portion 106 of fastener 100 such that uniform gap 302 is formed accurately, with first cap end 308 positioned against base surface 103 on which fastener 100 is installed, between first inner surface 342 of fitted cap 300 and portion 106 of fastener 100. Alternatively, flange 340 is trimmed from precursor cap 320 before fitted cap 300 is vacuum-formed over precursor cap 320.

Referring generally to FIGS. 1, 3, and 13 and particularly to, e.g., FIGS. 19A, 19B, 19C, and 19D, according to method 1900, spacer thickness 286 corresponds to precursor-cap thickness 326 and (block 1932) severing first-sheet peripheral portion 282 of first polymer sheet 270 from fitted cap 300 results in (block 1936) separating first-sheet peripheral portion 282 of first polymer sheet 270 from fitted cap 300 along separation surface 283, oriented perpendicular to first side 216 of support plate 210 and extending circumferentially about central axis 204 of fastener template 202. The preceding subject matter of this paragraph characterizes example 62 of the present disclosure, wherein example 62 also includes the subject matter according to example 61, above.

Severing first-sheet peripheral portion 282 of first polymer sheet 270 along separation surface 283 oriented perpendicular to first side 216, combined with spacer thickness 286 corresponding to pre-cursor cap thickness 326, facilitates forming fitted cap 300 to be positionable over portion 106 of fastener 100 such that uniform gap 302 is formed between wall 305 and portion 106 of fastener 100 with first cap end 308 of fitted cap 300 positioned against base surface 103 on which fastener 100 is installed.

Referring generally to FIGS. 1, 3, and 14 and particularly to, e.g., FIGS. 19A, 19B, 19C, and 19D, according to method 1900, spacer thickness 286 corresponds to the sum of first-sheet thickness 276 and precursor-cap thickness 326 and (block 1932) severing first-sheet peripheral portion 282 of first polymer sheet 270 from fitted cap 300 results in (block 1938) separating first-sheet peripheral portion 282 of first polymer sheet 270 from fitted cap 300 along separation surface 285, oriented parallel to first side 216 of support plate 210 and extending circumferentially about central axis 204 of fastener template 202. The preceding subject matter of this paragraph characterizes example 63 of the present disclosure, wherein example 63 also includes the subject matter according to example 61, above.

Severing first-sheet peripheral portion 282 of first polymer sheet 270 along separation surface 285, oriented parallel to first side 216, combined with spacer thickness 286, corresponding to a sum of first-sheet thickness 276 and precursor-cap thickness 326, facilitates forming fitted cap 300 to be positionable over portion 106 of fastener 100 such that uniform gap 302 is formed between wall 305 and portion 106 of fastener 100 with first cap end 308 of fitted cap 300 positioned against base surface 103 on which fastener 100 is installed.

Referring generally to FIGS. 1 and 3 and particularly to, e.g., FIGS. 19A, 19B, 19C, and 19D, according to method 1900, fastener template 202 comprises fastener-template outer surface 203 that extends circumferentially about central axis 204 of fastener template 202. Additionally, according to method 1900, (block 1906) applying suction to first polymer sheet 270 further comprises (block 1940) vacuum-forming first polymer sheet 270 such that first inner surface 342 of fitted cap 300 is parallel to fastener-template outer surface 203. The preceding subject matter of this paragraph characterizes example 64 of the present disclosure, wherein example 64 also includes the subject matter according to example 51, above.

Fastener-template outer surface 203, extending circumferentially about central axis 204 of fastener template 202, facilitates fastener template 202 representing fastener 100 having a shape, elongated along a central axis, such as a bolt-and-nut or rivet-type fastener.

Referring generally to FIGS. 1-4 and particularly to, e.g., FIGS. 19A, 19B, 19C, and 19D, method 1900 further comprises (block 1942) covering at least a portion of insert 250 with precursor cap 320. Insert 250 extends away from first side 216 of support plate 210. Precursor cap 320 further comprises third surface 323, contiguous with first surface 322 and geometrically complementary to insert 250, and fourth surface 325, contiguous with second surface 324, opposite third surface 323, and parallel to third surface 323. Additionally, according to method 1900, (block 1906) applying suction to first polymer sheet 270 further comprises (block 1944) vacuum-forming first polymer sheet 270 such that second inner surface 343 of fitted cap 300 is geometrically complementary to fourth surface 325 of precursor cap 320. Second inner surface 343 of fitted cap 300 is contiguous with first inner surface 342 of fitted cap 300. The preceding subject matter of this paragraph characterizes example 65 of the present disclosure, wherein example 65 also includes the subject matter according to example 51, above.

Insert 250 is positioned at least partially underneath precursor cap 320, such that different portions of precursor cap 320 conform respectively to fastener template 202 and to insert 250. Because fitted cap 300 is vacuum-formed against precursor cap 320, insert 250 also causes different portions of fitted cap 300 to be parallel to, and offset from, fastener template 202 and insert 250, respectively. In other words, insert 250 causes a portion of fitted cap 300 to correspond in shape to an element other than portion 106 of fastener 100. For example, insert 250 causes a portion of fitted cap 300 to be shaped to cooperate with cap-manipulation tool 500 described above. Thus, fitted cap 300 is formed unitarily to both form uniform gap 302 over portion 106 of fastener 100, and to cooperate with an element of another system 501 and/or 1501 described above.

Referring generally to FIGS. 1-4 and particularly to, e.g., FIGS. 19A, 19B, 19C, and 19D, according to method 1000, (block 1942) covering at least the portion of insert 250 with precursor cap 320 comprises (block 1946) covering tapered portion 252 of insert 250 with precursor cap 320. A direction of taper of tapered portion 252 is oriented parallel to central axis 204 of fastener template 202. The preceding subject matter of this paragraph characterizes example 66 of the present disclosure, wherein example 66 also includes the subject matter according to example 65, above.

Tapered portion 252 facilitates forming fitted cap 300 unitarily with tapered interface portion 310 that is built into fitted cap 300 to interface with cap-manipulation tool 500 described above.

Referring generally to FIGS. 1-4 and particularly to, e.g., FIGS. 19A, 19B, 19C, and 19D, according to method 1900, (block 1942) covering at least the portion of insert 250 with precursor cap 320 comprises (block 1948) penetrating precursor cap 320 from third surface 323 through to fourth surface 325 by piercing member 254 of insert 250. Piercing member 254 is oriented parallel to central axis 204 of fastener template 202. The preceding subject matter of this paragraph characterizes example 67 of the present disclosure, wherein example 67 also includes the subject matter according to example 65, above.

Piercing member 254 facilitates forming fitted cap 300 unitarily with, for example, inlet opening 306 that is built into fitted cap 300 to receive sealant from cap-manipulation tool 500, as described above, or forming fitted cap 300 unitarily with relief opening 316 that is built into fitted cap 300 to vent sealant 592 from fitted cap 300 into cap-manipulation tool 500, as described above. Alternatively, inlet opening 306 or relief opening 316 are added separately, after the initial process of forming fitted cap 300.

Referring generally to FIGS. 1-3 and 5 and particularly to, e.g., FIGS. 19A, 19B, 19C, and 19D, method 1900 further comprises (block 1950) positioning insert 250 such that precursor cap 320 is between fastener template 202 and insert 250. Insert 250 extends away from first side 216 of support plate 210. Additionally, according to method 1900, (block 1906) applying suction to first polymer sheet 270 further comprises (block 1952) vacuum-forming first polymer sheet 270 such that second inner surface 343 of fitted cap 300 is geometrically complementary to insert outer surface 253 of insert 250. Second inner surface 343 of fitted cap 300 is contiguous with first inner surface 342 of fitted cap 300. The preceding subject matter of this paragraph characterizes example 68 of the present disclosure, wherein example 68 also includes the subject matter according to example 51, above.

Insert 250 is positioned outside, such as immediately on top of, precursor cap 320, such that different portions of fitted cap 300 conform respectively to precursor cap 320 and to insert 250. Because precursor cap 320 comprises first surface 322, geometrically complementary to fastener template 202, insert 250 causes different portions of fitted cap 300 to be parallel to, and offset from, fastener template 202 and insert 250, respectively. In other words, insert 250 causes a portion of fitted cap 300 to correspond in shape to an element other than portion 106 of fastener 100. For example, insert 250 causes a portion of fitted cap 300 to be shaped to cooperate with cap-manipulation tool 500 described above. Thus, fitted cap 300 is formed unitarily to both form uniform gap 302 over portion 106 of fastener 100, and to cooperate with an element of another system 501 and/or 1501 described above.

Generally, in various examples, different portions of fitted cap 300 can be formed parallel to, and offset from, fastener template 202 and insert 250, respectively, either by positioning insert 250 at least partially underneath precursor cap 320, as in example 65, or by positioning precursor cap 320 between fastener template 202 and insert 250, as in example 68.

Referring generally to FIGS. 1-3 and 5 and particularly to, e.g., FIGS. 19A, 19B, 19C, and 19D, according to method 1900, (block 1950) positioning insert 250 comprises (block 1954) positioning tapered portion 252 of insert 250 such that precursor cap 320 is between fastener template 202 and tapered portion 252 and (block 1956) orienting a direction of taper of tapered portion 252 parallel to central axis 204 of fastener template 202. The preceding subject matter of this paragraph characterizes example 69 of the present disclosure, wherein example 69 also includes the subject matter according to example 68, above.

Tapered portion 252 facilitates forming fitted cap 300 unitarily with tapered interface portion 310 that is built into fitted cap 300 to interface with cap-manipulation tool 500, described above.

Referring generally to FIGS. 1-3 and 5 and particularly to, e.g., FIGS. 19A, 19B, 19C, and 19D, according to method 1000, (block 1950) positioning insert 250 further comprises (block 1958) orienting piercing member 254 of insert 250 parallel to central axis 204 of fastener template 202 such that piercing member 254 extends away from precursor cap 320. The preceding subject matter of this paragraph characterizes example 70 of the present disclosure, wherein example 70 also includes the subject matter according to example 68, above.

Piercing member 254 facilitates forming fitted cap 300 unitarily with, for example, inlet opening 306 that is built into fitted cap 300 to receive sealant from cap-manipulation tool 500, as described above, or forming fitted cap 300 unitarily with relief opening 316 that is built into fitted cap 300 to vent sealant 592 from fitted cap 300 into cap-manipulation tool 500, as described above. Alternatively, inlet opening 306 or relief opening 316 are added separately, after the initial process of forming fitted cap 300.

Referring generally to FIGS. 1, 3, and 6 and particularly to, e.g., FIGS. 19A, 19B, 19C, and 19D, method 1900 further comprises (block 1960) coupling frame 240 to first polymer sheet 270 and (block 1962) manipulating frame 240 to position first polymer sheet 270 at predetermined distance 205 from first side 216 of support plate 210. The preceding subject matter of this paragraph characterizes example 71 of the present disclosure, wherein example 71 also includes the subject matter according to example 51, above.

Frame 240 facilitates handling and positioning of first polymer sheet 270, particularly during heating by first means 217 and subsequently while first polymer sheet 270 is in the heated, plastic state.

Referring generally to FIGS. 1, 3, and 6 and particularly to, e.g., FIGS. 19A, 19B, 19C, and 19D, according to method 1900, frame 240 comprises perimeter 248, enclosing opening 249 that extends therethrough, and (block 1960) coupling frame 240 to first polymer sheet 270 comprises (block 1964) securing first polymer sheet 270 to perimeter 248 such that first polymer sheet 270 extends across opening 249. The preceding subject matter of this paragraph characterizes example 72 of the present disclosure, wherein example 72 also includes the subject matter according to example 71, above.

Frame 240 facilitates accurate placement of first polymer sheet 270, extending across opening 249, over fastener template 202, while perimeter 248 is gripped by a hand of a user.

Referring generally to FIGS. 1, 3, and 6 and particularly to, e.g., FIGS. 19A, 19B, 19C, and 19D, according to method 1900, frame 240 comprises first frame side 242 and second frame side 244, opposite first frame side 242, and (block 1960) coupling frame 240 to first polymer sheet 270 comprises (block 1966) coupling first frame side 242 and second frame side 244 together to secure first polymer sheet 270 therebetween. The preceding subject matter of this paragraph characterizes example 73 of the present disclosure, wherein example 73 also includes the subject matter according to example 71 or 72, above.

First frame side 242 and second frame side 244 being coupleable together facilitates ease of coupling first polymer sheet 270 to frame 240.

Referring generally to FIGS. 1, 3, 7, and 8 and particularly to, e.g., FIGS. 19A, 19B, 19C, and 19D, method 1900 further comprises (block 1968) coupling precursor label 330 to precursor cap 320. Additionally, according to method 1900, (block 1906) applying suction to first polymer sheet 270 further comprises (block 1970) vacuum-forming first polymer sheet 270 such that embedded label 314 is imprinted in fitted cap 300 by precursor label 330. The preceding subject matter of this paragraph characterizes example 74 of the present disclosure, wherein example 74 also includes the subject matter according to example 51, above.

Use of precursor label 330 to imprint embedded label 314 facilitates permanent identification of fitted cap 300 from the moment of manufacture, for example by imprinting a code that identifies a type and size of fastener 100 with which fitted cap 300 is intended to be used. For example, precursor label 330 includes raised or embossed edges that form imprints in fitted cap 300 as fitted cap 300 is vacuum-formed against precursor cap 320. A depth of the edges is sufficiently small to have a negligible effect on shroud thickness 594 after fitted cap 300 is rotated with cap-manipulation tool 500, as described above. In various examples, precursor label 330 is one of alphanumeric, a bar code, or any other suitable label or code that enables embedded label to be imprinted on fitted cap 300.

Referring generally to FIGS. 1, 3, 7, and 8 and particularly to, e.g., FIGS. 19A, 19B, 19C, and 19D, method 1900 further comprises (block 1972) preselecting a color of first polymer sheet 270 that differs from a color of precursor cap 320. The preceding subject matter of this paragraph characterizes example 75 of the present disclosure, wherein example 75 also includes the subject matter according to example 51, above.

Reserving a particular color for precursor cap 320 facilitates prevention of accidental entry of precursor cap 320 into field service. Precursor cap 320 is sized to facilitate forming fitted cap 300 at an offset from fastener template 202, and thus is not sized for use directly in applying shaped sealant shroud 590 to portion 106 of fastener 100. Reserving a particular color, such as red, for precursor cap 320 serves as a visual warning to prevent precursor cap 320, rather than fitted cap 300 formed from first polymer sheet 270 of a different color, from inadvertently being placed over fastener 100.

Referring generally to FIGS. 1, 3, 7, and 8 and particularly to, e.g., FIGS. 19A, 19B, 19C, and 19D, method 1900 further comprises (block 1974) associating a color of first polymer sheet 270 with at least one of a type or a size of fastener 100. The preceding subject matter of this paragraph characterizes example 76 of the present disclosure, wherein example 76 also includes the subject matter according to example 51, above.

Associating the color of first polymer sheet 270, which is also the color of fitted cap 300, with the size and/or type of fastener 100 with which it is intended to be used facilitates permanent identification, from the moment of manufacture of fitted cap 300, of the type and/or size of fastener 100 for which fitted cap 300 is sized. Reserving a particular color of first polymer sheet 270 for each size and type of fitted cap 300, corresponding to the size and type of fastener 100 with which fitted cap 300 is intended for use, serves as a visual indicator to ensure that a correct size and type of fitted cap 300 is placed over fastener 100 to apply shaped sealant shroud 594.

Referring generally to FIGS. 2, 15, and 16 and particularly to, e.g., FIGS. 20A and 20B, method 2000 for applying shaped sealant shroud 590 to portion 106 of fastener 100 is disclosed. Method 2000 comprises (block 2002) positioning fitted cap 300, comprising wall 305, over portion 106 of fastener 100 such that uniform gap 302 is formed between wall 305 of fitted cap 300 and portion 106 of fastener 100. Fitted cap 300 further comprises inlet opening 306, fully penetrating wall 305, such that inlet opening 306 is configured to be communicatively coupled with uniform gap 302. Fitted cap 300 also comprises vent 309, fully penetrating wall 305, such that vent 309 is configured to be communicatively coupled with uniform gap 302. Inlet opening 306 and vent 309 are spaced apart from each other along wall 305. Method 2000 further comprises (block 2004) coupling cap-manipulation tool 500 to fitted cap 300. Cap-manipulation tool 500 comprises shaft 510, and shaft 510 comprises through, circumferentially closed, channel 516, configured to be communicatively coupled with inlet opening 306 of fitted cap 300. Method 2000 additionally comprises (block 2006) supplying sealant 592 into through, circumferentially closed, channel 516 of shaft 510, through inlet opening 306 of fitted cap 300, and into uniform gap 302. Vent 309 is oriented to purge gas from uniform gap 302 as sealant 592 is communicated through the through, circumferentially closed, channel 516 and into uniform gap 302. Method 2000 also comprises (block 2008) rotating shaft 510 about longitudinal central axis 518 of shaft 510. Fitted cap 300 rotates together with shaft 510 such that sealant 592 is distributed in uniform gap 302 to form shaped sealant shroud 590 around portion 106 of fastener 100. The preceding subject matter of this paragraph characterizes example 77 of the present disclosure.

Providing cap-manipulation tool 500 and fitted cap 300 as separate components that may be coupled together enables use of a single cap-manipulation tool 500 with a variety of sizes and shapes of fitted cap 300. It should be understood that each of a variety of sizes and shapes of fitted cap 300 may be designed for use with a respective size and type of fastener 100. Also, fitted cap 300 being rotatable together with shaft 510 about longitudinal central axis 518, with fitted cap 300 positioned over portion 106 of fastener 100, facilitates even spreading of sealant 592 supplied through the through, circumferentially closed, channel 516 over an entire surface of portion 106 of fastener 100 via a simple rotation of shaft 510. For example, rotation of shaft 510 about longitudinal central axis 518, with fitted cap 300 positioned over portion 106 of fastener 100, tends to balance a distribution of sealant 592 around a circumference of portion 106 and/or to dynamically center fitted cap 300 over portion 106 of fastener 100. Additionally, inlet opening 306 and vent 309 cooperate to facilitate purging gas from uniform gap 302 as sealant 592 is fed through the through, circumferentially closed, channel 516 of cap-manipulation tool 500, inhibiting the formation of air bubbles or other imperfections in shaped sealant shroud 590.

Referring generally to FIGS. 2, 15, and 16 and particularly to, e.g., FIGS. 20A and 20B, according to method 2000, fastener 100 is installed on first member 102 such that portion 106 of fastener 100 extends from base surface 103 of first member 102. Method 2000 further comprises (block 2010) mounting first cap end 308 of fitted cap 300 against base surface 103. The preceding subject matter of this paragraph characterizes example 78 of the present disclosure, wherein example 78 also includes the subject matter according to example 77, above.

First cap end 308 configured to mount against base surface 103 enables fitted cap 300 to be positioned directly on first member 102 during application of sealant 592, reducing an amount of leakage, dripping, or other inadvertent application of sealant 592 to first member 102.

Referring generally to FIGS. 2, 15, and 16 and particularly to, e.g., FIGS. 20A and 20B, according to method 2000, (block 2002) positioning fitted cap 300 over portion 106 of fastener 100 comprises (block 2012) positioning fitted cap 300 such that gap width 312 of uniform gap 302 is within a predefined tolerance range for shroud thickness 594 of shaped sealant shroud 590 on portion 106 of fastener 100. The preceding subject matter of this paragraph characterizes example 79 of the present disclosure, wherein example 79 also includes the subject matter according to example 77 or 78, above.

Selection of a size and a type of fitted cap 300 provides gap width 312 within the predetermined tolerance for shroud thickness 594 on portion 106 of fastener 100, and thus causes a correct thickness of sealant 592 to be applied to portion 106 of fastener 100. For example, fitted cap 300 is previously formed according to any one of examples 51 to 76, above, using fastener template 202 dimensionally identical to portion 106 of fastener 100.

Referring generally to FIGS. 15 and 16 and particularly to, e.g., FIGS. 20A and 20B, according to method 2000, shaft 510 extends longitudinally from first shaft end 512 to second shaft end 514. Method 2000 further comprises (block 2014) coupling interface bushing 550 between second shaft end 514 and fitted cap 300. Additionally, according to method 2000, (block 2006) supplying sealant 592 into through, circumferentially closed, channel 516 through inlet opening 306 of fitted cap 300 and into uniform gap 302 further comprises (block 2016) supplying sealant 592 from through, circumferentially closed, channel 516 through passage 562 that extends through interface bushing 550, through inlet opening 306, and into uniform gap 302. The preceding subject matter of this paragraph characterizes example 80 of the present disclosure, wherein example 80 also includes the subject matter according to any one of examples 77 to 79, above.

Interface bushing 550 simplifies coupling of shaft 510 to fitted cap 300. In various examples, interface bushing 550 also extends an operational lifetime of fitted cap 300. For example, shaft 510 may be made from a metallic material that would wear on a relatively thin plastic used to form fitted cap 300, and interface bushing 550 may be made from a thicker plastic that can better withstand coupling to the metallic material while wearing less on fitted cap 300. Interface bushing 550 may also be provided in various sizes to facilitate matching a single size of shaft 510 to multiple sizes and/or types of fitted cap 300.

Referring generally to FIGS. 15 and 16 and particularly to, e.g., FIGS. 20A and 20B, according to method 2000, fitted cap 300 comprises tapered interface portion 310. Interface bushing 550 comprises sidewall 556, having sidewall taper angle 558 relative to longitudinal central axis 518. Also, according to method 2000, (block 2014) coupling interface bushing 550 between second shaft end 514 of shaft 510 and fitted cap 300 comprises (block 2018) coupling sidewall 556 of interface bushing 550 to tapered interface portion 310 of fitted cap 300 with an interference fit. The preceding subject matter of this paragraph characterizes example 81 of the present disclosure, wherein example 81 also includes the subject matter according to example 80, above.

The interference fit between sidewall 556 (which is tapered, as provided above) of interface bushing 550 and tapered interface portion 310 of fitted cap 300 provides a simple and efficient structure for releasably coupling cap-manipulation tool 500 to fitted cap 300. For example, tapered interface portion 310 of fitted cap 300 is previously formed according to one of examples 66 or 69, above, using insert 250.

Referring generally to FIGS. 15 and 16 and particularly to, e.g., FIGS. 20A and 20B, according to method 2000, (block 2018) coupling sidewall 556 of interface bushing 550 to tapered interface portion 310 of fitted cap 300 comprises (block 2020) coupling sidewall 556, having sidewall taper angle 558 that differs by at least 10 degrees from cap taper angle 311, defined by tapered interface portion 310 of fitted cap 300 relative to longitudinal central axis 518. The preceding subject matter of this paragraph characterizes example 82 of the present disclosure, wherein example 82 also includes the subject matter according to example 81, above.

The difference between sidewall taper angle 558 of sidewall 556 of interface bushing 550 and cap taper angle 311 inhibits interface bushing 550 and fitted cap 300 from becoming locked together during use.

Referring generally to FIGS. 15 and 16 and particularly to, e.g., FIGS. 20A and 20B, method 2000 further comprises (block 2022) coupling skirt 560 of interface bushing 550 to second shaft end 514 of shaft 510 with an interference fit. The preceding subject matter of this paragraph characterizes example 83 of the present disclosure, wherein example 83 also includes the subject matter according to any one of examples 80 to 82, above.

The difference between sidewall taper angle 558 of sidewall 556 of interface bushing 550 and cap taper angle 311 inhibits interface bushing 550 and fitted cap 300 from becoming locked together during use.

Referring generally to FIGS. 15 and 16 and particularly to, e.g., FIGS. 20A and 20B, according to method 2000, cap-manipulation tool 500 further comprises handle 530, coupled to shaft 510. Additionally, according to method 2000, (block 2008) rotating shaft 510 about longitudinal central axis 518 of shaft 510 is accomplished by (block 2024) moving handle 530. The preceding subject matter of this paragraph characterizes example 84 of the present disclosure, wherein example 84 also includes the subject matter according to example 77, above.

Handle 530 is configured to be manipulated by a user to rotate shaft 510 to evenly spread sealant 592 on portion 106 of fastener 100.

Referring generally to FIGS. 15 and 16 and particularly to, e.g., FIGS. 20A and 20B, according to method 2000, shaft 510 extends between first shaft end 512 and second shaft end 514. Also, according to method 2000, (block 2008) rotating shaft 510 about longitudinal central axis 518 of shaft 510 is accomplished by (block 2026) longitudinally translating handle 530 between first shaft end 512 and second shaft end 514. The preceding subject matter of this paragraph characterizes example 85 of the present disclosure, wherein example 85 also includes the subject matter according to example 84, above.

The user can apply a simple longitudinal motion to handle 530 to rotate shaft 510 to evenly spread sealant 592 on portion 106 of fastener 100.

Referring generally to FIGS. 15 and 16 and particularly to, e.g., FIGS. 20A and 20B, according to method 2000, (block 2026) longitudinally translating handle 530 between first shaft end 512 and second shaft end 514 comprises (block 2028) longitudinally non-concurrently translating handle 530 in two opposing axial directions between first shaft end 512 and second shaft end 514 such that shaft 510 respectively non-concurrently rotates in two opposing rotational directions about longitudinal central axis 518. The preceding subject matter of this paragraph characterizes example 86 of the present disclosure, wherein example 86 also includes the subject matter according to example 85, above.

The user can apply a simple up-and-down longitudinal motion to handle 530 to rotate shaft 510 back-and-forth in opposing directions e.g., clockwise and counter-clockwise to evenly spread sealant 592 on portion 106 of fastener 100. In various examples, the two opposing axial directions are parallel to longitudinal central axis 518.

Referring generally to FIGS. 15 and 16 and particularly to, e.g., FIGS. 20A and 20B, according to method 2000, cap-manipulation tool 500 further comprises biasing element 580. Additionally, according to method 200, (block 2026) longitudinally translating handle 530 between first shaft end 512 and second shaft end 514 further comprises (block 2030) biasing, by biasing element 580, handle 530 in a return direction toward first shaft end 512 in response to longitudinal translation of handle 530 toward second shaft end 514. The preceding subject matter of this paragraph characterizes example 87 of the present disclosure, wherein example 87 also includes the subject matter according to example 86, above.

After the user moves handle 530 in a longitudinal direction to rotate shaft 510 in one rotational direction about longitudinal central axis 518, biasing element 580 assists the user by applying a return force that tends to move handle 530 in the opposing longitudinal direction to rotate shaft 510 in the opposing rotational direction. For example, biasing element 580 is a coil spring.

Referring generally to FIGS. 15 and 16 and particularly to, e.g., FIGS. 20A and 20B, according to method 2000, shaft 510 further comprises helical groove 520, located on outer surface 522 of shaft 510. Handle 530 comprises cam 534. Additionally, according to method 2000, (block 2024) moving handle 530 comprises (block 2032) longitudinally translating handle 530 such that cam 534 moves within helical groove 520 to rotate shaft 510 about longitudinal central axis 518. The preceding subject matter of this paragraph characterizes example 88 of the present disclosure, wherein example 88 also includes the subject matter according to any one of examples 84 to 87, above.

The cooperation of cam 534 and helical groove 520 transforms up-and-down longitudinal motion applied to handle 530 into back-and-forth rotational motion of shaft 510.

Referring generally to FIGS. 15 and 16 and particularly to, e.g., FIGS. 20A and 20B, according to method 2000, handle 530 further comprises body 540 that has handle cavity 532. Cam 534 projects inwardly from body 540 into handle cavity 532. Method 2000 further comprises (block 2034) receiving shaft 510 through handle cavity 532 with a clearance fit. The preceding subject matter of this paragraph characterizes example 89 of the present disclosure, wherein example 89 also includes the subject matter according to example 88, above.

Receiving shaft 510 through body 540 of handle 530 stabilizes shaft 510 in a vertical orientation as the cooperation of cam 534 and helical groove 520 transforms up-and-down longitudinal motion applied to handle 530 into back-and-forth rotational motion of shaft 510.

Referring generally to FIGS. 15 and 16 and particularly to, e.g., FIGS. 20A and 20B, according to method 2000, handle 530 further comprises extension 536 that extends outwardly from shaft 510 at an angle relative to longitudinal central axis 518. Additionally, according to method 2000, (block 2024) moving handle 530 comprises (block 2036) manipulating the extension 536 by a hand of a user. The preceding subject matter of this paragraph characterizes example 90 of the present disclosure, wherein example 90 also includes the subject matter according to any one of examples 84 to 87, above.

Extension 536 enables a user to manipulate handle 530 up and down to rotate shaft 510 in cases where fastener 100 is located in a confined space.

Referring generally to FIGS. 15 and 16 and particularly to, e.g., FIGS. 20A and 20B, according to method 2000, handle 530 further comprises body 540 and joint 538. Shaft 510 is received through handle cavity 532, located in body 540, with a clearance fit. Extension 536 is coupled to body 540 at joint 538. Additionally, according to method 2000, (block 2036) manipulating extension 536 by the hand of the user comprises (block 2038) moving extension 536 among a plurality of orientations about joint 538 with respect to body 540. The preceding subject matter of this paragraph characterizes example 91 of the present disclosure, wherein example 91 also includes the subject matter according to example 90, above.

Joint 538 coupling body 540 and extension 536 further enables a user to manipulate handle 530 up and down by hand to rotate shaft 510 in cases where fastener 100 is located in a confined space.

Referring generally to FIGS. 2, 17, and 18 and particularly to, e.g., FIGS. 21A and 21B, method 2100 for applying shaped sealant shroud 590 to portion 106 of fastener 100 is disclosed. Method 2100 comprises (block 2102) coupling cap-manipulation tool 500 to fitted cap 300. Fitted cap 300 comprises wall 305, cap cavity 303, defined by wall 305, and relief opening 316 that fully penetrates wall 305. Cap-manipulation tool 500 comprises shaft 510 that comprises through, circumferentially closed, channel 516, configured to be communicatively coupled with relief opening 316 of fitted cap 300. Method 2100 further comprises (block 2104) introducing sealant 592 into cap cavity 303 and (block 2106) positioning fitted cap 300 over portion 106 of fastener 100 such that (i) portion 106 is received within cap cavity 303, (ii) uniform gap 302 is formed between wall 305 of fitted cap 300 and portion 106 of fastener 100, and (iii) relief opening 316 of fitted cap 300 is communicatively coupled with uniform gap 302. Method 2100 additionally comprises (block 2108) rotating shaft 510 about longitudinal central axis 518 of shaft 510. Fitted cap 300 rotates together with shaft 510 such that sealant 592, previously introduced into cap cavity 303, is distributed in uniform gap 302 to form shaped sealant shroud 590 around portion 106 of fastener 100. Relief opening 316 is oriented to purge at least one of gas or excess of sealant 592 from uniform gap 302. The preceding subject matter of this paragraph characterizes example 92 of the present disclosure.

Providing cap-manipulation tool 500 and fitted cap 300 as separate components that may be coupled together enables use of a single cap-manipulation tool 500 with a variety of sizes and shapes of fitted cap 300. It should be understood that each of a variety of sizes and shapes of fitted cap 300 may be designed for use with a respective size and type of fastener 100. Also, fitted cap 300 being rotatable together with shaft 510 about longitudinal central axis 518, with fitted cap 300 positioned over portion 106 of fastener 100, facilitates even spreading of sealant 592 supplied through the through, circumferentially closed, channel 516 over an entire surface of portion 106 of fastener 100 via a simple rotation of shaft 510. For example, rotation of shaft 510 about longitudinal central axis 518, with fitted cap 300 positioned over portion 106 of fastener 100, tends to balance a distribution of sealant 592 around a circumference of portion 106 and/or to dynamically center fitted cap 300 over portion 106 of fastener 100. Additionally, relief opening 316 and through, circumferentially closed, channel 516 of shaft 510 cooperate to facilitate purging gas and/or excess sealant from uniform gap 302, inhibiting the formation of air bubbles or other imperfections in shaped sealant shroud 590.

Method 2100 is similar to method 2000, described above, in many respects. One respect in which method 2100 differs from method 2000 is that method 2100 includes steps that include fitted cap 300 having relief opening 316, rather than inlet opening 306 and vent 309. As described above, relief opening 316 provides for relief of excess sealant and/or gas from cap cavity 303, as cap cavity 303 is compressed into uniform gap 302 by the positioning of fitted cap 300 over fastener 100. The excess sealant and/or gas may be communicated through relief opening 316 into through, circumferentially closed, channel 516 of shaft 510. As such, fitted cap 300 for use with method 2100 need not include vent 309. In various examples, omission of vent 309 from fitted cap 300 reduces an amount of leakage, dripping, or other inadvertent application of sealant 592 to first member 102.

Referring generally to FIGS. 2, 17, and 18 and particularly to, e.g., FIGS. 21A and 21B, according to method 2100, fastener 100 is installed on first member 102 such that portion 106 of fastener 100 extends from base surface 103 of first member 102. Method 2100 further comprises (block 2110) mounting first cap end 308 of fitted cap 300 against base surface 103. The preceding subject matter of this paragraph characterizes example 93 of the present disclosure, wherein example 93 also includes the subject matter according to example 92, above.

First cap end 308 configured to mount against base surface 103 enables fitted cap 300 to be positioned directly on first member 102 during application of sealant 592, reducing an amount of leakage, dripping, or other inadvertent application of sealant 592 to first member 102.

Referring generally to FIGS. 2, 17, and 18 and particularly to, e.g., FIGS. 21A and 21B, according to method 2100, (block 2106) positioning fitted cap 300 over portion 106 of fastener 100 comprises (block 2112) positioning fitted cap 300 such that gap width 312 of uniform gap 302 is within a predefined tolerance range for shroud thickness 594 of shaped sealant shroud 590 on portion 106 of fastener 100. The preceding subject matter of this paragraph characterizes example 94 of the present disclosure, wherein example 94 also includes the subject matter according to example 92 or 93, above.

Selection of a size and a type of fitted cap 300 provides gap width 312 within the predetermined tolerance for shroud thickness 594 on portion 106 of fastener 100, and thus causes a correct thickness of sealant 592 to be applied to portion 106 of fastener 100. For example, fitted cap 300 is previously formed according to any one of examples 51 to 76, above, using fastener template 202 dimensionally identical to portion 106 of fastener 100.

Referring generally to FIGS. 17 and 18 and particularly to, e.g., FIGS. 21A and 21B, according to method 2100, shaft 510 extends longitudinally from first shaft end 512 to second shaft end 514. Method 2100 further comprises (block 2114) coupling interface bushing 550 between second shaft end 514 and fitted cap 300. Relief opening 316 of fitted cap 300 is oriented to purge at least the one of the gas or the excess of sealant 592 from uniform gap 302 through passage 562 that extends through interface bushing 550, and into through, circumferentially closed, channel 516 of shaft 510. The preceding subject matter of this paragraph characterizes example 95 of the present disclosure, wherein example 95 also includes the subject matter according to any one of examples 92 to 94, above.

Interface bushing 550 simplifies coupling of shaft 510 to fitted cap 300. In various examples, interface bushing 550 also extends an operational lifetime of fitted cap 300. For example, shaft 510 may be made from a metallic material that would wear on a relatively thin plastic used to form fitted cap 300, and interface bushing 550 may be made from a thicker plastic that can better withstand coupling to the metallic material while wearing less on fitted cap 300. Interface bushing 550 may also be provided in various sizes to facilitate matching a single size of shaft 510 to multiple sizes and/or types of fitted cap 300.

Referring generally to FIGS. 17 and 18 and particularly to, e.g., FIGS. 21A and 21B, according to method 2100, fitted cap 300 comprises tapered interface portion 310. Interface bushing 550 comprises sidewall 556, having sidewall taper angle 558 relative to longitudinal central axis 518. Additionally, according to method 2100, (block 2114) coupling interface bushing 550 between second shaft end 514 of shaft 510 and fitted cap 300 comprises (block 2118) coupling sidewall 556 of interface bushing 550 to tapered interface portion 310 of fitted cap 300 with an interference fit. The preceding subject matter of this paragraph characterizes example 96 of the present disclosure, wherein example 96 also includes the subject matter according to example 95, above.

The interference fit between sidewall 556 (which is tapered, as provided above) of interface bushing 550 and tapered interface portion 310 of fitted cap 300 provides a simple and efficient structure for releasably coupling cap-manipulation tool 500 to fitted cap 300. For example, tapered interface portion 310 of fitted cap 300 is previously formed according to one of examples 66 or 69, above, using insert 250.

Referring generally to FIGS. 17 and 18 and particularly to, e.g., FIGS. 21A and 21B, according to method 2100, (block 2118) coupling sidewall 556 of interface bushing 550 to tapered interface portion 310 of fitted cap 300 comprises (block 2120) coupling sidewall 556, having sidewall taper angle 558 that differs by at least 10 degrees from cap taper angle 311, defined by tapered interface portion 310 of fitted cap 300 relative to longitudinal central axis 518. The preceding subject matter of this paragraph characterizes example 97 of the present disclosure, wherein example 97 also includes the subject matter according to example 96, above.

The difference between sidewall taper angle 558 of sidewall 556 of interface bushing 550 and cap taper angle 311 inhibits interface bushing 550 and fitted cap 300 from becoming locked together during use.

Referring generally to FIGS. 17 and 18 and particularly to, e.g., FIGS. 21A and 21B, method 2100 further comprises (block 2122) coupling skirt 560 of interface bushing 550 to second shaft end 514 of shaft 510 with an interference fit. The preceding subject matter of this paragraph characterizes example 98 of the present disclosure, wherein example 98 also includes the subject matter according to any one of examples 95 to 97, above.

The difference between sidewall taper angle 558 of sidewall 556 of interface bushing 550 and cap taper angle 311 inhibits interface bushing 550 and fitted cap 300 from becoming locked together during use.

Referring generally to FIGS. 17 and 18 and particularly to, e.g., FIGS. 21A and 21B, according to method 2100, cap-manipulation tool 500 further comprises handle 530, coupled to shaft 510. Additionally, according to method 2100, (block 2108) rotating shaft 510 about longitudinal central axis 518 of shaft 510 is accomplished by (block 2124) moving handle 530. The preceding subject matter of this paragraph characterizes example 99 of the present disclosure, wherein example 99 also includes the subject matter according to example 92, above.

Handle 530 is configured to be manipulated by a user to rotate shaft 510 to evenly spread sealant 592 on portion 106 of fastener 100.

Referring generally to FIGS. 17 and 18 and particularly to, e.g., FIGS. 21A and 21B, according to method 2100, shaft 510 extends between first shaft end 512 and second shaft end 514. Additionally, according to method 2100, (block 2108) rotating shaft 510 about longitudinal central axis 518 of shaft 510 is accomplished by (block 2126) longitudinally translating handle 530 between first shaft end 512 and second shaft end 514. The preceding subject matter of this paragraph characterizes example 100 of the present disclosure, wherein example 100 also includes the subject matter according to example 99, above.

The user can apply a simple longitudinal motion to handle 530 to rotate shaft 510 to evenly spread sealant 592 on portion 106 of fastener 100.

Referring generally to FIGS. 17 and 18 and particularly to, e.g., FIGS. 21A and 21B, according to method 2100, (block 2126) longitudinally translating handle 530 between first shaft end 512 and second shaft end 514 comprises (block 2128) longitudinally non-concurrently translating handle 530 in two opposing axial directions between first shaft end 512 and second shaft end 514 such that shaft 510 respectively non-concurrently rotates in two opposing rotational directions about longitudinal central axis 518. The preceding subject matter of this paragraph characterizes example 101 of the present disclosure, wherein example 101 also includes the subject matter according to example 100, above.

The user can apply a simple up-and-down longitudinal motion to handle 530 to rotate shaft 510 back-and-forth in opposing directions e.g., clockwise and counter-clockwise to evenly spread sealant 592 on portion 106 of fastener 100.

In various examples, the two opposing axial directions are parallel to longitudinal central axis 518.

Referring generally to FIGS. 17 and 18 and particularly to, e.g., FIGS. 21A and 21B, according to method 2100, cap-manipulation tool 500 further comprises biasing element 580. Additionally, according to method 2100, (block 2126) longitudinally translating handle 530 between first shaft end 512 and second shaft end 514 further comprises (block 2130) biasing, by biasing element 580, handle 530 in a return direction toward first shaft end 512 in response to longitudinal translation of handle 530 toward second shaft end 514. The preceding subject matter of this paragraph characterizes example 102 of the present disclosure, wherein example 102 also includes the subject matter according to example 101, above.

After the user moves handle 530 in a longitudinal direction to rotate shaft 510 in one rotational direction about longitudinal central axis 518, biasing element 580 assists the user by applying a return force that tends to move handle 530 in the opposing longitudinal direction to rotate shaft 510 in the opposing rotational direction. For example, biasing element 580 is a coil spring.

Referring generally to FIGS. 17 and 18 and particularly to, e.g., FIGS. 21A and 21B, according to method 2100, shaft 510 further comprises helical groove 520, located on outer surface 522 of shaft 510. Handle 530 comprises cam 534. Additionally, according to method 2100, (block 2124) moving handle 530 comprises (block 2132) longitudinally translating handle 530 such that cam 534 moves within helical groove 520 to rotate shaft 510 about longitudinal central axis 518. The preceding subject matter of this paragraph characterizes example 103 of the present disclosure, wherein example 103 also includes the subject matter according to any one of examples 99 to 102, above.

The cooperation of cam 534 and helical groove 520 transforms up-and-down longitudinal motion applied to handle 530 into back-and-forth rotational motion of shaft 510.

Referring generally to FIGS. 17 and 18 and particularly to, e.g., FIGS. 21A and 21B, according to method 2100, handle 530 further comprises body 540 that has handle cavity 532. Cam 534 projects inwardly from body 540 into handle cavity 532. Method 2100 further comprises (block 2134) receiving shaft 510 through handle cavity 532 with a clearance fit. The preceding subject matter of this paragraph characterizes example 104 of the present disclosure, wherein example 104 also includes the subject matter according to example 103, above.

Receiving shaft 510 through body 540 of handle 530 stabilizes shaft 510 in a vertical orientation as the cooperation of cam 534 and helical groove 520 transforms up-and-down longitudinal motion applied to handle 530 into back-and-forth rotational motion of shaft 510.

Referring generally to FIGS. 17 and 18 and particularly to, e.g., FIGS. 21A and 21B, according to method 2100, handle 530 further comprises extension 536 that extends outwardly from shaft 510 at an angle relative to longitudinal central axis 518. Additionally, according to method 2100, (block 2124) moving handle 530 comprises (block 2136) manipulating extension 536 by a hand of a user. The preceding subject matter of this paragraph characterizes example 105 of the present disclosure, wherein example 105 also includes the subject matter according to any one of examples 99 to 102, above.

Extension 536 enables a user to manipulate handle 530 up and down to rotate shaft 510 in cases where fastener 100 is located in a confined space.

Referring generally to FIGS. 17 and 18 and particularly to, e.g., FIGS. 21A and 21B, according to method 2100, handle 530 further comprises body 540 and joint 538. Shaft 510 is received through handle cavity 532, located in body 540, with a clearance fit. Extension 536 is coupled to body 540 at joint 538. Additionally, according to method 2100, (block 2136) manipulating extension 536 by the hand of the user comprises (block 2138) moving extension 536 among a plurality of orientations about joint 538 with respect to body 540. The preceding subject matter of this paragraph characterizes example 106 of the present disclosure, wherein example 106 also includes the subject matter according to example 105, above.

Joint 538, coupling body 540 and extension 536, further enables a user to manipulate handle 530 up and down by hand to rotate shaft 510 in cases where the fastener 100 is located in a confined space.

Examples of the present disclosure may be described in the context of aircraft manufacturing and service method 1100 as shown in FIG. 22 and aircraft 1102 as shown in FIG. 23. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 23, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A system for applying a shaped sealant shroud to a portion of a fastener, the system comprising:
   a fitted cap, comprising a wall, a cap cavity defined by the wall and configured to receive sealant therein, and a relief opening that fully penetrates the wall, wherein the fitted cap is positionable over the portion of the fastener such that:
   the portion of the fastener is received within the cap cavity;
   a uniform gap is formed between the wall of the fitted cap and the portion of the fastener; and
   the relief opening is communicatively coupled with the uniform gap; and
   a cap-manipulation tool, comprising a shaft, wherein:
   the shaft has a longitudinal central axis and comprises a through, circumferentially closed, channel; and
   the cap-manipulation tool is configured to couple to the fitted cap such that:
   the through, circumferentially closed, channel of the shaft is communicatively coupled with the relief opening of the fitted cap and
   the fitted cap is rotatable together with the shaft about the longitudinal central axis of the shaft to distribute the sealant, previously introduced into the cap cavity, in the uniform gap to form the shaped sealant shroud around the portion of the fastener, wherein the relief opening is oriented to purge at least one of gas or excess of the sealant from the uniform gap into the through, circumferentially closed, channel of the shaft.

2. The system according to claim 1, wherein the fastener is configured for installation on a first member, such that the portion of the fastener extends from a base surface of the first member and the fitted cap comprises a first cap end, configured to mount against the base surface.

3. The system according to claim 1, wherein a gap width of the uniform gap is within a predefined tolerance range for a shroud thickness of the shaped sealant shroud on the portion of the fastener.

4. The system according to claim 1, wherein:
the shaft comprises a first shaft end and a second shaft end, opposite the first shaft end, and extends longitudinally from the first shaft end to the second shaft end;
the cap-manipulation tool further comprises an interface bushing that has a passage therethrough; and
the interface bushing is configured to couple between the second shaft end and the fitted cap such that, with the fitted cap positioned over the portion of the fastener, the through, circumferentially closed, channel is communicatively coupled with the passage, the relief opening, and the uniform gap.

5. The system according to claim 4, wherein:
the fitted cap comprises a tapered interface portion;
the interface bushing comprises a sidewall, having a sidewall taper angle relative to the longitudinal central axis; and
the sidewall of the interface bushing is configured to couple to the tapered interface portion of the fitted cap with an interference fit.

6. The system according to claim 5, wherein:
the tapered interface portion of the fitted cap has a cap taper angle relative to the longitudinal central axis and
the cap taper angle differs from the sidewall taper angle of the interface bushing by at least 10 degrees.

7. The system according to claim 4, wherein the interface bushing comprises a skirt, configured to couple to the second shaft end with an interference fit.

8. The system according to claim 1, wherein the cap-manipulation tool further comprises a handle, coupled to the shaft and movable to rotate the shaft about the longitudinal central axis.

9. The system according to claim 8, wherein:
the shaft comprises a first shaft end and a second shaft end, opposite the first shaft end, and extends between the first shaft end and the second shaft end and
the handle is longitudinally translatable between the first shaft end and the second shaft end to cause rotational motion of the shaft about the longitudinal central axis.

10. The system according to claim 9, wherein the handle is longitudinally non-concurrently translatable in two opposing axial directions between the first shaft end and the second shaft end such that the shaft is respectively non-concurrently rotatable in two opposing rotational directions about the longitudinal central axis.

11. A method for applying a shaped sealant shroud to a portion of a fastener, the method comprising steps of:
coupling a cap-manipulation tool to a fitted cap, wherein:
the fitted cap comprises a wall, a cap cavity, defined by the wall, and a relief opening that fully penetrates the wall;
the cap-manipulation tool comprises a shaft; and
the shaft comprises a through, circumferentially closed, channel, configured to be communicatively coupled with the relief opening of the fitted cap;
introducing sealant into the cap cavity;
positioning the fitted cap over the portion of the fastener such that:
the portion is received within the cap cavity;
a uniform gap is formed between the wall of the fitted cap and the portion of the fastener; and
the relief opening of the fitted cap is communicatively coupled with the uniform gap; and
rotating the shaft about a longitudinal central axis of the shaft, and wherein
the fitted cap rotates together with the shaft such that the sealant, previously introduced into the cap cavity, is distributed in the uniform gap to form the shaped sealant shroud around the portion of the fastener and
the relief opening is oriented to purge at least one of gas or excess of the sealant from the uniform gap.

12. The method according to claim 11, wherein:
the fastener is installed on a first member such that the portion of the fastener extends from a base surface of the first member and
the method further comprises mounting a first cap end of the fitted cap against the base surface.

13. The method according to claim 11, wherein the step of positioning the fitted cap over the portion of the fastener comprises positioning the fitted cap such that a gap width of the uniform gap is within a predefined tolerance range for a shroud thickness of the shaped sealant shroud on the portion of the fastener.

14. The method according to claim 11, wherein:
the shaft extends longitudinally from a first shaft end to a second shaft end and
the method further comprises a step of coupling an interface bushing between the second shaft end and the fitted cap and
wherein the relief opening of the fitted cap is oriented to purge at least the one of the gas or the excess of the sealant from the uniform gap through a passage that extends through the interface bushing, and into the through, circumferentially closed, channel of the shaft.

15. The method according to claim 14, wherein:
the fitted cap comprises a tapered interface portion;
the interface bushing comprises a sidewall, having a sidewall taper angle relative to the longitudinal central axis; and
the step of coupling the interface bushing between the second shaft end of the shaft and the fitted cap comprises a step of coupling the sidewall of the interface bushing to the tapered interface portion of the fitted cap with an interference fit.

16. The method according to claim 15, wherein the step of coupling the sidewall of the interface bushing to the tapered interface portion of the fitted cap comprises coupling the sidewall, having the sidewall taper angle that differs by at least 10 degrees from a cap taper angle, defined by the tapered interface portion of the fitted cap relative to the longitudinal central axis.

17. The method according to claim 14, further comprising coupling a skirt of the interface bushing to the second shaft end of the shaft with an interference fit.

18. The method according to claim 11, wherein:
the cap-manipulation tool further comprises a handle, coupled to the shaft, and
the step of rotating the shaft about the longitudinal central axis of the shaft is accomplished by a step of moving the handle.

19. The method according to claim 18, wherein:
the shaft extends between a first shaft end and a second shaft end and
the step of rotating the shaft about the longitudinal central axis of the shaft is accomplished by a step of longitudinally translating the handle between the first shaft end and the second shaft end.

20. The method according to claim 19, wherein the step of longitudinally translating the handle between the first shaft end and the second shaft end comprises longitudinally non-concurrently translating the handle in two opposing axial directions between the first shaft end and the second shaft end such that the shaft respectively non-concurrently rotates in two opposing rotational directions about the longitudinal central axis.

21. The system according to claim 10, wherein the cap-manipulation tool further comprises a biasing element, configured to bias the handle toward the first shaft end in response to longitudinal translation of the handle toward the second shaft end.

22. The system according to claim 8, wherein:
the shaft further comprises an outer surface and a helical groove, located on the outer surface and
the handle comprises a cam, configured to cooperate with the helical groove such that longitudinal translational motion of the handle along the shaft causes rotational motion of the shaft about the longitudinal central axis.

23. The system according to claim 22, wherein:
the handle further comprises a body;
the body has a handle cavity, configured to receive the shaft therethrough with a clearance fit; and
the cam projects from the body into the handle cavity.

24. The system according to claim 8, wherein:
the handle further comprises an extension, configured to extend outwardly from the shaft at an angle relative to the longitudinal central axis, and
the extension is configured to be manipulated by a hand of a user.

25. The system according to claim 24, wherein:
the handle further comprises a body and a joint;
the body has a handle cavity, configured to receive the shaft therethrough with a clearance fit; and
the extension is coupled to the body at the joint such that the extension is movable among a plurality of orientations with respect to the body.

26. The method according to claim 20, wherein:
the cap-manipulation tool further comprises a biasing element and the step of longitudinally translating the handle between the first shaft end and the second shaft end further comprises biasing, by the biasing element, the handle in a return direction toward the first shaft end in response to longitudinal translation of the handle toward the second shaft end.

27. The method according to claim 18, wherein:
the shaft further comprises a helical groove, located on an outer surface of the shaft;
the handle comprises a cam; and
the step of moving the handle comprises longitudinally translating the handle such that the cam moves within the helical groove to rotate the shaft about the longitudinal central axis.

28. The method according to claim 27, wherein:
the handle further comprises a body;
the body has a handle cavity;
the cam projects inwardly from the body into the handle cavity; and
the method further comprises receiving the shaft through the handle cavity with a clearance fit.

29. The method according to claim 18, wherein:
the handle further comprises an extension that extends outwardly from the shaft at an angle relative to the longitudinal central axis and
the step of moving the handle comprises a step of manipulating the extension by a hand of a user.

30. The method according to claim 29, wherein:
the handle further comprises a body and a joint;
the shaft is received through a handle cavity, located in the body, with a clearance fit;
the extension is coupled to the body at the joint; and
the step of manipulating the extension by the hand of the user comprises moving the extension among a plurality of orientations about the joint with respect to the body.

* * * * *